(12) United States Patent
Zhang et al.

(10) Patent No.: US 11,510,227 B2
(45) Date of Patent: Nov. 22, 2022

(54) UPLINK TRANSMISSION IN DISCOVERY REFERENCE SIGNAL MEASUREMENT TIMING CONFIGURATION WINDOW

(71) Applicant: QUALCOMM Incorporated, San Diego, CA (US)

(72) Inventors: Xiaoxia Zhang, San Diego, CA (US); Jing Sun, San Diego, CA (US); Kapil Bhattad, Bangalore (IN); Tao Luo, San Diego, CA (US); Pravjyot Singh Deogun, Bengaluru (IN); Ananta Narayanan Thyagarajan, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 354 days.

(21) Appl. No.: 16/588,658

(22) Filed: Sep. 30, 2019

(65) Prior Publication Data

US 2020/0112978 A1    Apr. 9, 2020

(30) Foreign Application Priority Data

Oct. 5, 2018  (IN) .............................. 201841037795
Aug. 7, 2019  (IN) .............................. 201941031977

(51) Int. Cl.
*H04W 72/12*   (2009.01)
*H04W 16/14*   (2009.01)
*H04W 74/08*   (2009.01)

(52) U.S. Cl.
CPC ....... *H04W 72/1268* (2013.01); *H04W 16/14* (2013.01); *H04W 72/1284* (2013.01); *H04W 74/0808* (2013.01)

(58) Field of Classification Search
None
See application file for complete search history.

(56) References Cited

U.S. PATENT DOCUMENTS

| | | | |
|---|---|---|---|
| 2017/0093542 A1* | 3/2017 | Li | H04W 72/042 |
| 2017/0223561 A1* | 8/2017 | Radulescu | H04B 17/336 |
| 2019/0037483 A1* | 1/2019 | Li | H04L 25/0224 |
| 2019/0230578 A1* | 7/2019 | Karaki | H04W 74/0816 |
| 2019/0357264 A1* | 11/2019 | Yi | H04W 24/10 |

OTHER PUBLICATIONS

Interdigital Inc: "RLM/RLF for NR-U", 3GPP Draft, R2-1811454 (R15 NRU SI AL 11222 RLM RLF NRU), 3rd Generation Partnership Project (3GPP), Mobile Competence Centre, 650, Route Des Lucioles, F-06921 Sophia-Antipolis Cedex, France, vol. RAN WG2, No. Gothenburg, Sweden, Aug. 20-2018-Aug. 24, 2018, Aug. 9, 2018 (Aug. 9, 2018), XP051521109, 23 pages, Retrieved from the Internet: URL: http://www.3gpp.org/ftp/tsg%5Fran/WG2%5FRL2/TSGR2%5F103/DOCS/R2%2D1811454%2Ezip. [retrieved on Aug. 9, 2018] section 2.

International Search Report and Written Opinion—PCT/US2019/054110—ISA/EPO—dated Jan. 20, 2020.

* cited by examiner

*Primary Examiner* — Ajit Patel
*Assistant Examiner* — Pamit Kaur
(74) *Attorney, Agent, or Firm* — Liem T. Do

(57) ABSTRACT

Wireless communications systems and methods related to transmission of discovery signals are provided. A wireless communication device communicates an indication of an uplink (UL) resource that falls within a discovery reference signal (DRS) measurement timing configuration (DMTC) window. The wireless communication device communicates an UL transmission within the UL resource during the DMTC window.

28 Claims, 27 Drawing Sheets

UPLINK TRANSMISSION IN DISCOVERY REFERENCE SIGNAL MEASUREMENT TIMING CONFIGURATION WINDOW

CROSS REFERENCE TO RELATED APPLICATIONS & PRIORITY CLAIM

The present application claims priority to and the benefit of the Indian Provisional Patent Application No. 201941031977 filed Aug. 7, 2019 entitled "Uplink Resource Validity Based on Synchronization Block Measurement Timing Configuration Occurrence" and the Indian Provisional Patent Application No. 201841037795 filed Oct. 5, 2018 entitled "Time-Varying Synchronization Signal Block (SSB) Transmissions for Wireless Communications in Shared Spectrum," each of which is hereby incorporated by reference in its entirety.

TECHNICAL FIELD

This application relates to wireless communication systems, and more particularly to discovery signal transmissions for wireless communications in shared spectrum.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communication for multiple communication devices, which may be otherwise known as user equipment (UE).

To meet the growing demands for expanded mobile broadband connectivity, wireless communication technologies are advancing from the LTE technology to a next generation new radio (NR) technology. NR may provision for dynamic medium sharing among network operators in a licensed spectrum, a shared spectrum, and/or an unlicensed spectrum. For example, shared spectrums and/or unlicensed spectrums may include frequency bands at about 3.5 gigahertz (GHz), about 6 GHz, and about 60 GHz.

In a radio access network such as a NR network, a BS may transmit synchronization signals to allow UEs to search and acquire synchronization to a cell within the radio access network. In some instances, a BS may transmit synchronization signals repeatedly at a predetermined periodicity. When the network operates at high frequencies, for example, at about 6 GHz or above 6 GHz, the path-loss may be high. To overcome the high path-loss, a BS may perform beamforming, which may include analog and/or digital beamforming, to create narrow beams for transmissions to UEs in the network. For example, the BS may transmit synchronization signals in different beam directions using narrow transmission beams. A BS and a UE may exchange various messages during a cell acquisition procedure to establish a communication link. In some cases, a BS may utilize beamformed transmissions during the cell acquisition procedure to mitigate path losses (e.g., if the BS is communicating at higher frequencies).

When the network operates in a shared medium or a shared channel, the synchronization signal transmissions may collide with transmissions from other nodes sharing the channel. One approach to avoiding collisions is to perform listen-before-talk (LBT) to ensure that the shared channel is clear before transmitting a synchronization signal.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication includes communicating, by a first wireless communication device a second wireless communication device, a first set of synchronization signal block (SSBs) during a first measurement window using a first set of beams based on a first beam pattern; and communicating, by the first wireless communication device with the second wireless communication device, a second set of SSBs during a second measurement window using a second set of beams based on a second beam pattern different from the first beam pattern.

In an additional aspect of the disclosure, a method of wireless communication includes communicating, by a first wireless communication device with a second wireless communication device, an extended measurement window configuration indicating a first measurement window with a first listen-before-talk (LBT) type and a second measurement window with a second LBT type different from the first LBT type; communicating, by the first wireless communication device with the second wireless communication device, a first synchronization signal during the first measurement window based on a LBT of the first LBT type; and communicating, by the first wireless communication device with the second wireless communication device, a second synchronization signal during the second measurement window based on a LBT of the second LBT type.

In an additional aspect of the disclosure, an apparatus includes a transmitter configured to transmit, from a wireless communication device, a first set of SSBs during a first measurement window using a first set of beams based on a first beam pattern. The transmitter is further configured to transmit, from the wireless communication device, a second set of SSBs during a second measurement window using a second set of beams based on a second beam pattern different from the first beam pattern.

In an additional aspect of the disclosure, an apparatus includes a transmitter configured to transmit, from a wireless communication device, an extended measurement window configuration indicating a first measurement window with a first LBT type and a second measurement window with a second LBT type different from the first LBT type. The transmitter is further configured to, from the wireless communication device, a first synchronization signal during the first measurement window based on a LBT of the first LBT type. The transmitter is further configured to transmit, from the wireless communication device, a second synchronization signal during the second measurement window based on a LBT of the second LBT type.

In an additional aspect of the disclosure, a computer-readable medium includes program code recorded thereon, the program code including code for causing a wireless communication device to communicate a first set of SSBs during a first measurement window using a first set of beams based on a first beam pattern; and code for causing the wireless communication device to communicate a second set of SSBs during a second measurement window using a second set of beams based on a second beam pattern different from the first beam pattern.

In an additional aspect of the disclosure, a computer-readable medium includes program code recorded thereon, the program code including code for causing a wireless communication device to communicate an extended measurement window configuration indicating a first measurement window with a first LBT type and a second measurement window with a second LBT type different from the first LBT type; code for causing the wireless communication device to communicate a first synchronization signal during the first measurement window based on a LBT of the first LBT type; and code for causing the wireless communication device to communicate a second synchronization signal during the second measurement window based on a LBT of the second LBT type.

For example, in an aspect of the disclosure, an apparatus includes means for communicating, by a first wireless communication device a second wireless communication device, a first set of SSBs during a first measurement window using a first set of beams based on a first beam pattern; and means for communicating, by the first wireless communication device with the second wireless communication device, a second set of SSBs during a second measurement window using a second set of beams based on a second beam pattern different from the first beam pattern.

In an additional aspect of the disclosure, an apparatus includes means for communicating, by a first wireless communication device with a second wireless communication device, an extended measurement window configuration indicating a first measurement window with a first LBT type and a second measurement window with a second LBT type different from the first LBT type; means for communicating, by the first wireless communication device with the second wireless communication device, a first synchronization signal during the first measurement window based on a LBT of the first LBT type; and means for communicating, by the first wireless communication device with the second wireless communication device, a second synchronization signal during the second measurement window based on a LBT of the second LBT type.

In one aspect of the disclosure, a method of wireless communication includes determining, by a user equipment (UE), whether an uplink resource overlaps with a synchronization signal block (SSB) occasion within a synchronization block measurement timing configuration (SMTC) window, transmitting, by the UE, an uplink transmission within the uplink resource in response to determination of no overlap with the SSB occasion, further determining, by the UE, in response to determination of an overlap with the SSB occasion, a validity state of the uplink resource based on an arrangement of the uplink resource, transmitting, by the UE, the uplink transmission within the uplink resource in response to further determination of the validity state of the uplink resource as valid, and withholding transmission, by the UE, of the uplink transmission within the uplink resource in response to the further determination of the validity state of the uplink resource as invalid.

In an additional aspect of the disclosure, an apparatus configured for wireless communication includes means for determining, by a UE, whether an uplink resource overlaps with a SSB occasion within a SMTC window, means for transmitting, by the UE, an uplink transmission within the uplink resource in response to determination of no overlap with the SSB occasion, means for further determining, by the UE, in response to determination of an overlap with the SSB occasion, a validity state of the uplink resource based on an arrangement of the uplink resource, means for transmitting, by the UE, the uplink transmission within the uplink resource in response to further determination of the validity state of the uplink resource as valid, and means for withholding transmission, by the UE, of the uplink transmission within the uplink resource in response to the further determination of the validity state of the uplink resource as invalid.

In an additional aspect of the disclosure, a non-transitory computer-readable medium having program code recorded thereon. The program code further includes code to determine, by a UE, whether an uplink resource overlaps with a SSB occasion within a SMTC window, code to transmit, by the UE, an uplink transmission within the uplink resource in response to determination of no overlap with the SSB occasion, code to further determine, by the UE, in response to determination of an overlap with the SSB occasion, a validity state of the uplink resource based on an arrangement of the uplink resource, code to transmit, by the UE, the uplink transmission within the uplink resource in response to further determination of the validity state of the uplink resource as valid, and code to withhold transmission, by the UE, of the uplink transmission within the uplink resource in response to the further determination of the validity state of the uplink resource as invalid.

In an additional aspect of the disclosure, an apparatus configured for wireless communication is disclosed. The apparatus includes at least one processor, and a memory coupled to the processor. The processor is configured to determine, by a UE, whether an uplink resource overlaps with a SSB occasion within a SMTC window, to transmit, by the UE, an uplink transmission within the uplink resource in response to determination of no overlap with the SSB occasion, to further determine, by the UE, in response to determination of an overlap with the SSB occasion, a validity state of the uplink resource based on an arrangement of the uplink resource, to transmit, by the UE, the uplink transmission within the uplink resource in response to further determination of the validity state of the uplink resource as valid, and to withhold transmission, by the UE, of the uplink transmission within the uplink resource in response to the further determination of the validity state of the uplink resource as invalid.

Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
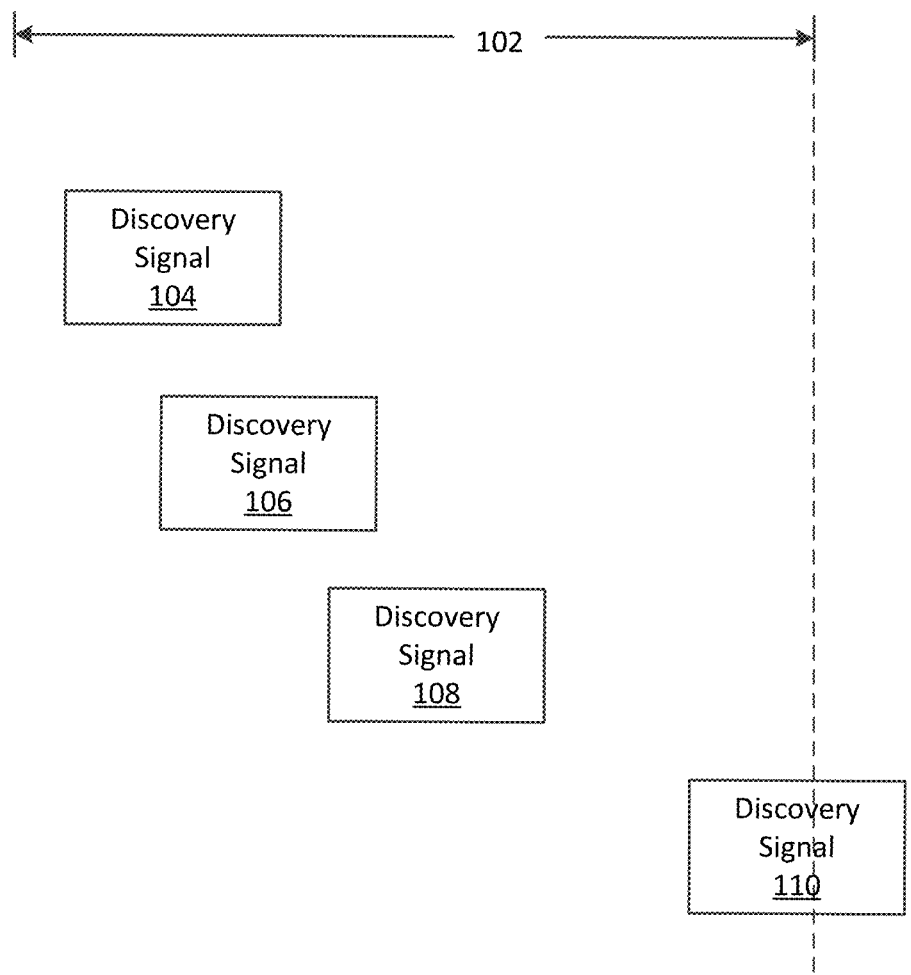
FIG. 1 illustrates a measurement window that defines the starting locations of the discovery signal transmission according to embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). The "3rd Generation Partnership Project" (3GPP) Long Term Evolution (LTE) and LTE-Advanced (LTE-A) are new releases of UMTS that use E-UTRA. UTRA, E-UTRA, UMTS, LTE, LTE-A and GSM are described in documents from an organization named the "3rd Generation Partnership Project." CDMA2000 and UMB are described in documents from an organization named "3rd Generation Partnership Project 2" (3GPP2). The techniques described herein may be used for the wireless networks and radio technologies mentioned above as well as other wireless networks and radio technologies, such as a next generation (e.g., 5th Generation (5G)) network. The 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like BW. For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allow transmissions to start on symbol boundaries. 5G NR also contemplates a self-contained integrated subframe design with uplink (UL)/downlink (DL) scheduling information, data, and acknowledgement in the same subframe. The self-contained integrated subframe supports communications in unlicensed or contention-based shared spectrum, adaptive UL/DL that may be flexibly configured on a per-cell basis to dynamically switch between UL and DL to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

To facilitate synchronization in a radio access network, a base station (BS) may sweep through multiple beams directing towards different beam directions in a designated time period for transmitting discovery signals. The designated time period may be referred to as a measurement window. In NR, the designated time period may be referred to as a discovery reference signal (DRS) measurement timing configuration (DMTC) window. The measurement windows may be repeated at a predetermined periodicity. In some examples, the BS transmits synchronization signals to allow UEs to search and acquire synchronization to a cell within the radio access network. In a shared radio frequency spectrum band, such as an unlicensed radio frequency spectrum band, a BS performs a listen-before-talk (LBT) clear channel assessment (CCA) procedure to sense when a channel is clear for transmission. In an example, the BS performs LBT prior to sending discovery signal transmissions in a shared frequency spectrum. If the LBT results in a LBT pass, the BS may proceed with the discovery signal transmission by transmitting a set of one or more SS blocks (SSBs). A SSB may include a combination of synchronization signals, broadcast system information signals, and/or discovery reference signals.

Additionally, each SSB is assigned with a unique number within the set of SSBs. For example, SSBs in a SSB set are indexed, for example, from 0 to N–1. A BS may transmit a SSB set at certain locations within a measurement window. A BS may transmit each SSB within a SSB set using a different beam direction. A beam index is assigned to each beam direction.

A beam or beam direction may be mapped to a SSB index. For ease of notation, a beam having a beam index n may be referred to as beam n (e.g., beam 0, beam 1, and so on), and a SSB having a SSB index m may be referred to as SSB m (e.g., SSB0, SSB1, and so on). Continuing with this notation, beam 0 is mapped to SSB0, beam 1 is mapped to SSB1, beam 2 is mapped to SSB2, and so on. The BS transmits a SSB during a measurement window using a beam. The mapping of a beam to a SSB index refers to the transmission of a SSB corresponding to the SSB index in the beam direction. If the BS does not transmit the SSB, the beam mapped to the SSB is not transmitted.

The BS may transmit the set of SSBs during a measurement window. The measurement window may be configured in various ways. FIG. 1 illustrates a measurement window 102 that defines the starting locations of the discovery signal transmission according to embodiments of the present disclosure. The starting locations of discovery signals 104, 106, 108, and 110 each fall within the measurement window 102. In the example illustrated in FIG. 1, the BS may take however long it needs to transmit the entire set of SSBs because only the starting locations are defined in the measurement window 102. Accordingly, the BS may transmit discovery signals 104, 106, 108, and 110 during the measurement window 102. In this example, the BS completes the transmission of discovery signal 110, even though it extends past the measurement window 102. In this scenario, the BS may transmit the full discovery signal 110 beyond the measurement window 102, and thus the entire set of SSBs (and thus corresponding beams) is accommodated.

Figure 2:
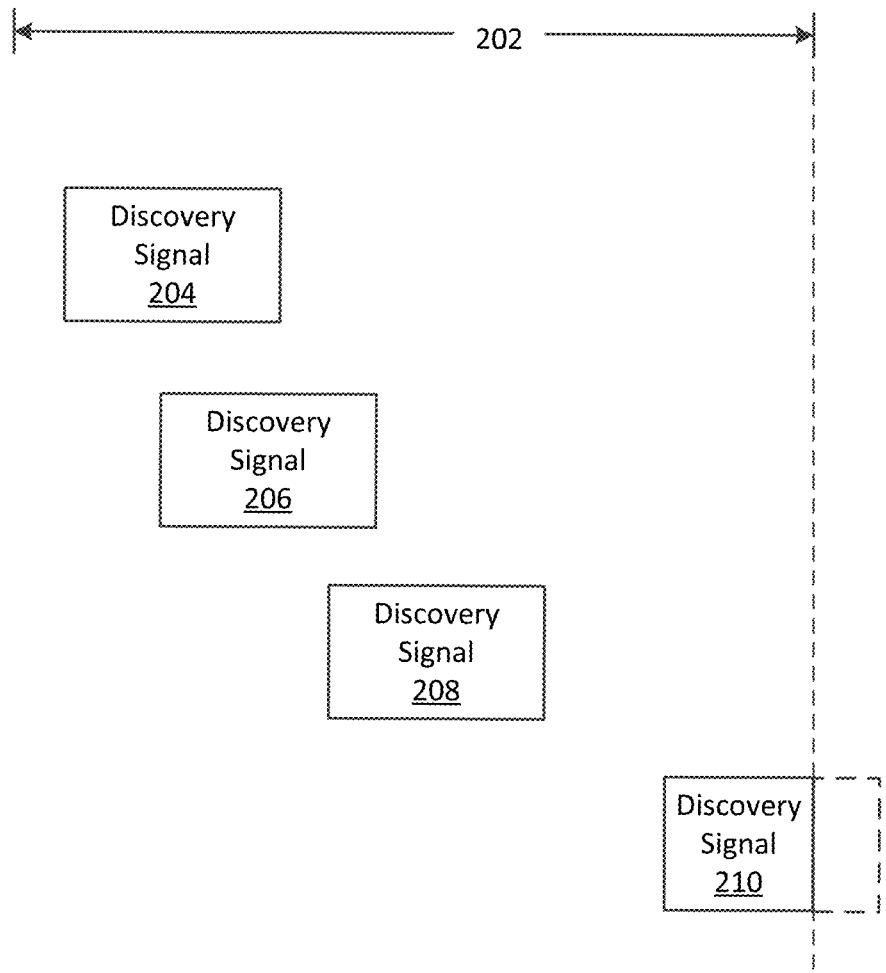
FIG. 2 illustrates a measurement window in which the discovery signal transmission is fully contained in the measurement window according to embodiments of the present disclosure.

If, however, the discovery signal transmission is to be fully contained in the measurement window, it may be possible that the discovery signal is truncated when operating over an unlicensed spectrum or shared spectrum. FIG. 2 illustrates a measurement window 202 in which the discovery signal transmission is fully contained in the measurement window according to embodiments of the present disclosure. For example, a measurement window 202 may be located at a predetermined time (e.g., a predetermined start time and a predetermined end time). The starting locations of discovery signals 204, 206, 208, and 210 each fall within the measurement window 202. The BS may transmit discovery signals 204, 206, and 208 during the measurement window 202. If a LBT results in a LBT pass towards the end of the predetermined measurement window 202, the BS may be unable to transmit the entire set of SSBs in the transmission of the discovery signal 210. Accordingly, in the example illustrated in FIG. 2, transmission of the discovery signal 210 may be truncated, as indicated by the box having dashed lines that extend past the measurement window 202.

In an example, the SSBs corresponding to a later SSB index are more vulnerable to failure if the SSB index is fixed and starts from 0 upon a LBT pass. In this example, the BS may transmit the SSB 0, SSB 1, SSB 2, SSB 3, SSB 4, and SSB 5 and fail to transmit SSB 6 and SSB 7. The discovery signal is truncated because the last two SSBs (SSB 6 and SSB 7) fall outside of the measurement window due to the late LBT pass. Accordingly, beam 6 and beam 7 are not transmitted. In another example, the BS may transmit using a cyclic shift mapping, in which the SSBs corresponding to an earlier SSB index are more vulnerable to failure. With the cycle shift mapping of the SSB index, the location of SSB m is fixed and the same independent of the LBT pass. For example, the SSB indexes are provisioned to start from 0 to 7, and repeat itself until the end of the measurement window. In this example, the BS may transmit the SSB2, SSB 3, SSB 4, SSB 5, SSB 6, and SSB 7 and fail to transmit the first two SSBs (SSB0 and SSB1) due to the late LBT pass. Accordingly, beam 0 and beam 1 are not transmitted.

If different SSBs are associated with different beams, the unequal transmission probability may favor some SSB beams while putting some other SSB beams at a disadvantage of being transmitted, which may affect the cell acquisition as well as the measurement. It may be desirable to avoid the unequal LBT impact on different SSB beams and further to avoid the unequal transmission properties of the SSBs. It may be desirable to balance the LBT impact to different SSB beams such that the transmission probability of all beams is about uniform.

The present application describes mechanisms for time-varying SSB transmissions in a shared frequency spectrum. For example, a BS may transmit a first set of SSBs during a first measurement window using a first set of beams based on a first beam pattern and transmitting a second set of SSBs during a second measurement window using a second set of beams based on a second beam pattern different from the first beam pattern. The beams may be mapped to SSB indexes across a plurality of measurement windows in such a way that the entire set of SSBs included in the discovery signal is transmitted. Additionally, the present application describes mechanisms for providing additional resources in which to transmit discovery signals. For example, a measurement window may be extended such that the BS may be able to transmit discovery signals during the extended measurement window.

Aspects of the present application can provide several benefits. For example, the beam pattern may vary with time and provide beams with a uniform probability of being transmitted. Because different measurement windows may have different beam patterns, the LBT impact can be evenly distributed across SSBs. Additionally, the BS may be provided with more opportunities to transmit discovery signals with the extended measurement windows. Moreover, the present disclosure provides techniques to avoid abandoning a TXOP if the transmission of discovery signals interrupts data transmission (e.g., UL data transmission).

Figure 3:
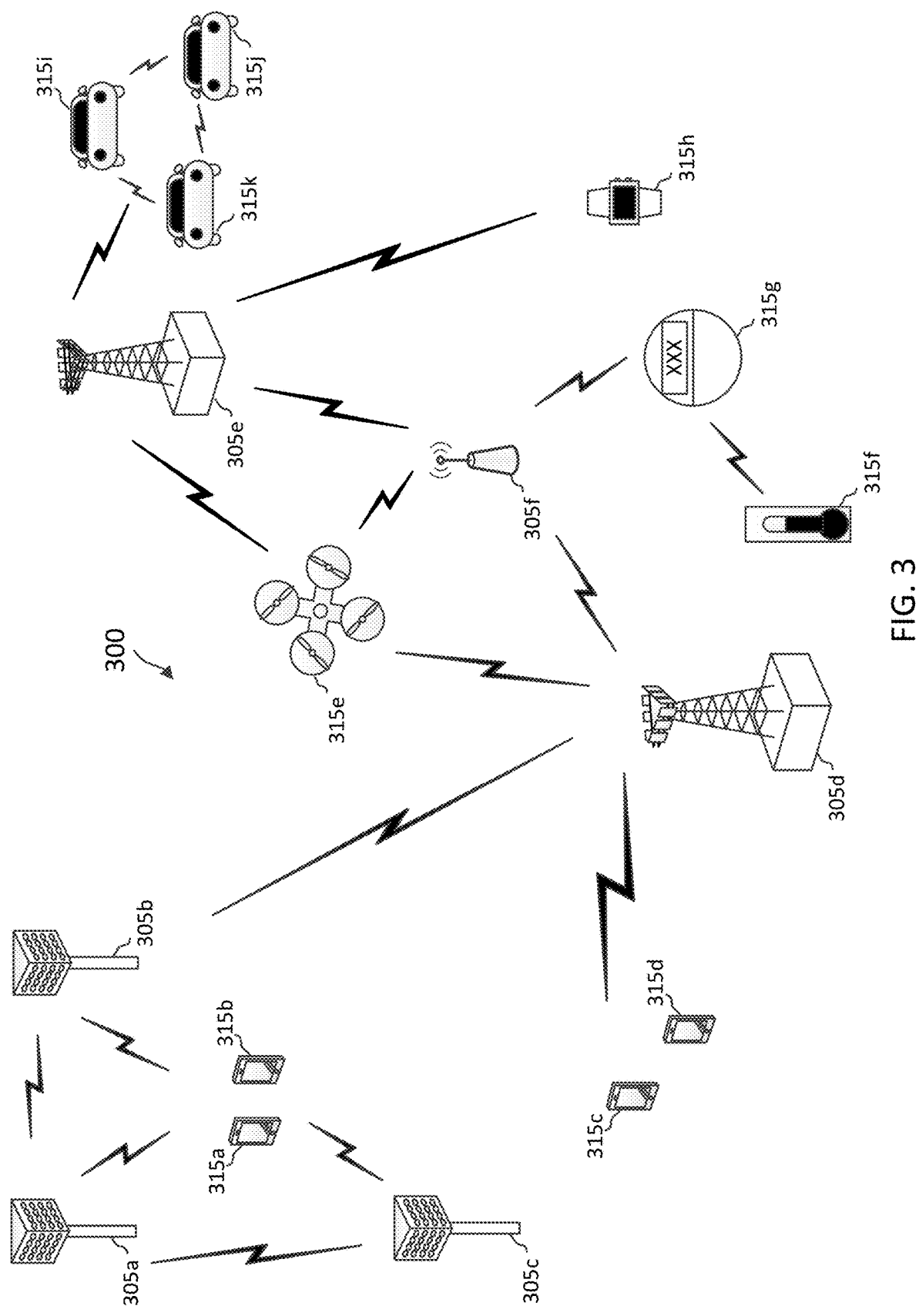
FIG. 3 illustrates a wireless communications network according to some embodiments of the present disclosure.

FIG. 3 illustrates a wireless communications network 300 according to some embodiments of the present disclosure. The network 300 may be a 5G network. The network 300 includes a number of base stations (BSs) 305 and other network entities. A BS 305 may be a station that communicates with UEs 315 and may also be referred to as an evolved node B (eNB), a next generation eNB (gNB), an access point, and the like. Each BS 305 may provide communication coverage for a particular geographic area. In 3GPP, the term "cell" can refer to this particular geographic coverage area of a BS 305 and/or a BS subsystem serving the coverage area, depending on the context in which the term is used.

A BS 305 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively s geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 3, the BSs 305*d* and 305*e* may be regular macro BSs, while the BSs 305*a*-305*c* may be macro BSs enabled with one of 3 dimension (3D), full dimension (FD), or massive Multiple Input-Multiple Output (MIMO). The BSs 305*a*-305*c* may take advantage of their higher dimension MIMO capabilities to exploit 3D beamforming in both elevation and azimuth beamforming to increase coverage and capacity. The BS 305*f* may be a small cell BS which may be a home node or portable access point. A BS 305 may support one or multiple (e.g., two, three, four, and the like) cells.

The network 300 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 315 are dispersed throughout the wireless network 300, and each UE 315 may be stationary or mobile. A UE 315 may also be referred to as a terminal, a mobile station, a subscriber unit, a station, or the like. A UE 315 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 315 may be a device that includes a Universal Integrated Circuit Card (UICC). In another aspect, a UE may be a device that does not include a UICC. In some aspects, the UEs 315 that do not include UICCs may also be referred to as internet of everything (IoE) devices. The UEs 315a-315d are examples of mobile smart phone-type devices accessing network 300. A UE 315 may also be a machine specifically configured for connected communication, including machine type communication (MTC), enhanced MTC (eMTC), narrowband IoT (NB-IoT) and the like. The UEs 315e-315k are examples of various machines configured for communication that access the network 300. A UE 315 may be able to communicate with any type of the BSs, whether macro BS, small cell, or the like. In FIG. 3, a lightning bolt (e.g., communication links) indicates wireless transmissions between a UE 315 and a serving BS 305, which is a BS designated to serve the UE 315 on the downlink (DL) and/or uplink (UL), or desired transmission between BSs, and backhaul transmissions between BSs.

In operation, the BSs 305a-305c may serve the UEs 315a and 315b using 3D beamforming and coordinated spatial techniques, such as coordinated multipoint (CoMP) or multi-connectivity. The macro BS 305d may perform backhaul communications with the BSs 305a-305c, as well as small cell, the BS 305f. The macro BS 305d may also transmit multicast services which are subscribed to and received by the UEs 315c and 315d. Such multicast services may include mobile television or stream video, or may include other services for providing community information, such as weather emergencies or alerts, such as Amber alerts or gray alerts.

The network 300 may also support mission critical communications with ultra-reliable and redundant links for mission critical devices, such as the UE 315e, which may be a drone. Redundant communication links with the UE 315e may include links from the macro BSs 305d and 305e, as well as links from the small cell BS 305f. Other machine type devices, such as the UE 315f (e.g., a thermometer), the UE 315g (e.g., smart meter), and UE 315h (e.g., wearable device) may communicate through the network 300 either directly with BSs, such as the small cell BS 305f, and the macro BS 305e, or in multi-hop configurations by communicating with another user device which relays its information to the network, such as the UE 315f communicating temperature measurement information to the smart meter, the UE 315g, which is then reported to the network through the small cell BS 305f. The network 300 may also provide additional network efficiency through dynamic, low-latency TDD/frequency-division duplexing (FDD) communications, such as in a vehicle-to-vehicle (V2V) communication.

In some implementations, the network 300 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of transmission time intervals (TTIs) may be scalable.

In an embodiment, the BSs 305 can assign or schedule transmission resources (e.g., in the form of time-frequency resource blocks (RB)) for DL and UL transmissions in the network 300. DL refers to the transmission direction from a BS 305 to a UE 315, whereas UL refers to the transmission direction from a UE 315 to a BS 305. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a time-division duplexing (TDD) mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 305 and the UEs 315. For example, a reference signal can have a particular pilot pattern or structure, where pilot tones may span across an operational BW or frequency band, each positioned at a pre-defined time and a pre-defined frequency. For example, a BS 305 may transmit cell specific reference signals (CRSs) and/or channel state information—reference signals (CSI-RSs) to enable a UE 315 to estimate a DL channel. Similarly, a UE 315 may transmit sounding reference signals (SRSs) to enable a BS 305 to estimate a UL channel. Control information may include resource assignments and protocol controls. Data may include protocol data and/or operational data. In some embodiments, the BSs 305 and the UEs 315 may communicate using self-contained subframes. A self-contained subframe may include a portion for DL communication and a portion for UL communication. A self-contained subframe can be DL-centric or UL-centric. A DL-centric subframe may include a longer duration for DL communication than UL communication. A UL-centric subframe may include a longer duration for UL communication than DL communication.

In an embodiment, a UE 315 attempting to access the network 300 may perform an initial cell search by detecting a primary synchronization signal (PSS) from a BS 305. The PSS may enable synchronization of period timing and may indicate a physical layer identity value. The UE 315 may then receive a secondary synchronization signal (SSS). The SSS may enable radio frame synchronization, and may provide a cell identity (ID) value, which may be combined with the physical layer identity value to identify the cell. The SSS may also enable detection of a duplexing mode and a cyclic prefix length. Both the PSS and the SSS may be located in a central portion of a carrier, respectively.

After receiving the PSS and SSS, the UE 315 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 315 may receive one or more system information blocks (SIBs). For example, SIB1 may contain cell access parameters and scheduling information for other SIBs. Decoding SIB1 may enable the UE 315 to receive SIB2. SIB2 may contain radio resource configuration (RRC) configuration information related to random access channel (RACH) procedures, paging, physical uplink control channel (PUCCH), physical uplink shared channel (PUSCH), power control, SRS, and cell barring. After obtaining the MIB and/or the SIBs, the UE 315 can perform random access procedures to establish a connection with the BS 305. After establishing the connection, the UE 315 and the BS 305 can enter a normal operation stage, where operational data may be exchanged.

In an embodiment, the network 300 may operate over a shared channel, which may include a licensed spectrum, a shared spectrum, and/or an unlicensed spectrum, and may support dynamic medium sharing. In an embodiment, the shared channel may be located at frequencies of about 5-6 GHz or above 6 GHz. When a BS 305 operates at a high-frequency range, the BSs 305 may communicate with the UEs 315 using narrow directional beams to overcome the high path-loss in the high-frequency range. For example, the BS 305 may transmit discovery signals, such as PSSs, SSSs, PBCH signals, and/or other discovery reference signals, using directional beams. The BS 305 may sweep the directional beams in multiple directions for the discovery signal transmissions to allow UEs 315 located in different directions with respect to the BS 305 to search and synchronize to the BS 305. In order to avoid collisions with transmissions from other BSs 305 and/or other UEs 315, the BS 305 may perform LBT prior to transmitting the discovery signals.

If a discovery signal transmission is truncated due to reaching an end of a first measurement window (e.g., due to an LBT pass at a later time of the first measurement window), it may be desirable to transmit during a second measurement window, those SSBs that were not transmitted during the first measurement window. The second measurement window may be the next measurement window immediately succeeding the first measurement window. Additionally, the BS may use different beam patterns in the first and second measurement windows to increase the likelihood of those earlier dropped SSBs being transmitted in the second measurement window. Mechanisms for communicating sets of SSBs during a plurality of measurement windows using sets of beams based on different beam patterns are described in greater detail herein.

Figure 4:
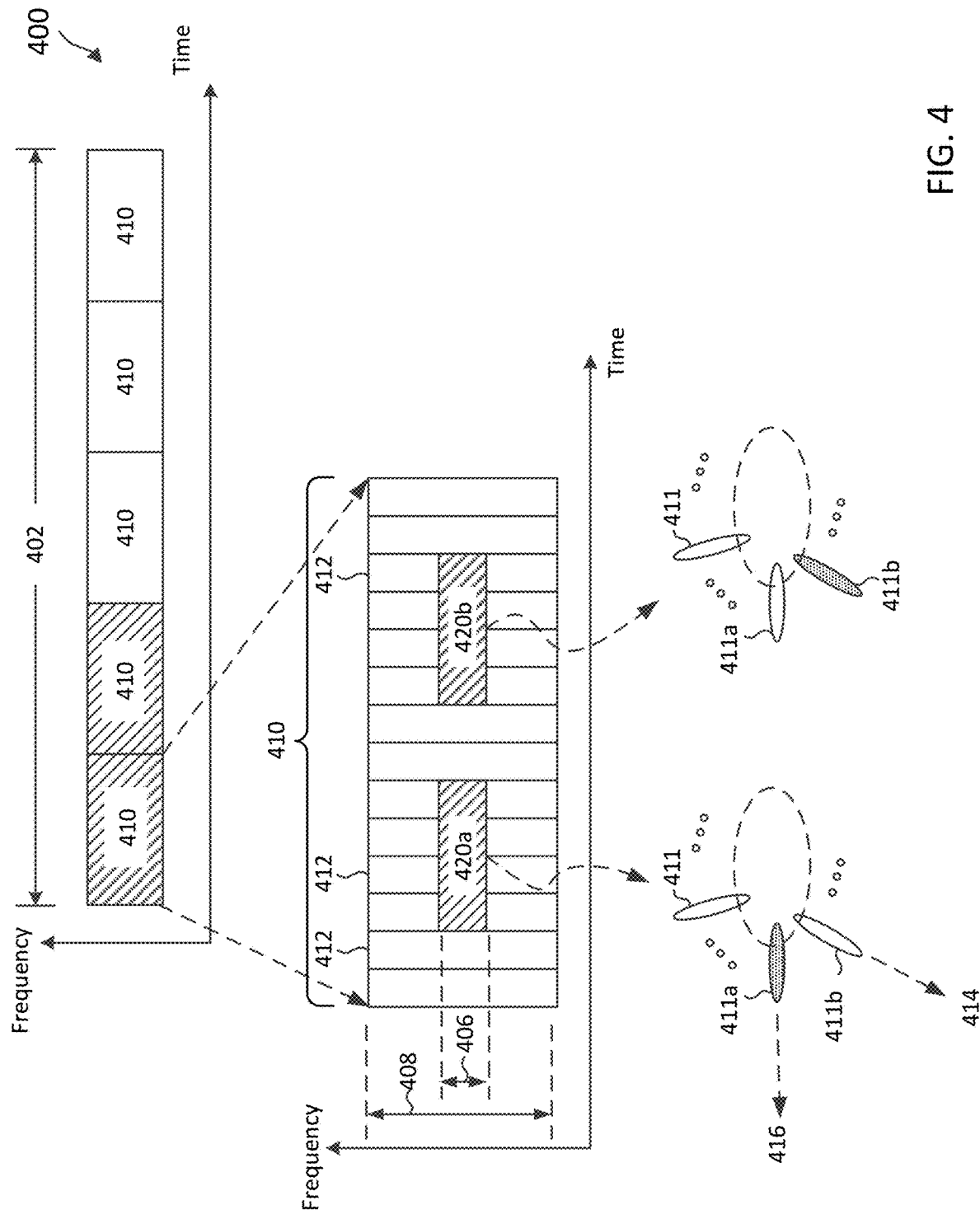
FIG. 4 illustrates a discovery signal transmission scheme for transmitting discovery signals in units of synchronization signal blocks (SSBs) according to embodiments of the present disclosure.

FIG. 4 illustrates a discovery signal transmission scheme 400 for transmitting discovery signals in units of SSBs according to embodiments of the present disclosure. The x-axis represents time in some constant units, and the y-axis represents frequency in some constant units. The scheme 400 may be employed by BSs such as the BSs 305 in a network such as the network 300. The scheme 400 illustrates a plurality of transmission slots 410 in a frequency band 408 over a measurement window 402. Each transmission slot 410 includes a plurality of symbols 412. The frequency band 408 may be located at frequencies of about sub-6 GHz or above 6 GHz. In some embodiments, the frequency band 408 may be in an unlicensed spectrum or a shared spectrum. A transmission slot 410 may correspond to a subframe or a slot within a subframe. A symbol 412 may correspond to an OFDM symbol. A BS may communicate with a UE such as the UEs 315 in the transmission slots 410.

The BS may transmit the SSBs 420 over a frequency band 406. The transmissions are represented by pattern filled boxes. In an embodiment, the frequency band 408 may correspond to a system bandwidth of a network and the frequency band 406 may have a substantially smaller bandwidth than the system bandwidth and may be located within the frequency band 408. The transmissions of the SSBs 420 in the narrower frequency band 406 allow a UE to synchronize to the network by operating in a smaller bandwidth than the system bandwidth, thereby reducing UE implementation complexity.

During cell acquisition, a BS may perform discovery signal transmission by transmitting one or more synchronization signal (SS or SYNC signals) blocks in a SS burst transmission. The SS burst may include a number of SSBs, each SSB transmitted over a given beam. Information may be kept substantially similar and consistent through all SS blocks (SSBs) in a SS burst set. Each SSB may carry information including a PSS, a SSS, a PBCH signal, a cell ID for the SSB, a current beam index, a measurement window timing, and/or any discovery related reference signals. The measurement window timing indicates the start of the measurement window for the SS burst set containing the SS. The BS may transmit discovery signals in SSBs using different transmission beams to a UE, and the UE may receive the transmissions. The BS may maintain a predetermined number of beams or transmit a predetermined number of beams for one SS burst. The BS may transmit a SSB in each beam direction. In some examples, the SSB includes information transmitted to the UE, for the purpose of synchronization along each direction.

The BS may transmit SSBs 420 in one or more of transmission slots 410 during the measurement window 402, which may include any suitable amount of time. In an example, the measurement window 402 is a DMTC window. In some instances, the measurement window 402 may be repeated at a predetermined periodicity (e.g., at about 5 ms, 10 ms, 20 ms, 40 ms, 80 ms, or 100 ms), where a BS may periodically transmit the SSBs 420.

The number of transmission slots 410 within the measurement window 402 may vary depending on the subcarrier spacing (SCS) and the number of symbols 412 within a transmission slot 410. In an embodiment, each transmission slot 410 may include about fourteen symbols 412. When the SCS is about 15 kilohertz (kHz), each transmission slot 410 may span about 1 ms and the measurement window 402 may include about five transmission slots 410. When the SCS is about 30 kHz, each transmission slot 410 may span about 0.5 ms and the measurement window 402 may include about ten transmission slots 410. When the SCS is about 120 kHz, each transmission slot 410 may span about 0.125 ms and the measurement window 402 may include about forty transmission slots 410. When the SCS is about 240 kHz, each transmission slot 410 may span about 62.5 microseconds (μs) and the measurement window 402 may include about eighty transmission slots 410.

In the scheme 400, a BS may transmit L number of SSBs 420 during the measurement window 402, where L is a positive integer. Each SSB 420 may span about four symbols 412. Thus, each transmission slot 410 may include a maximum of about two SSBs 420. As shown, a SSB 420a may be transmitted in the third, fourth, fifth, sixth symbols 412 of a transmission slot 410 and another SSB 420b may transmitted in the ninth, tenth, eleventh, and twelve symbols 412 of the transmission slot 410. In some other embodiments, the two SSBs 420a and 420b may be transmitted during other symbols 412 within the transmission slot 410. L may have a value of about 4, 8, or 64 depending on the SCS and the measurement window 402. In an embodiment, L may be about 4 or 8 for a SCS of about 15 kHz or about 30 kHz. When L is 4, a BS may transmit four SSBs 420 in two transmission slots 410 within the measurement window 402. In some instances, the BS may transmit the SSBs 420 in consecutive transmission slots 410. When L is 8, a BS may transmit eight SSBs 420 in four transmission slots 410 (e.g., consecutively) within the measurement window 402. In an embodiment, L may be about 64 for a SCS of about 120 kHz or about 240 kHz. Thus, a BS may transmit sixty-four SSBs 420 in about thirty-two transmission slots 410 within the measurement window 402. In some instances, the BS may transmit the SSBs 420 in groups of eight SSBs 420 over four transmission slots 410 and the groups may be separated by one transmission slot 410.

In an embodiment, a BS may transmit SSBs 420 in different beam directions during the measurement window 402. For example, the BS may include an array of antenna elements and may configure the array of antenna elements to form a transmission beam 411 in a certain direction. The terms "transmission beam" and "beam" may be used interchangeably in the present disclosure. Transmission beams 411a and 411b have different patterns. As an example, the BS may transmit the SSB 420a over a transmission beam 411a (e.g., shown as pattern-filled) directing towards a direction 416 and may transmit the SSB 420b over another transmission beam 411b (e.g., shown as pattern-filled) directing towards a direction 414.

The BS may perform permutations of beam-to-SSB index mappings. Each beam mapping to a measurement window corresponds to a permutation, and the BS transmits SSBs using a different permutation of beams for different measurement windows. The beam pattern may vary with time and provide beams with a uniform probability of being transmitted. In an example, the beam pattern is a function of the SFN of the radio frame in which the SSBs are transmitted. After the UE acquires the PBCH, the UE may obtain the beam pattern based on system timing indicated in the PBCH for subsequent processing. The PBCH may contain the current beam index. Accordingly, the PBCH content may be slightly different across SSBs. If the PBCH content is slightly different, joint decoding of PBCH across SSBs and across different measurement windows may be more difficult. Accordingly, it may be desirable to avoid including the beam index in the PBCH. It may also be desirable to avoid having the SSB index mapping change over time because PBCH contains the SSB index. Because different measurement windows may have different beam patterns, the LBT impact can be evenly distributed across SSBs. In another example, the beam pattern is a function of the cell ID. Different cells may have different time varying beam patterns, which may allow for better interference diversity when SSBs of multiple cells are transmitted at the same time.

Figure 5:
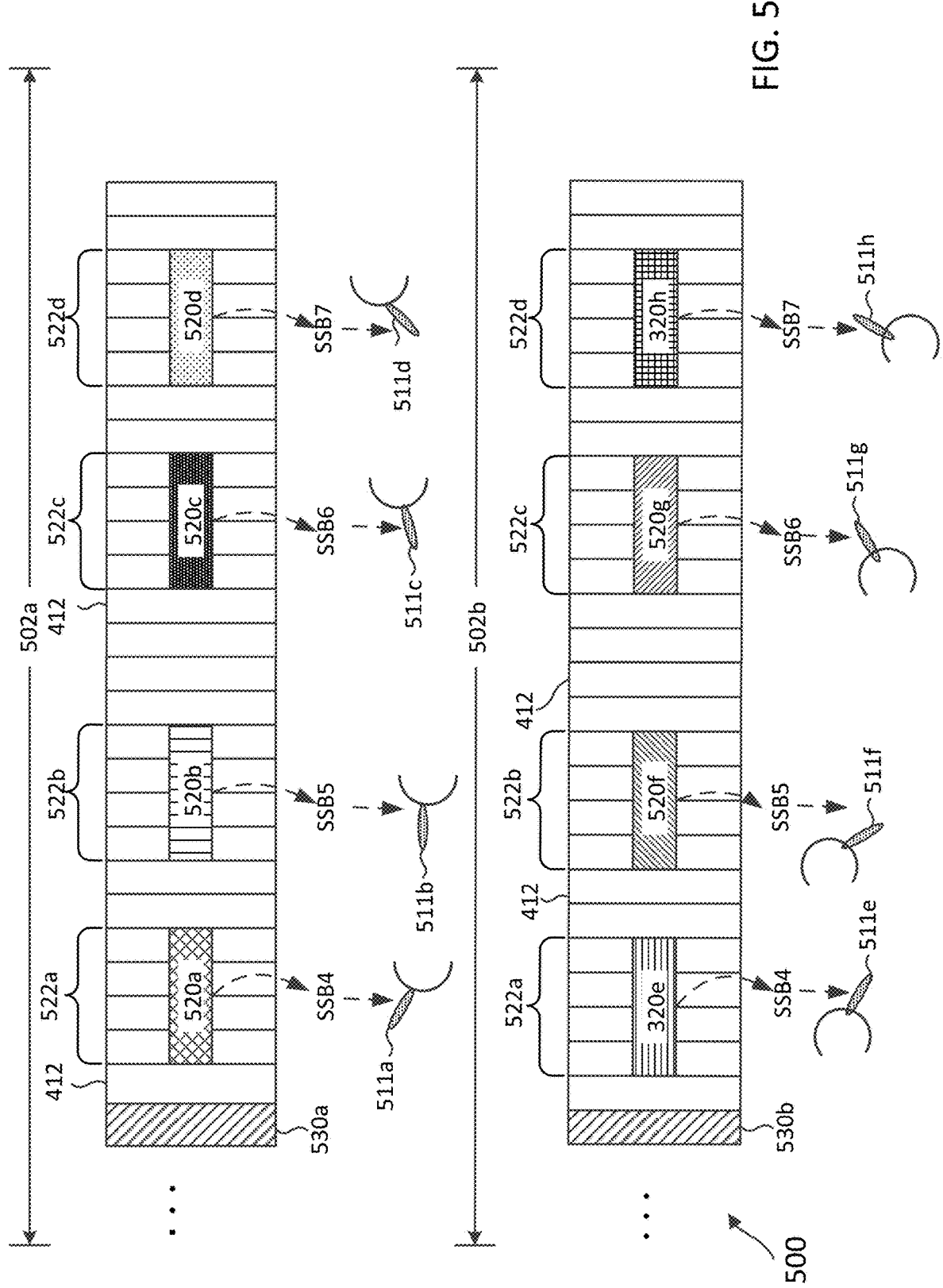
FIG. 5 illustrates a discovery signal transmission scheme having different beam-to-SSB index mappings across measurement windows according to embodiments of the present disclosure.

FIG. 5 illustrates a discovery signal transmission scheme 500 having different beam-to-SSB index mappings across measurement windows according to embodiments of the present disclosure. The scheme 500 may have a substantially similar transmission slot configuration as in the scheme 400. The scheme 500 may be employed by BSs such as the BSs 305 in a network such as the network 300. The BS may transmit a first set of SSBs 520a-520d during a first measurement window 502a using a first set of transmission beams 511a-511d and transmit a second set of SSBs 520e-520h during a second measurement window 502b using a second set of transmission beams 511e-511h, where the first and second beam patterns are different. The beam mapping may change with each subsequent measurement window. Additionally, in the case when the BS is operating on a shared or unlicensed spectrum, the BS may perform a LBT procedure prior to transmitting one or more SS blocks. The BS may be configured to perform LBT 530a, 530b before accessing the channel. For example, the BS performs an LBT before the start of the measurement window 502a and before the start of the measurement window 502b. As will be explained further below, the scheme 500 may mitigate the unequal LBT transmission impact on different SSB beams by providing time-dependent SSB beam patterns.

Each SSB 520 is associated with a SSB index 522, and the transmission beams are not dependent on the SSB index. In the other words, the mapping or association between a beam direction and a particular SSB index is not fixed. In the discussion related to FIG. 5, L is 8 and the SSBs are transmitted with a cyclic shift mapping of the SSB indexes. Although L is 8, it should be understood that in other examples, L may be less than or greater than 8. The SSB indexes are provisioned to start from 0 to 7, and to repeat itself until the end of the measurement window. Accordingly, the location of SSB m is fixed and the same independent of the LBT pass. The SSB indexes are consistent across the measurement windows 502a and 502b. Use of the cyclic shift mapping may avoid confusing the UE about system timing recovered from the SSB index. For ease of reference, P1 may refer to a first beam pattern, and P2 may refer to a second beam pattern different from the first beam pattern. In the discussion related to FIG. 5, P1 corresponds to the measurement window 502a and is b0, b1, b2, b3, b4, b5, b6, and b7, and P2 corresponds to the measurement window 502b and is b4, b5, b6, b7, b0, b1, b2, and b3.

The BS transmits SSBs 520a-520d during the measurement window 502a. The transmissions are represented by pattern filled boxes. Different patterns in a box represent different transmission beams, and the same pattern represents the same transmission beam. SSB 520a corresponds to a SSB index 522a "4" (e.g., SSB4), SSB 520b corresponds to a SSB index 522b "5" (e.g., SSB5), SSB 520c corresponds to a SSB index 522c "6" (e.g., SSB6), and SSB 520d corresponds to a SSB index 522d "7" (e.g., SSB7). The BS may intend to transmit eight beams in the order corresponding to the beam indexes 0, 1, 2, 3, 4, 5, 6, and 7, but due to a late LBT pass 530a, 530b in the measurement window 502a, the BS transmits only four beams (e.g., the last four intended beams). In other words, during the measurement window 502a, the four SSBs (not shown) that preceded SSB 520a are not transmitted and the transmission begins with SSB 520a and continues to SSB 520d. The SSB 520a uses a transmission beam 511a corresponding to a beam index 4 (e.g., b4), the SSB 520b uses a transmission beam 511b corresponding to a beam index 5 (e.g., b5), the SSB 520c uses a transmission beam 511c corresponding to a beam index 6 (e.g., b6), and the SSB 520d uses a transmission beam 511d corresponding to a beam index 7 (e.g., b7). In other words, for the discovery signal transmission during the measurement window 502a, b4 is mapped to SSB4, b5 is mapped to SSB5, b6 is mapped to SSB6, and b7 is mapped to SSB7. Additionally, b0 is mapped to SSB 0, b1 is mapped to SSB1, b2 is mapped to SSB2, and b3 is mapped to SSB3, and b0, b1, b2, and b3 (not shown) are not used during the measurement window 502a.

The BS transmits SSBs 520e-520h during the measurement window 502b. In an example, the measurement window 502*b* immediately succeeds the measurement window 502*a*. The measurement window 502*b* immediately succeeds the measurement window 502*a* if no measurement window is located between them. SSB 520*e* corresponds to the SSB index 522*a* "4" (e.g., SSB4), SSB 520*f* corresponds to the SSB index 522*b* "5" (e.g., SSB5), SSB 520*g* corresponds to the SSB index 522*c* "6" (e.g., SSB6), and SSB 520*h* corresponds to the SSB index 522*d* "7" (e.g., SSB7). The SSBs transmitted during the measurement window 502*b* correspond to the same SSB indexes, respectively, as those transmitted during the measurement window 502*a*. The measurement window 502*b* corresponds to a different beam mapping than measurement window 502*a*. The BS may intend to transmit eight beams in the order corresponding to the beam indexes 4, 5, 6, 7, 0, 1, 2, and 3. In this example, due to a late LBT pass 530*c*, 530*d* in the measurement window 502*b*, the BS transmits only four beams (e.g., the last four intended beams). In other words, during the measurement window 502*b*, the four SSBs (not shown) that preceded SSB 520*e* are not transmitted and the transmission begins with SSB 520*e* and continues to SSB 520*h*.

The SSB 520*e* uses a transmission beam 511*e* corresponding to a beam index 0 (e.g., b0), the SSB 520*f* uses a transmission beam 511*f* corresponding to a beam index 1 (e.g., b1), the SSB 520*g* uses a transmission beam 511*g* corresponding to a beam index 2 (e.g., b2), and the SSB 520*h* uses a transmission beam 511*h* corresponding to a beam index 3 (e.g., b3). In other words, for the discovery signal transmission during the measurement window 502*b*, b0 is mapped to SSB4, b1 is mapped to SSB5, b2 is mapped to SSB6, and b3 is mapped to SSB7. Additionally, b4 is mapped to SSB 0, b5 is mapped to SSB1, b6 is mapped to SSB2, and b7 is mapped to SSB3, and b4, b5, b6, and b7 are not used during the measurement window 502*b* (not shown). The four beams that were not transmitted during the measurement window 502*a* (e.g., b0, b1, b2, and b3) are transmitted during the measurement window 502*b*. Accordingly, all eight beams are used across the measurement windows 502*a* and 502*b*.

When the UE initially connects to the network, the UE may be unaware of how many SSBs have been transmitted. In some examples, the BS may transmit fewer than the allowed maximum number of SSBs (L) during the measurement window for various reasons. For example, although L is 8, the BS may have only four beams to transmit. Accordingly, the BS may transmit only four SSBs. The UE may combine the SSB transmissions across SFNs for improved performance. It may be difficult, however, to define a SFN dependent only permutation without the knowledge of how many SSBs were transmitted within the measurement window. Moreover, because the UE does not know how many SSBs have been transmitted, it may be difficult for the UE to combine the SSBs across the measurement windows.

It may be desirable for the UE to assume that the maximum number of allowed SSBs have been transmitted (e.g., eight SSBs), even if fewer SSBs were actually transmitted. The beam-to-SSB index mapping may be performed assuming L SSBs for permutations, so that it may be unnecessary for the UE to know the number of SSBs transmitted to determine how to combine SSBs across different measurement windows. In other words, the permutations of the beam-to-SSB index mappings may be designed to assume that L, the maximum number of SSBs allowed for that frequency band are transmitted, even if fewer SSBs were actually transmitted. In some examples, the BS may define the SFN and/or cell ID dependent permutation for the L length permutation mapping of transmission beams. In an example, the BS applies a permutation as a function of SFN to determine the first and second beam patterns. In another example, the BS applies a permutation as a function of cell ID to determine the first and second beam patterns.

Figure 6:
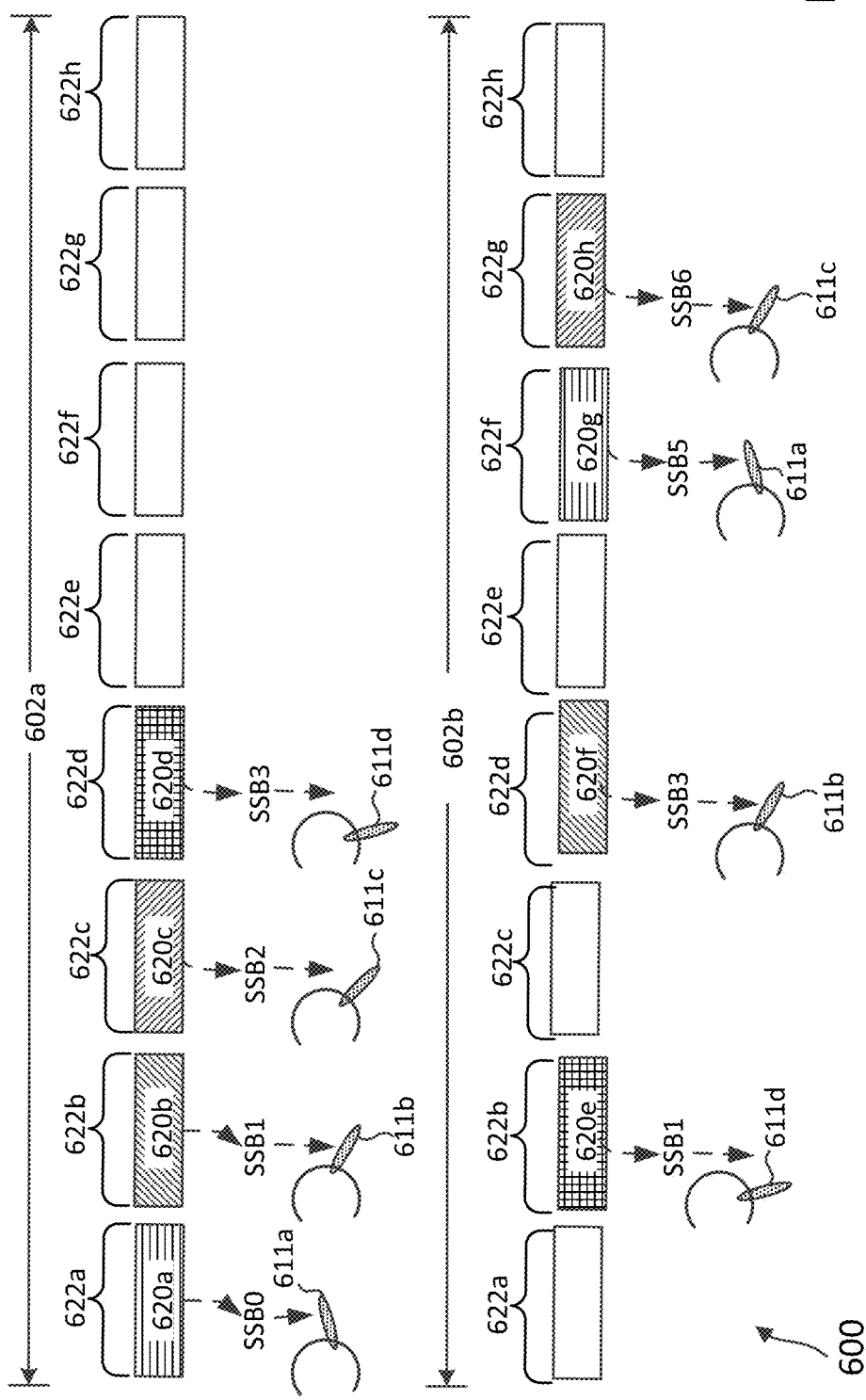
FIG. 6 illustrates a discovery signal transmission scheme in which fewer than L SSBs are transmitted according to embodiments of the present disclosure.

FIG. 6 illustrates a discovery signal transmission scheme 600 in which fewer than L SSBs are transmitted according to embodiments of the present disclosure. The scheme 600 may have a substantially similar transmission slot configuration as in the scheme 400. The scheme 600 may be employed by BSs such as the BSs 305 in a network such as the network 500. The BS may transmit a first set of SSBs 620*a*-620*d* during a first measurement window 602*a* using a first set of transmission beams 611*a*-611*d* based on a first beam pattern (P1) and transmit a second set of SSBs 620*e*-620*h* during a second measurement window 602*b* using a second set of transmission beams 611*a*-611*d* based on a second beam pattern (P2), where the first and second beam patterns are different. The beam mapping may change with each subsequent measurement window. As will be explained further below, the beam pattern P1 is b0, b1, b2, b3, z, z, z, z and the beam pattern P2 is z, b3, z, b1, z, b0, b2, z, where z represents a zero-power beam.

Each SSB 620 is associated with a SSB index 622, and the transmission beams are not dependent on the SSB index. In the discussion related to FIG. 6, L is 8 and the SSBs are transmitted with a cyclic shift mapping of the SSB indexes. Although L is 8, it should be understood that in other examples, L may be less or greater than 8. In the discussion related to FIG. 6, P1 corresponds to the measurement window 602*a* and is b0, b1, b2, b3, z, z, z, z, and P2 corresponds to the measurement window 602*b* and is z, b3, z, b1, z, b0, b2, and z, where z represents a zero-power beam. From the UE perspective, the four beams b0, b1, b2, and b3 are used, and the unused beams (e.g., b4, b5, b6, and b7) are equivalent to a power of zero. In other words, the unused beams have no power. The UE may combine across different measurement windows the SSBs having the same beam pattern.

The beam patterns may vary with time. In an example, the beam pattern is based on a permutation as a function of the SFN or the cell ID. The BS transmits SSBs 620*a*-620*d* during the measurement window 602*a*. The transmissions are represented by pattern filled boxes. Different patterns in a box represent different transmission beams, and the same pattern represents the same transmission beam. SSB 620*a* corresponds to a SSB index 622*a* "0" (e.g., SSB0), SSB 620*b* corresponds to a SSB index 622*b* "1" (e.g., SSB1), SSB 620*c* corresponds to a SSB index 622*c* "2" (e.g., SSB2), and SSB 620*d* corresponds to a SSB index 622*d* "3" (e.g., SSB3). Additionally, a SSB index 622*e* is 4, SSB index 622*f* is 5, SSB index 622*g* is 6, and SSB index 622*h* is 7. The SSB 620*a* uses a transmission beam 611*a* corresponding to a beam index 0 (e.g., b0), the SSB 620*b* uses a transmission beam 611*b* corresponding to a beam index 1 (e.g., b1), the SSB 620*c* uses a transmission beam 611*c* corresponding to a beam index 2 (e.g., b2), and the SSB 620*d* uses a transmission beam 611*d* corresponding to a beam index 3 (e.g., b3). In other words, for the discovery signal transmission during the measurement window 602*a*, b0 is mapped to SSB0, b1 is mapped to SSB1, b2 is mapped to SSB2, and b3 is mapped to SSB3. Additionally, the last four beams b4, b5, b6, and b7 are mapped to SSBs that are not shown and not used during the measurement window 602*a*.

The BS transmits SSBs 620*e*-620*h* during the measurement window 602*b*. SSB 620*e* corresponds to the SSB index 622*b* (e.g., SSB1), SSB 620*f* corresponds to a SSB index

622d (e.g., SSB3), SSB 620g corresponds to the SSB index 622f (e.g., SSB5), and SSB 620h corresponds to the SSB index 622g (e.g., SSB6). The measurement window 602b corresponds to a different beam mapping than measurement window 602a. The SSB 620e uses a transmission beam 611d corresponding to the beam index 3 (e.g., b3), which is used in the transmission of the SSB 620d in the measurement window 602a. The SSB 620f uses the transmission beam 611b corresponding to the beam index 1 (e.g., b1), which is used in the transmission of the SSB 620b in the measurement window 602a. The SSB 620g uses the transmission beam 611a corresponding to the beam index 0 (e.g., b0), which is used in the transmission of the SSB 620a in the measurement window 602a. The SSB 620h uses the transmission beam 611c corresponding to the beam index 2 (e.g., b2) which is used in the transmission of the SSB 620c in the measurement window 602a. In other words, for the discovery signal transmission during the measurement window 602b, b3 is mapped to SSB1, b1 is mapped to SSB3, b0 is mapped to SSB5, and b2 is mapped to SSB6. Additionally, the other four beams b4, b5, b6, and b7 may be mapped to SSBs that are not shown and not used during the measurement window 602b.

Figure 7:
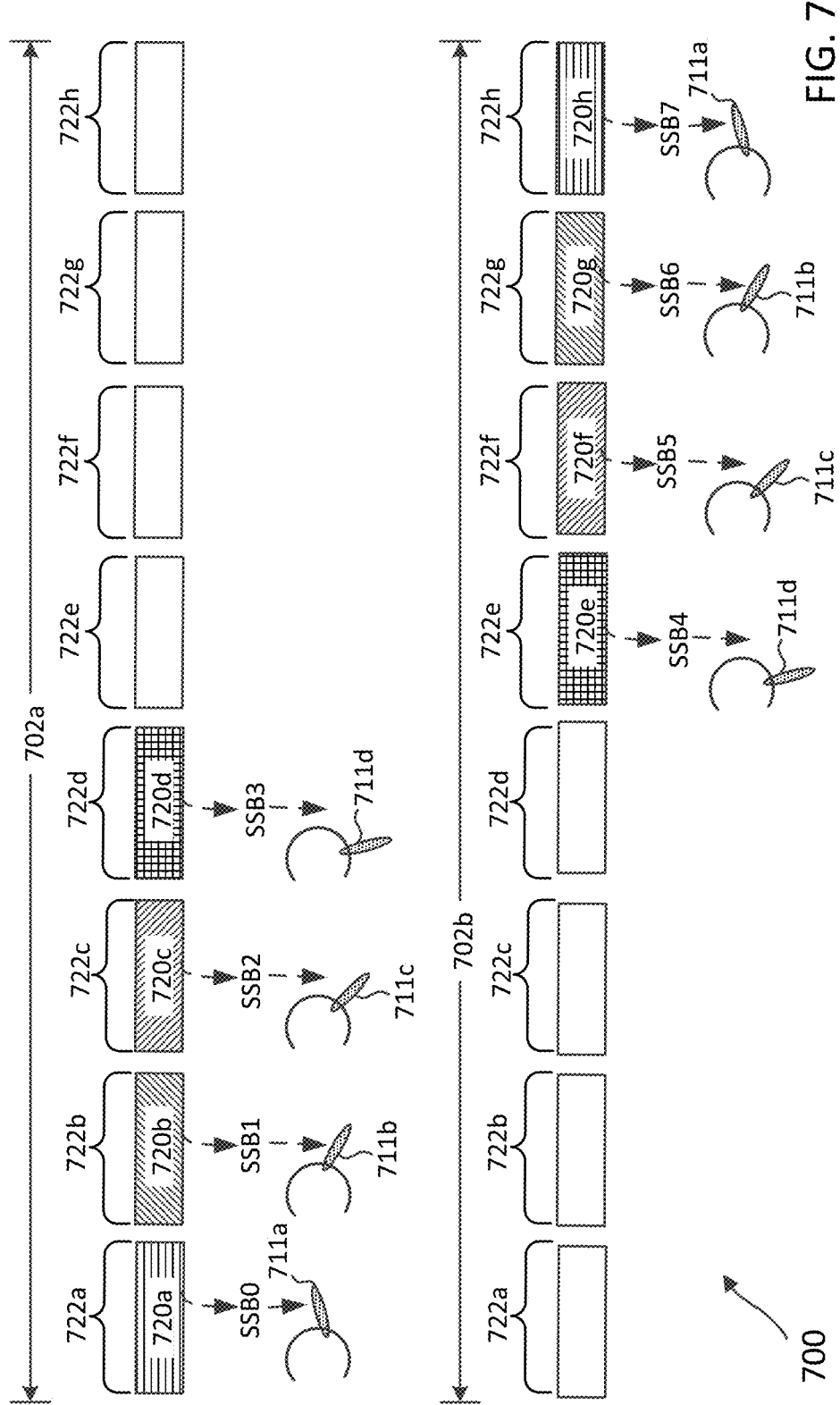
FIG. 7 illustrates a discovery signal transmission scheme in which two beam patterns have a reverse listing of beams according to embodiments of the present disclosure.

In the example illustrated in FIG. 6, the number of transmitted SSBs is less than L, and accordingly the permuted SSBs may not be continuous. It may be desirable for discovery signal transmissions to not have gaps in between the transmissions (e.g., gap corresponding to SSB index 622e-622h during measurement window 602a, gap in between SSB 1 and SSB 3 during measurement window 602b, gap in between SSB 3 and SSB 5 during measurement window 602b, etc.). The BS may fill the gaps by, for example, scheduling data in the gaps for transmission and/or reception. If the BS does not have data for transmission, the BS may perform LBT for the later transmission of discovery signals. In other words, the BS may perform an LBT before a SSB transmission when there is a gap with no transmission between a previous SSB transmission and a current SSB transmission In some examples, the BS may use a permutation that involves reversing the order of the used beams with respect to the L number of SSBs, with each subsequent measurement window. FIG. 7 illustrates a discovery signal transmission scheme 700 in which two beam patterns have a reverse listing of beams according to embodiments of the present disclosure. The scheme 700 may have a substantially similar transmission slot configuration as in the scheme 400. The scheme 700 may be employed by BSs such as the BSs 305 in a network such as the network 300. The BS may transmit a first set of SSBs 720a-720d during a first measurement window 702a using a first set of transmission beams 711a-711d based on a first beam pattern (P1) and transmit a second set of SSBs 720e-720h during a second measurement window 702b using a second set of transmission beams 711a-711d based on a second beam pattern (P1), where the first and second beam patterns are different.

Each SSB 720 is associated with a SSB index 722, and the transmission beams are not dependent on the SSB index. In the discussion related to FIG. 7, the BS transmits four beams, L is 8 and the SSBs are transmitted with a cyclic shift mapping of the SSB indexes. Although L is 8, it should be understood that in other examples, L may be less or greater than 8. The P1 corresponds to the measurement window 702a and is b0, b1, b2, b3, z, z, z, z, and P2 corresponds to the measurement window 702b and is z, z, z, z, b3, b2, b1, b0, z, z, z, z, where z represents a zero-power beam. In an example, for each current measurement window, the BS applies a reverse function to a current beam pattern applied in the current measurement window to determine a next beam pattern for a next measurement window. As will be explain further below, the beam pattern P1 is b0, b1, b2, b3, z, z, z, z and the beam pattern P2 is z, z, z, z, b3, b2, b1, b0.

The BS transmits SSBs 720a-720d during the measurement window 702a. The transmissions are represented by pattern filled boxes. Different patterns in a box represent different transmission beams, and the same pattern represents the same transmission beam. SSB 720a corresponds to a SSB index 722a "0" (e.g., SSB 0), SSB 720b corresponds to a SSB index 722b "1" (e.g., SSB1), SSB 720c corresponds to a SSB index 722c "2" (e.g., SSB2), and SSB 720d corresponds to a SSB index 722d "3" (e.g., SSB3). Additionally, a SSB index 722e is 4, a SSB index 722f is 5, a SSB index 722g is 6, and a SSB index 722h is 7. The SSB 720a uses a transmission beam 711a corresponding to a beam index 0 (e.g., b0), the SSB 720b uses a transmission beam 711b corresponding to a beam index 1 (e.g., b1), the SSB 720c uses a transmission beam 711c corresponding to a beam index 2 (e.g., b2), and the SSB 720d uses a transmission beam 711d corresponding to a beam index 3 (e.g., b3). In other words, for the discovery signal transmission during the measurement window 702a, b0 is mapped to SSB0, b1 is mapped to SSB1, b2 is mapped to SSB2, and b3 is mapped to SSB3. Additionally, the last four beams b4, b5, b6, and b7 are mapped to SSBs that are not shown and not used during the measurement window 702a.

The BS transmits SSBs 720e-720h during the measurement window 702b. SSB 720e corresponds to the SSB index 722e "4" (e.g., SSB4), SSB 720f corresponds to the SSB index 722f "5" (e.g., SSB5), SSB 720g corresponds to the SSB index 722g "6" (e.g., SSB6), and SSB 720h corresponds to the SSB index 722h "7" (e.g., SSB7). The measurement window 702b corresponds to a different beam mapping than measurement window 702a. The SSB 720e uses the transmission beam 711d (e.g., b3), which is used in the transmission of the SSB 720d in the measurement window 702a. The SSB 720f uses the transmission beam 711c (e.g., b2), which is used in the transmission of the SSB 720c in the measurement window 702a. The SSB 720g uses the transmission beam 711b (e.g., b1), which is used in the transmission of the SSB 720b in the measurement window 702a. The SSB 720h uses the transmission beam 711a (e.g., b0), which is used in the transmission of the SSB 720a in the measurement window 702a. In other words, for the discovery signal transmission during the measurement window 702b, b3 is mapped to SSB4, b2 is mapped to SSB5, b1 is mapped to SSB6, and b0 is mapped to SSB7. Additionally, the other four beams b4, b5, b6, and b7 may be mapped to SSBs that are not shown and not used during the measurement window 702b.

Accordingly, the BS transmits SSB0, SSB1, SSB2, and SSB3 during the measurement window 702a using b0, b1, b2, and b3, respectively, and transmits SSB4, SSB5, SSB6, and SSB7 during the measurement window 702b using b3, b2, b1, and b0, respectively. The beam permutation may be computed as a function of the SFN. The order in which the beams are transmitted during the measurement window 702a is reversed in the subsequent measurement window 702b. For example, the first beam pattern P1 (b0, b1, b2, and b3) is used in the measurement window 702a, and the second beam pattern P2 (b3, b1, b0, and b2) is used in the measurement window 702b, where P2 lists the ordered beams of P1 in reverse order. In some embodiments, a BS may apply any suitable combination of the permutation or reverse order mechanisms described above to generate beam patterns and beam-to-SSB mappings.

The BS may determine a current beam pattern to apply to a current measurement window based on a SSB burst transmission period and a SSB burst transmission pattern. The SSB burst transmission period may be configurable at the BS-side. In an example, the SSB burst transmission period is 5 ms, 10 ms, 20 ms, or 40 ms. In some examples, the BS subsamples a beam pattern corresponding to a first time period (e.g., 0-5 ms) and desires to repeat that same beam pattern for a second time period (e.g., starting 10-15 ms). In some examples, the beam pattern permutation resulting from the subsampling of the 5 ms transmission period may ensure uniform probability of all beams being transmitted across measurement windows. The UE, however, may not know the SSB burst transmission period. For example, for NR, the initial access may be 20 ms, and other periods may subsequently vary (e.g., 5 ms, 10 ms, 40 ms, 80 ms, 160 ms, etc.). For NR-unlicensed, similar periods may be used for accesses. The initial access in NR-unlicensed, however, may be larger than 20 ms. It may be desirable to determine a consistent beam pattern that increases the likelihood of all beams being transmitted, regardless of the SSB burst transmission period. An advantage of determining the consistent beam pattern may allow the UE to combine SSBs across measurement windows, even if the UE does not know the SSB burst transmission period.

In some examples, the BS defines a SSB burst transmission pattern assuming the shortest period (e.g., 5 ms) and down-sampling for longer periods. For ease of discussion, the down-sampling of beam patterns will be discussed relative to FIG. 7. It should be understood that different beam patterns from the ones illustrated in FIG. 7 or use of more than two different beam patterns are within the scope of the present disclosure. In the example illustrated in FIG. 7, for the first 5 ms, the BS transmits using a first beam pattern P1 (b0, b1, b2, and b3) in the measurement window 702a and transmits using a second beam pattern P2 (b3, b1, b0, and b2) during the measurement window 702b.

In some examples, the SSB burst transmission pattern includes flipping the beam pattern with each subsequent measurement window. In other words, the BS determines the beam pattern to use by switching between beam patterns P1, P2, P1, P2, and repeats, for each subsequent measurement window. In this example, the BS uses a first set of transmission beams based on P1 for the first 5 ms, uses a second set of transmission beams based on P2 for the next 5 ms (e.g., 5-10 ms), uses a third set of transmission beams based on P1 for the next 5 ms (e.g., 10-15 ms), and so on. In an example, for a notation "Ap," a first beam pattern P1 is applied starting at a time (p*5 ms) when p is an even number, and a second beam pattern P2 is applied starting at a time (p*5 ms) when p is an odd number. In this example, the beam pattern applied is flipped at every p ms. By switching beam patterns for each subsequent measurement window, if the SSB burst transmission period is 10 ms, the BS may apply the following beam patterns for each subsequent measurement window: A0, A2, A4, A6, and so on. In another example, if the SSB burst transmission period is 20 ms, the BS may apply the following beam patterns for each subsequent measurement window: A0, A4, A8, and so on. In another example, if the SSB burst transmission period is 40 ms, the BS may apply the following beam patterns for each subsequent measurement window: A0, A8, A16, and so on. For some p values that are multiples of 10 (e.g., p is 10, 20, 40, etc.), the way in which the SSB transmission is defined may provide the use of only one of the two beam patterns. Accordingly, if the subsampling of the beam pattern used in the SSB transmission time period of 5 ms is applied to the beam pattern of 10 ms, 20 ms, and so on, either P1 or P2 (but not both) may be used and continually repeated.

In another example, to ensure that both beam patterns P1 and P2 are used, the BS may apply the SSB burst transmission pattern P1, P2, P2, P1, and P1, P2, P2, P1, and repeats, for each subsequent measurement window. In other words, the BS uses a first set of transmission beams based on P1 for the first 5 ms, uses a second set of transmission beams based on P2 for the next 5 ms (e.g., 5-10 ms), uses a third set of transmission beams based on P2 for the next 5 ms (e.g., 10-15 ms), and uses a fourth set of transmission beams based on P1 for the next 5 ms (e.g., 15-20 ms), uses a fifth set of transmission beams based on P1 for the next 5 ms, uses a sixth set of transmission beams based on P2 for the next 5 ms, uses a seventh set of transmission beams based on P2 for the next 5 ms, and uses an eighth set of transmission beams based on P1 for the next 5 ms, and so on. In this example, if the UE were monitoring SSBs that are 10 ms apart, the UE may observe a pattern P1 during the time period 0 to 5 ms, P2 during the time period 10 to 15 ms, P0 during the time period 20 to 25 ms, and so on. Hence the UE observes both beam patterns P1 and P2. In the same example, however, if the UE were monitoring SSBs that are 20 ms apart, the UE may observe a pattern P0 during the time period 0 to 5 ms, and then P0 again during the 20 ms to 25 ms window. Thus, the UE may not observe all beam patterns equally. In another example, to ensure that both beam patterns P1 and P2 are used, the BS may apply the SSB burst transmission pattern P1, P2, P2, P1, and P2, P1, P1, P2, and repeats, for each subsequent measurement window. The SSB burst transmission pattern P1, P2, P2, P1, and P2, P1, P1, P2, and repeat, may be used, for example, for 20 ms SSB burst transmissions. With this pattern, if the UE were monitoring SSBs at 10 ms periods or 20 ms periods, the UE may continue to observe both patterns an equal number of times over a threshold period of time (e.g., a long enough period of time). In some examples, to ensure that both beam patterns P1 and P2 are used for even larger periods, the BS determines the beam pattern to use by applying the following equation: $A2^n, \ldots, A(2^{2n-1}) = 1 - (A0), \ldots, 1 - A(2^{n-1})$. The run length of the first or second beam pattern may be a maximum of two.

In an example, a first beam-to-SSB index mapping for measurement windows sent with a first time period is obtained by subsampling a second beam-to-SSB index mapping for measurement windows sent with a second time period shorter than the first time period, the subsampling factor being equal to the ratio of the first time period to the second time period. In another example, the first measurement window 702a is communicated before the second measurement window 702b and has a shorter duration than the second measurement window 702. The BS may subsample the first beam pattern to determine the second beam pattern, where the subsampling factor is equal to the ratio of a duration of the second measurement window 702b to a duration of the first measurement window 702a.

In an embodiment, the network 300 may operate over a shared channel, which may include a licensed spectrum, a shared spectrum, and/or an unlicensed spectrum, and may support dynamic medium sharing. LBT is a channel access scheme that may be used in the shared medium, and the BS and UE may perform a LBT before each transmission. A BS or a UE may reserve a transmission opportunity (TXOP) in the shared channel by transmitting a reservation signal prior to transmitting data in the TXOP. Other BSs and/or other UEs may listen to the channel and refrain from accessing the channel during the TXOP upon detection of the reservation signal. One or more LBT modes may be selected from a plurality of LBT modes. A LBT mode may be, for example, a category 4 LBT, category 2 LBT, or "no LBT." A category 2 LBT refers to a LBT without a random backoff period. A category 4 LBT refers to a LBT with a random backoff and a variable contention window (CW). A "no LBT" allows the network operating entity priority to transmit on the channel without sensing whether an entity is using the channel. If the BS performs a category 4 LBT and it results in a pass, the BS gains access to the shared medium and may transmit DL and/or schedule or receive UL data. Additionally, the UE performs a category 2 LBT and transmits UL data after the LBT pass.

During a measurement window, the BS may transmit a discovery signal starting at transmission slot 0. If the BS is unable to gain access to the shared medium to transmit the discovery signal, the BS may transmit the discovery signal from a later slot within the measurement window provided that the BS obtains the medium through category 2 LBT. The measurement window may be limited because a special LBT allowance may be made for discovery signal transmissions. It may be desirable to provide more opportunities for the BS to transmit discovery signals.

Figure 8:
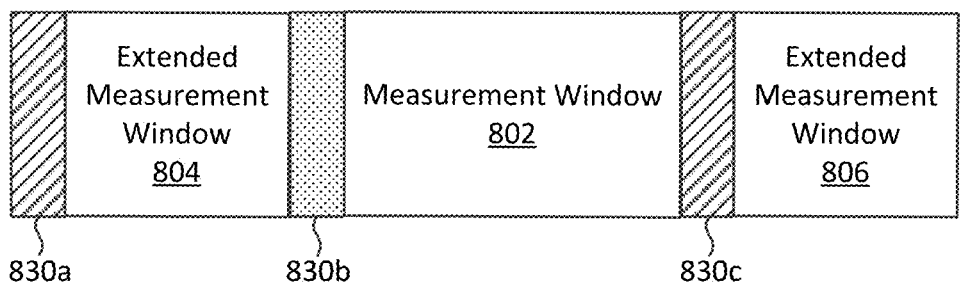
FIG. 8 illustrates a discovery signal transmission scheme having extended measurement windows according to embodiments of the present disclosure.

FIG. 8 illustrates a discovery signal transmission scheme 800 having extended measurement windows according to embodiments of the present disclosure. The BS may transmit discovery signals during a measurement window 802. In some examples, the BS transmits an extended measurement window configuration indicating an extended measurement window 804, 806 with a first LBT type 830a, 830c and a measurement window 806 with a second LBT type 830b. The LBT types are represented by pattern filled boxes. Different patterns in a box represent different LBT types, and the same pattern represents the same LBT type. The second LBT type 830b is different from the first LBT type 830a, 830c. The extended measurement window 804 is located before the measurement window 802 and the extended measurement window 806 is located after the measurement window 802. Accordingly, more locations for discovery signal transmission may be provided without impacting coexistence with other technologies. It should be understood that in some examples, one measurement window is provided and in other examples, two measurement windows are provided.

The BS may transmit a first synchronization signal during the extended window 804, 806 based on a LBT of the first LBT type 830a, 830c and may transmit a second synchronization signal during the measurement window 802 based on a LBT of the second LBT type 830b. The first and the second synchronization signals may be transmitted in different periods of the measurement window. In an example, the first LBT type is a category 4 LBT, and the second LBT type is a category 2 LBT. In this example, the BS may transmit a synchronization signal during the extended measurement window 804, 806 if the BS obtains the medium through category 4 LBT. Additionally, the BS may transmit a synchronization signal during the measurement window 802 if the BS obtains the medium through category 2 LBT. The measurement window and the extended measurement window may be configured to occur with certain periodicity such as once every 20 ms or 40 ms. The BS may typically only transmit only one set of synchronization signals in each period including both the measurement window and the extended measurement window.

The UE may be unaware of the extended measurement window 804 and/or the extended measurement window 806. After the UE decodes the discovery signal (e.g., a SSB) for the first time, the BS may provide an indication of the extended measurement window 804 and/or extended measurement window 806 to the UE. In an example, the specification specifies the existence of the extended measurement window(s). After the UE connects to the network after the initial decoding of the discovery signal, the UE may thereafter monitor the extended measurement window 804 and/or the extended measurement window 806 for synchronization signals. Accordingly, the UE may listen for discovery signals during the extended measurement window 804 and/or measurement window 806 rather than only during the measurement window 802. The BS may transmit discovery signals in the DL portion of the TXOP that is before the measurement window 802 and use at least a portion of the measurement window 802 of the TXOP entirely for UL data.

The BS may perform a category 4 LBT and if the LBT results in a pass (e.g., gaining a TXOP), the BS may schedule an UL grant for the UE to transmit UL data during the TXOP. If the TXOP overlaps with a time period for discovery signal transmissions, the BS may abandon the TXOP to accommodate the discovery signal transmissions. Accordingly, the measurement window may result in the BS abandoning the desired transmission. It may be desirable to implement a discovery signal transmission scheme in which the BS may transmit discovery signals without abandoning a TXOP. In some examples, the BS switches between the UL data/control reception and the discovery signal transmission with category 2 LBT or no LBT without losing its TXOP. The type of LBT for discovery signals and for subsequent UL transmission may also be different (e.g., no LBT for discovery signals but category 2 LBT for subsequent UL transmissions) or may depend on the gap duration, etc.

Figure 9:
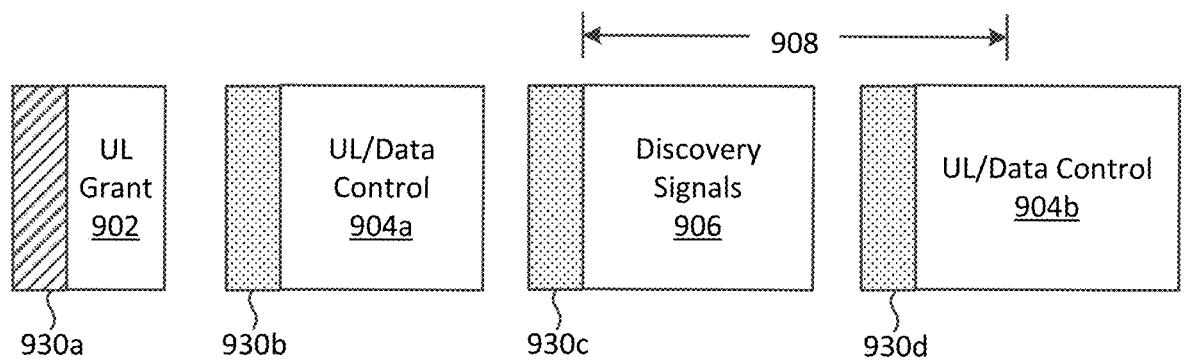
FIG. 9 illustrates a discovery signal transmission scheme in which the user equipment (UE) resumes data transmission after a discovery signal interruption if the UE obtains the medium through category 2 listen-before-talk (LBT) according to embodiments of the present disclosure.

FIG. 9 illustrates a discovery signal transmission scheme 900 in which the UE resumes data transmission after a discovery signal interruption if the UE obtains the medium through category 2 LBT according to embodiments of the present disclosure. In FIG. 9, the BS and the UE perform LBT to gain access to the shared medium. Different patterns in a box represent different LBT types, and the same pattern represents the same LBT type. A BS may perform a category 4 LBT 930a. If the category 4 LBT 930a results in a pass, the BS may schedule a UL grant 902. The UE may desire to transmit UL data/control 904a, 904b based on the UL grant 902. The UE transmits a UL data/control 904a if the UE obtains the medium through category 2 LBT 930b. After the UE starts transmitting UL data/control 904a, the BS may transmit discovery signals 906 during a measurement window 908 if the BS obtains the medium through category 2 LBT 930c. The UE may cease transmitting UL data/control 904a while the BS transmits the discovery signals 906. After the BS is finished transmitting the discovery signals 906, the UE may resume transmission of the UL data/control 904b if the UE obtains the medium through category 2 LBT 930d. Accordingly, if the UE does not complete the UL data/control transmission 904a, 904b by the end of the TXOP, the UE may resume transmitting the UL data/control without waiting for a scheduling grant from the BS. In this example, the discovery signal transmission may interrupt the UL data and it is unnecessary for the BS to abandon the TXOP to accommodate the discovery signaling. In this way, the UE may resume transmission of UL data/control with a category 2 LBT if the UL data/control transmission is interrupted with a discovery signal transmission.

Figure 10:
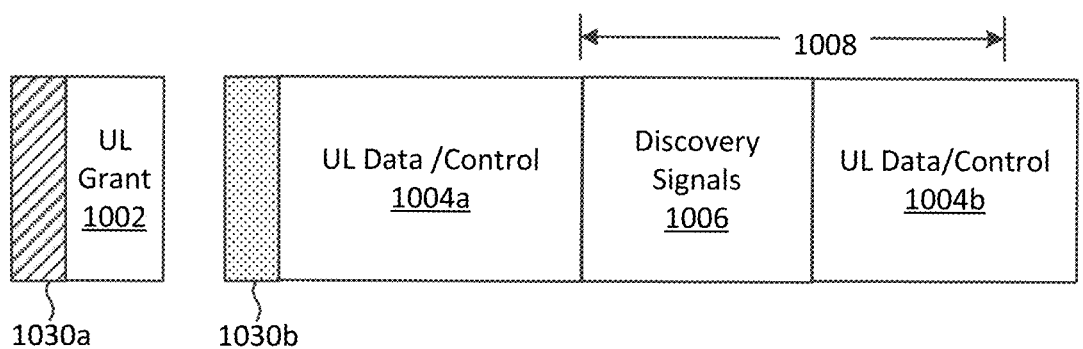
FIG. 10 illustrates a discovery signal transmission scheme in which the UE resumes data transmission after a discovery signal interruption with no LBT according to embodiments of the present disclosure.

FIG. 10 illustrates a discovery signal transmission scheme 1000 in which the UE resumes data transmission after a discovery signal interruption with no LBT according to embodiments of the present disclosure. In FIG. 10, the BS and the UE perform LBT to gain access to the shared medium. Different patterns in a box represent different LBT types, and the same pattern represents the same LBT type. A BS may perform a category 4 LBT 1030*a*. If the category 4 LBT 1030*a* results in a pass, the BS may schedule a UL grant 1002. The BS may allocate the UE back-to-back slots, for example, by using a multi-TTI grant that skips the set of slots/symbols, etc. (a measurement window 1008) where the discovery signals will be transmitted. In an example, the BS provides an indication in the DL control information (DCI) to the UE to skip some common PDCCH signaling, which provides information to the UE regarding which discovery subframes to skip.

The UE may desire to transmit UL data/control 1004*a*, 1004*b* based on the UL grant 1002. The UE transmits a UL data/control 1004*a* if the UE obtains the medium through category 2 LBT 1030*b*. The UE may skip the signals corresponding to the discovery signals 1006, and the BS transmits the discovery signals 1006 between the UL data/control 1004*a*, 1004*b* without performing LBT. After the BS is finished transmitting the discovery signals 1006, the UE may resume transmission of the UL data/control 1004*b* without performing LBT. Accordingly, it is unnecessary for the BS to abandon the TXOP to accommodate the discovery signaling. In this way, the UE may resume transmission of UL data/control with no LBT if the UL data/control transmission is interrupted with a discovery signal transmission.

In some examples, the UE transmits UL data in the measurement window if it has been explicitly scheduled by the BS to do so. In an example, grant free UL data may be allowed in the measurement window conditioned on detecting the discovery signals in an earlier location or some common PDCCH signaling indicating that the UE is allowed to transmit UL data in the measurement window. Accordingly, if the UE detects discovery signals within a measurement window, the UE may continue to transmit UL data based on the schedule, and it may be unnecessary for the UE cease transmission of UL data/control information.

Figure 11:
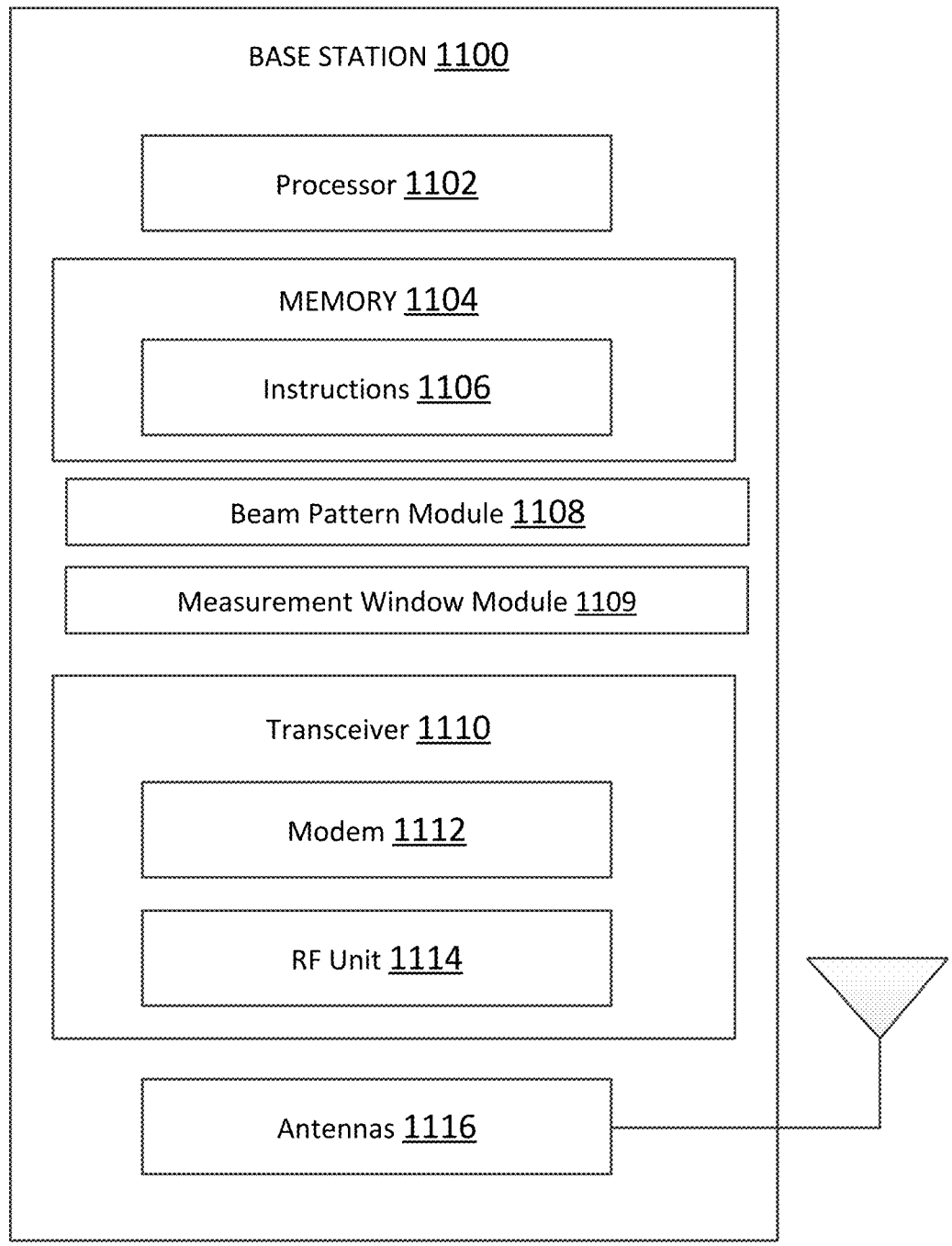
FIG. 11 illustrates a block diagram of an exemplary base station (BS) according to embodiments of the present disclosure.

FIG. 11 illustrates a block diagram of an exemplary BS 1100 according to embodiments of the present disclosure. The BS 1100 may be a BS 305 as discussed above. As shown, the BS 1100 may include a processor 1102, a memory 1104, a beam pattern module 1108, a measurement window module 1109, a transceiver 1110 including a modem subsystem 1112 and a RF unit 1114, and an antenna 1116. These elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid-state memory device, one or more hard disk drives, memristor-based arrays, other forms of volatile and non-volatile memory, or a combination of different types of memory. In some embodiments, the memory 1104 may include a non-transitory computer-readable medium. The memory 1104 may store instructions 1106. The instructions 1106 may include instructions that, when executed by the processor 1102, cause the processor 1102 to perform the operations described herein with reference to the BS 305 in connection with embodiments of the present disclosure. Instructions 1106 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The beam pattern module 1108 and/or measurement window module 1109 may be used for various aspects of the present disclosure. For example, the beam pattern module 1108 is configured to communicate, by a first wireless communication device with a second wireless communication device, a first set of SSBs during a first measurement window using a first set of beams based on a first beam pattern. The beam pattern module 1108 is configured to communicate, by the first wireless communication device with the second wireless communication device, a second set of SSBs during a second measurement window using a second set of beams based on a second beam pattern different from the first beam pattern. In an example, the beam pattern module 1108 transmits the first set of SSBs during a first measurement window and transmit the second set of SSBs during a second measurement window to the UE.

The measurement window module 1109 is configured to communicate, by a first wireless communication device with a second wireless communication device, an extended measurement window configuration indicating a first measurement window with a first LBT type and a second measurement window with a second LBT type different from the first LBT type. The measurement window module 1109 is further configured to communicate, by the first wireless communication device with the second wireless communication device, a first synchronization signal during the first measurement window based on a LBT of the first LBT type. The measurement window module 1109 is further configured to communicate, by the first wireless communication device with the second wireless communication device, a second synchronization signal during the second measurement window based on a LBT of the second LBT type.

In some examples, the measurement window module 1109 transmits the extended measurement window configuration, the first synchronization signal, and the second synchronization signal to the UE. In an example, the first measurement window is the extended measurement window 804, and the second measurement window is the measurement window 802. The BS may transmit discovery signals during the extended measurement window 804 if the BS obtains the medium through category 4 LBT and may transmit discovery signals during the measurement window 802 if the BS obtains the medium through category 2 LBT. In this example, the first LBT type is category 4 LBT, and the second LBT type is category 2 LBT. In another example, the first measurement window is the measurement window 802, and the second measurement window is the extended measurement window 804. The BS may transmit discovery signals during the measurement window 802 if the BS obtains the medium through category 2 LBT and may transmit discovery signals during the extended measurement window 804 if the BS obtains the medium through category 4 LBT. In this example, the first LBT type is category 2 LBT, and the second LBT type is category 4 LBT.

In the example illustrated in FIG. 11, the BS 1100 includes the beam pattern module 1108 and the measurement window module 1109. It should also be understood that in some examples, the BS 1100 includes one of the beam pattern module 1108 or the measurement window module 1109.

As shown, the transceiver 1110 may include the modem subsystem 1112 and the RF unit 1114. The transceiver 1110 can be configured to communicate bi-directionally with other devices, such as the UEs 315 and/or another core network element. The modem subsystem 1112 may be configured to modulate and/or encode data according to a modulation and coding scheme (MCS) e.g., a LDPC coding scheme, a turbo coding scheme, a convolutional coding scheme, etc. The RF unit 1114 may be configured to process (e.g., perform analog to digital conversion or digital to analog conversion, etc.) modulated/encoded data from the modem subsystem 1112 (on outbound transmissions) or of transmissions originating from another source such as a UE 315. Although shown as integrated together in transceiver 1110, the modem subsystem 1112 and the RF unit 1114 may be separate devices that are coupled together at the BS 305 to enable the BS 305 to communicate with other devices.

The RF unit 1114 may provide the modulated and/or processed data, e.g., data packets (or, more generally, data messages that may contain one or more data packets and other information), to the antenna 1116 for transmission to one or more other devices. This may include, for example, transmission of discovery signals and an extended measurement window configuration according to embodiments of the present disclosure. The antenna 1116 may further receive data messages transmitted from other devices and provide the received data messages for processing and/or demodulation at the transceiver 1110. Although FIG. 11 illustrates antenna 1116 as a single antenna, antenna 1116 may include multiple antennas of similar or different designs to sustain multiple transmission links.

Figure 12:
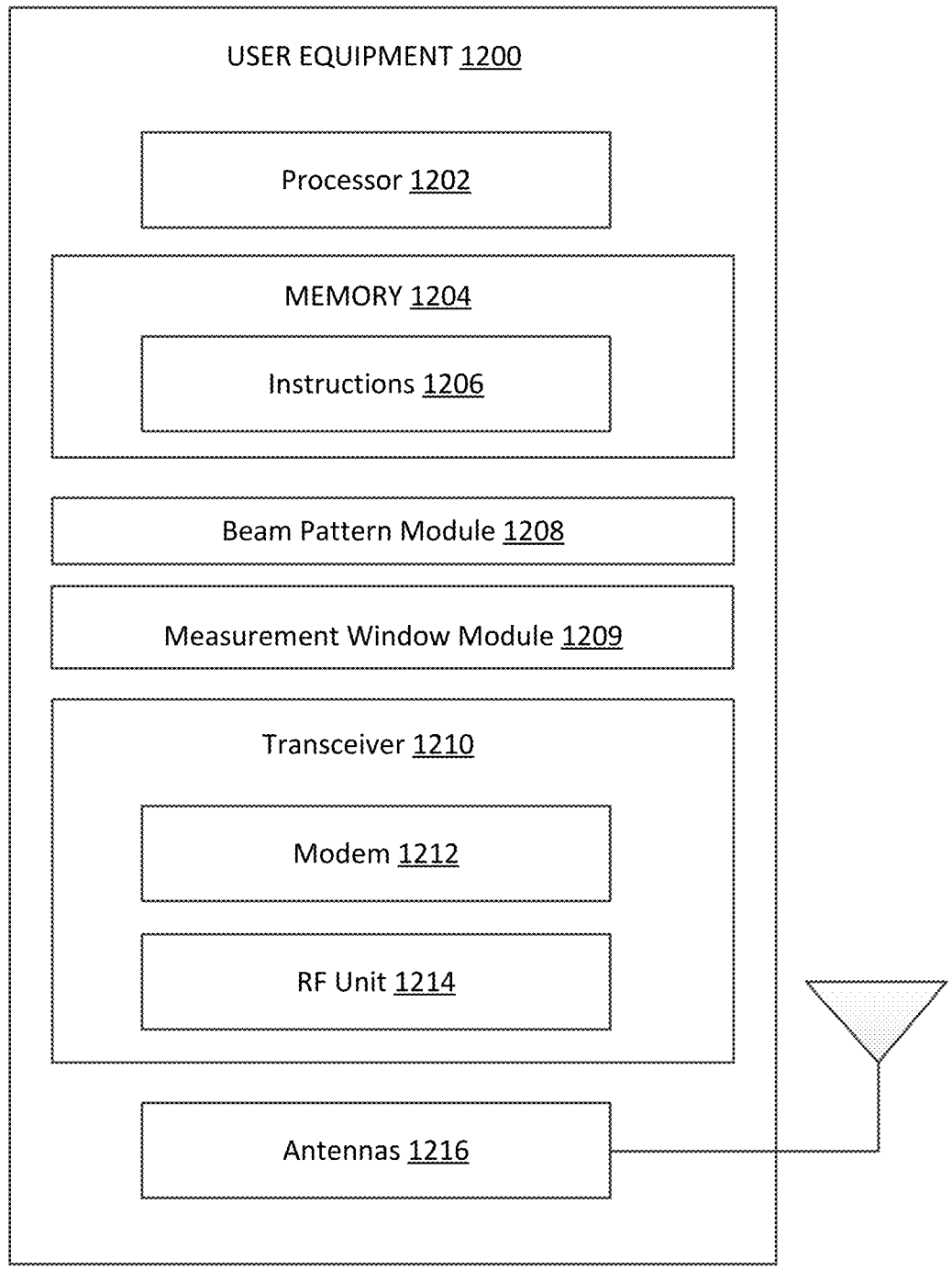
FIG. 12 is a block diagram of a UE according to embodiments of the present disclosure.

FIG. 12 is a block diagram of a UE 1200 according to embodiments of the present disclosure. The UE 1200 may be a UE 315 as discussed above. As shown, the UE 1200 may include a processor 1202, a memory 1204, a beam pattern module 1208, a measurement window module 1209, a transceiver 1210 including a modem subsystem 1212 and a RF unit 1214, and an antenna 1216. These elements may be in direct or indirect communication with each other, for example via one or more buses.

The processor 1202 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1204 includes a non-transitory computer-readable medium. The memory 1204 may store instructions 1206. The instructions 1206 may include instructions that, when executed by the processor 1202, cause the processor 1202 to perform the operations described herein with reference to the UEs 102 in connection with embodiments of the present disclosure. Instructions 1206 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The beam pattern module 1208 and/or a measurement window module 1209 may be used for various aspects of the present disclosure. For example, the beam pattern module 1208 is configured to communicate, by a first wireless communication device with a second wireless communication device, a first set of SSBs during a first measurement window using a first set of beams based on a first beam pattern. The beam pattern module 1208 is configured to communicate, by the first wireless communication device with the second wireless communication device, a second set of SSBs during a second measurement window using a second set of beams based on a second beam pattern different from the first beam pattern. In an example, the beam pattern module 1208 receives the first set of SSBs during a first measurement window and receives the second set of SSBs during a second measurement window from the BS.

The measurement window module 1209 is configured to communicate, by a first wireless communication device with a second wireless communication device, an extended measurement window configuration indicating a first measurement window with a first LBT type and a second measurement window with a second LBT type different from the first LBT type. The measurement window module 1209 is further configured to communicate, by the first wireless communication device with the second wireless communication device, a first synchronization signal during the first measurement window based on a LBT of the first LBT type. The measurement window module 1209 is further configured to communicate, by the first wireless communication device with the second wireless communication device, a second synchronization signal during the second measurement window based on a LBT of the second LBT type. In some examples, the measurement window module 1209 receives the extended measurement window configuration, the first synchronization signal, and the second synchronization signal from the BS.

In the example illustrated in FIG. 12, the UE 1200 includes the beam pattern module 1208 and the measurement window module 1009. It should also be understood that in some examples, the UE 1200 includes one of the beam pattern module 1208 or the measurement window module 1209.

As shown, the transceiver 1210 may include the modem subsystem 1212 and the RF unit 1214. The transceiver 1210 can be configured to communicate bi-directionally with other devices, such as the BSs 305 and/or another core network element. The modem subsystem 1212 may be configured to modulate and/or encode the data from the memory 1204, the beam module 1208 and/or measurement window module 1209 according to a modulation and coding scheme (MCS), e.g., a low-density parity check (LDPC)

coding scheme, a turbo coding scheme, a convolutional coding scheme, etc. The RF unit 1214 may be configured to process (e.g., perform analog to digital conversion or digital to analog conversion, etc.) modulated/encoded data from the modem subsystem 1212 (on outbound transmissions) or of transmissions originating from another source such as a UE 315 or a BS 305. Although shown as integrated together in transceiver 1210, the modem subsystem 1212 and the RF unit 1214 may be separate devices that are coupled together at the UE 315 to enable the UE 315 to communicate with other devices.

The RF unit 1214 may provide the modulated and/or processed data, e.g. data packets (or, more generally, data messages that may contain one or more data packets and other information), to the antenna 1216 for transmission to one or more other devices. This may include, for example, transmission of UL data according to embodiments of the present disclosure. The antenna 1216 may further receive data messages transmitted from other devices. The antenna 1216 may provide the received data messages for processing and/or demodulation at the transceiver 1210. Although FIG. 12 illustrates antenna 1216 as a single antenna, antenna 1216 may include multiple antennas of similar or different designs in order to sustain multiple transmission links.

Figure 13:
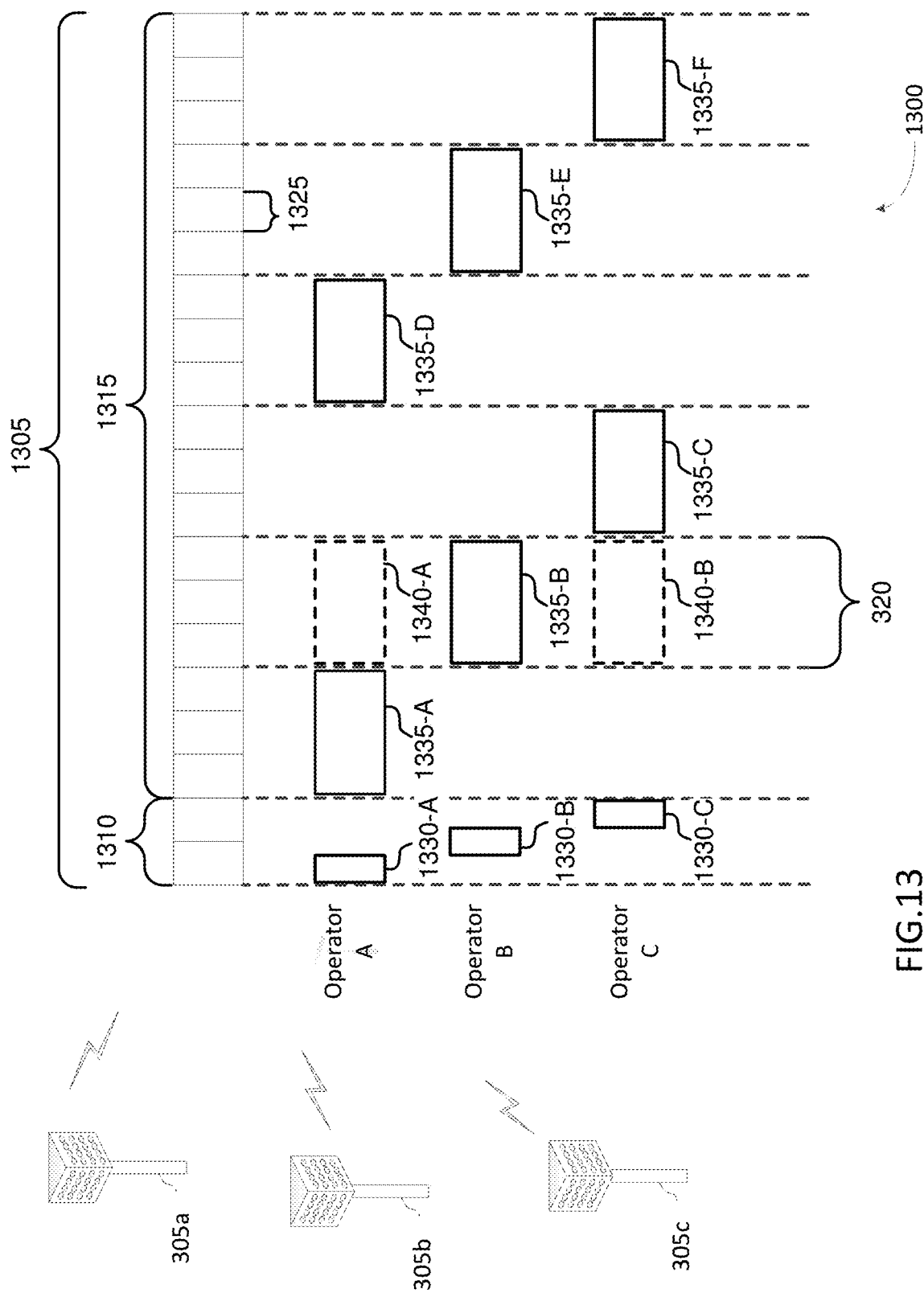
FIG. 13 is a block diagram illustrating a wireless communication system including base stations that use directional wireless beams.

FIG. 13 illustrates an example of a timing diagram 1300 for coordinated resource partitioning. The timing diagram 1300 includes a superframe 1305, which may represent a fixed duration of time (e.g., 20 ms). The superframe 1305 may be repeated for a given communication session and may be used by a wireless system such as 5G network 300 described with reference to FIG. 3. The superframe 1305 may be divided into intervals such as an acquisition interval (A-INT) 1310 and an arbitration interval 1315. As described in more detail below, the A-INT 1310 and arbitration interval 1315 may be subdivided into sub-intervals, designated for certain resource types, and allocated to different network operating entities to facilitate coordinated communications between the different network operating entities. For example, the arbitration interval 1315 may be divided into a plurality of sub-intervals 1320. Also, the superframe 1305 may be further divided into a plurality of subframes 1325 with a fixed duration (e.g., 1 ms). A transmission slot 410 in FIG. 4 may correspond to a subframe 1325 in FIG. 13. While timing diagram 1300 illustrates three different network operating entities (e.g., Operator A, Operator B, Operator C), the number of network operating entities using the superframe 1305 for coordinated communications may be greater than or fewer than the number illustrated in timing diagram 1300.

The A-INT 1310 may be a dedicated interval of the superframe 1305 that is reserved for exclusive communications by the network operating entities. In some examples, each network operating entity may be allocated certain resources within the A-INT 1310 for exclusive communications. For example, resources 1330-*a* may be reserved for exclusive communications by Operator A, such as through BS 305*a* or BS 1100, resources 1330-*b* may be reserved for exclusive communications by Operator B, such as through BS 305*b* or BS 1100, and resources 1330-*c* may be reserved for exclusive communications by Operator C, such as through BS 305*c* or BS 1100. Since the resources 1330-*a* are reserved for exclusive communications by Operator A, neither Operator B nor Operator C can communicate during resources 1330-*a*, even if Operator A chooses not to communicate during those resources. That is, access to exclusive resources is limited to the designated network operator. Similar restrictions apply to resources 1330-*b* for Operator B and resources 1330-*c* for Operator C. The wireless nodes of Operator A (e.g., UEs 315, 1200 or BSs 305, 1100) may communicate any information desired during their exclusive resources 1330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 1310 is used to transmit control information, such as synchronization signals (e.g., SYNC signals or SS), system information (e.g., SIB s), paging information (e.g., PBCH messages), or random access information (e.g., RACH signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 1335-*a* may be prioritized for use by Operator A and may therefore be referred to as a G-INT for Operator A (e.g., G-INT-OpA). Similarly, resources 1335-*b* may be prioritized for Operator B, (e.g., G-INT-OpB), resources 1335-*c* (e.g., G-INT-OpC) may be prioritized for Operator C, resources 1335-*d* may be prioritized for Operator A, resources 1335-*e* may be prioritized for Operator B, and resources 1335-*f* may be prioritized for Operator C.

The various G-INT resources illustrated in FIG. 13 appear to be staggered to illustrate their association with their respective network operating entities, but these resources may all be on the same frequency bandwidth. Thus, if viewed along a time-frequency grid, the G-INT resources may appear as a contiguous line within the superframe 1305. This partitioning of data may be an example of time division multiplexing (TDM). Also, when resources appear in the same sub-interval (e.g., resources 1340-*a* and resources 1335-*b*), these resources represent the same time resources with respect to the superframe 1305 (e.g., the resources occupy the same sub-interval 1320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 1335-*a* without interference from the wireless nodes of Operator B or Operator C.

A network operating entity may additionally signal to another operator that it intends to use a particular G-INT. For example, referring to resources 1335-*a*, Operator A may signal to Operator B and Operator C that it intends to use resources 1335-*a*. Such signaling may be referred to as an activity indication. Moreover, since Operator A has priority over resources 1335-*a*, Operator A may be considered as a higher priority operator than both Operator B and Operator C. However, as discussed above, Operator A does not have to send signaling to the other network operating entities to ensure interference-free transmission during resources 1335-a because the resources 1335-a are assigned with priority to Operator A.

Similarly, a network operating entity may signal to another network operating entity that it intends not to use a particular G-INT. This signaling may also be referred to as an activity indication. For example, referring to resources 1335-b, Operator B may signal to Operator A and Operator C that it intends not to use the resources 1335-b for communication, even though the resources are assigned with priority to Operator B. With reference to resources 1335-b, Operator B may be considered a higher priority network operating entity than Operator A and Operator C. In such cases, Operators A and C may attempt to use resources of sub-interval 1320 on an opportunistic basis. Thus, from the perspective of Operator A, the sub-interval 1320 that contains resources 1335-b may be considered an opportunistic interval (O-INT) for Operator A (e.g., O-INT-OpA). For illustrative purposes, resources 1340-a may represent the O-INT for Operator A. Also, from the perspective of Operator C, the same sub-interval 1320 may represent an O-INT for Operator C with corresponding resources 1340-b. Resources 1340-a, 1335-b, and 1340-b all represent the same time resources (e.g., a particular sub-interval 1320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 1335-b (e.g., G-INT-OpB), then Operator A may use those same resources (e.g., represented by resources 1340-a) by first checking the channel for interference (e.g., LBT) and then transmitting data if the channel was determined to be clear. Similarly, if Operator C wanted to access resources on an opportunistic basis during sub-interval 1320 (e.g., use an O-INT represented by resources 1340-b) in response to an indication that Operator B was not going to use its G-INT (e.g., resources 1335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 1320 when Operator B is not using resources 1335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 1320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the CW may be randomly chosen between one and the total number of operating entities.

In some examples, an operating entity may employ or be compatible with CoMP communications. For example an operating entity may employ CoMP and dynamic TDD in a G-INT and opportunistic CoMP in an O-INT as needed.

In the example illustrated in FIG. 13, each sub-interval 1320 includes a G-INT for one of Operator A, B, or C. However, in some cases, one or more sub-intervals 1320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 1325 may contain 14 symbols (e.g., 250-μs for 60 kHz tone spacing). These subframes 1325 may be standalone, self-contained Interval-Cs (ITCs) or the subframes 1325 may be a part of a long ITC. An ITC may be a self-contained transmission starting with a DL transmission and ending with an UL transmission. In some embodiments, an ITC may contain one or more subframes 1325 operating contiguously upon medium occupation. In some cases, there may be a maximum of eight network operators in an A-INT 1310 (e.g., with duration of 2 ms) assuming a 250-μs transmission opportunity.

Although three operators are illustrated in FIG. 13, it should be understood that fewer or more network operating entities may be configured to operate in a coordinated manner as described above. In some cases, the location of the G-INT, O-INT, or A-INT within the superframe 1305 for each operator is determined autonomously based on the number of network operating entities active in a system. For example, if there is only one network operating entity, each sub-interval 1320 may be occupied by a G-INT for that single network operating entity, or the sub-intervals 1320 may alternate between G-INTs for that network operating entity and O-INTs to allow other network operating entities to enter. If there are two network operating entities, the sub-intervals 1320 may alternate between G-INTs for the first network operating entity and G-INTs for the second network operating entity. If there are three network operating entities, the G-INT and O-INTs for each network operating entity may be designed as illustrated in FIG. 13. If there are four network operating entities, the first four sub-intervals 1320 may include consecutive G-INTs for the four network operating entities and the remaining two sub-intervals 1320 may contain O-INTs. Similarly, if there are five network operating entities, the first five sub-intervals 1320 may contain consecutive G-INTs for the five network operating entities and the remaining sub-interval 1320 may contain an O-INT. If there are six network operating entities, all six sub-intervals 1320 may include consecutive G-INTs for each network operating entity. It should be understood that these examples are for illustrative purposes only and that other autonomously determined interval allocations may be used.

It should be understood that the coordination framework described with reference to FIG. 13 is for illustration purposes only. For example, the duration of superframe 1305 may be more or less than 20 ms. Also, the number, duration, and location of sub-intervals 1320 and subframes 1325 may differ from the configuration illustrated. Also, the types of resource designations (e.g., exclusive, prioritized, unassigned) may differ or include more or less sub-designations.

Aspects of FIGS. 13-23 can be used in conjunction with aspects of FIGS. 3-12. In some instances, the scheme 1000 can be used in conjunction with the description of FIGS. 14-16, 17A-17C, 18-20, 21A-21C, 22, and/or 23 to determine whether an UL resource within an SMTC window is valid or not.

In some examples, the BS 1100 in FIG. 11 performs the actions discussed in relation to FIG. 13. For example, the BS 1100 is allocated a resource within the A-INT 1310 for exclusive communications, and the measurement window module 1109 may communicate any information desired during the exclusive resource. The measurement window module 1109 may transmit control information, such as synchronization signals (e.g., SYNC signals or SS), system information (e.g., SIBs), paging information (e.g., PBCH messages), or random access information (e.g., RACH signals). Additionally, the BS 1100 may refrain from communicating information during resources reserved for other operators. In some examples, the measurement window module 1109 may transmit an indication of an UL resource that falls within a DMTC window and receive an UL transmission within the UL resource during the DMTC window.

Figure 14:
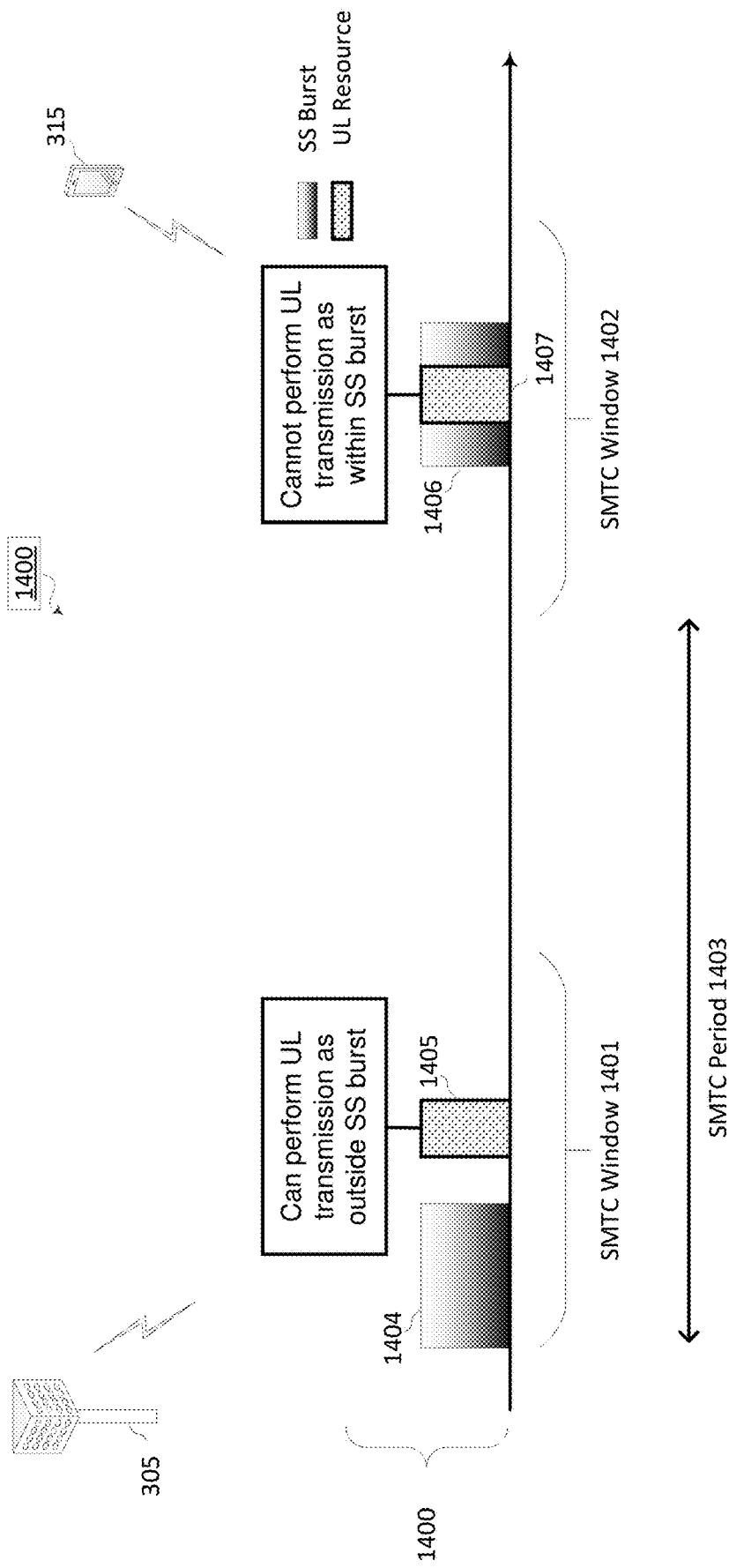
FIG. 14 is a block diagram illustrating communications between a BS and UE over an unlicensed, shared communication channel in a new radio-unlicensed (NR-U) system.

FIG. 14 is a block diagram illustrating communications between BS 305 and UE 315 over an unlicensed, shared communication channel 1400 in an NR-U system 1400. In NR Release-15 (Ra-15), uplink transmissions, such as a RACH, a configured grant, SRS, or dynamic uplink may be considered invalid if it overlaps, either partially or fully, in time with SSB transmission occasions, such as SS bursts 1404 and 1406. An SSB transmission occasion may refer to a time resource where BS 305 may perform transmission of an SSB. Additionally, an SMTC window may refer to a measurement window (e.g., DMTC window), and an SMTC period may refer to a measurement window period. Given that NR-U supports floating synchronization signal burst (SS burst) transmission within a synchronization block measurement timing configuration (SMTC) window, such as SMTC windows 1401 and 1402, there is no fixed time occasion where SSB may be deterministically transmitted. Hence, BS 305 may or may not transmit an SSB within an SSB transmission occasion of a SMTC window deterministically. A SS burst may refer to transmission of one of more SSBs. Thus, where the uplink resource, such as uplink resources 1405 and 1407, occurs after SS Burst 1404, as shown in SMTC window 1401, UE 315 may perform uplink transmissions to BS 305 at uplink resource 1405. However, where uplink resource 1407 occurs within SS Burst 1406, as shown in SMTC window 1402, UE 315 cannot perform uplink transmissions. In such case, the overlapping uplink resource, uplink resource 1407, may be invalidated.

An SMTC period 1403 may be short enough that an SMTC window can occur very frequently. Therefore, simply invalidating any uplink resource that might overlap with a SMTC window, such as uplink resource 1407 overlapping SS Burst 1406, can be very inefficient in terms of channel utilization. SMTC windows 1401 and 1402 can have a window length of 5 ms occurring at SMTC period 1403 every 20 ms period. Thus, SMTC windows can occupy 25% of the radio resources. If UE 315 can detect serving cell signals from BS 305, then it may be possible to have a more optimal solution based on the channel occupancy of BS 305.

The issue becomes how to define whether an uplink transmission can be deemed as valid or not when it overlaps with SMTC window.

In some examples, the BS 1100 in FIG. 11 and/or the UE 1200 in FIG. 12 performs the actions discussed in relation to FIG. 14. For example, the UE 1200 may transmit an UL transmission, such as a RACH, a configured grant, SRS, or dynamic uplink. The measurement window module 1209 may determine whether the UL resource overlaps with a SSB occasion within the DMTC window. The UL transmission or the UL resource may be considered invalid if the UL resource overlaps, either partially or fully, in time with SSB transmission occasions, such as SS bursts 1404 and 1406 in FIG. 14. In some examples, the measurement window module 1209 may receive an indication of an UL resource that falls within a DMTC window and transmit an UL transmission within the UL resource during the DMTC window.

Figure 15:
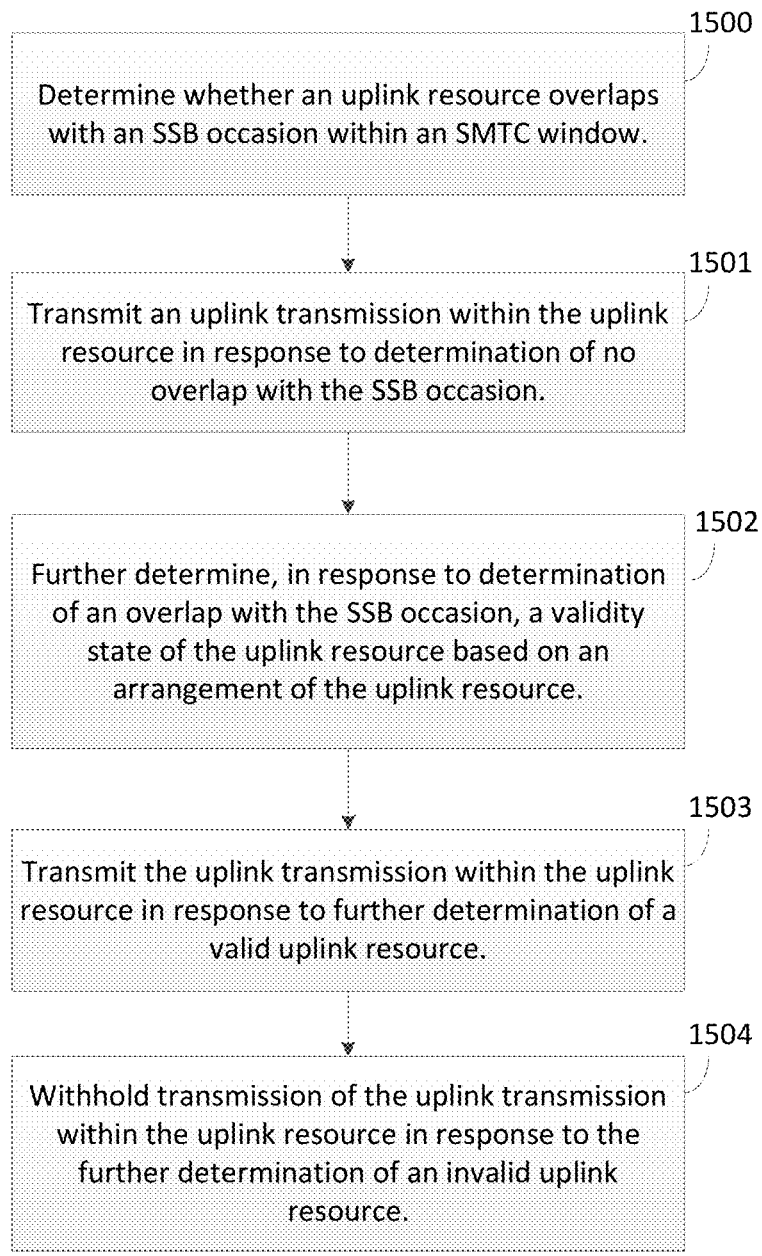
FIG. 15 is a block diagram illustrating example blocks executed to implement one aspect of the present disclosure.
Figure 16:
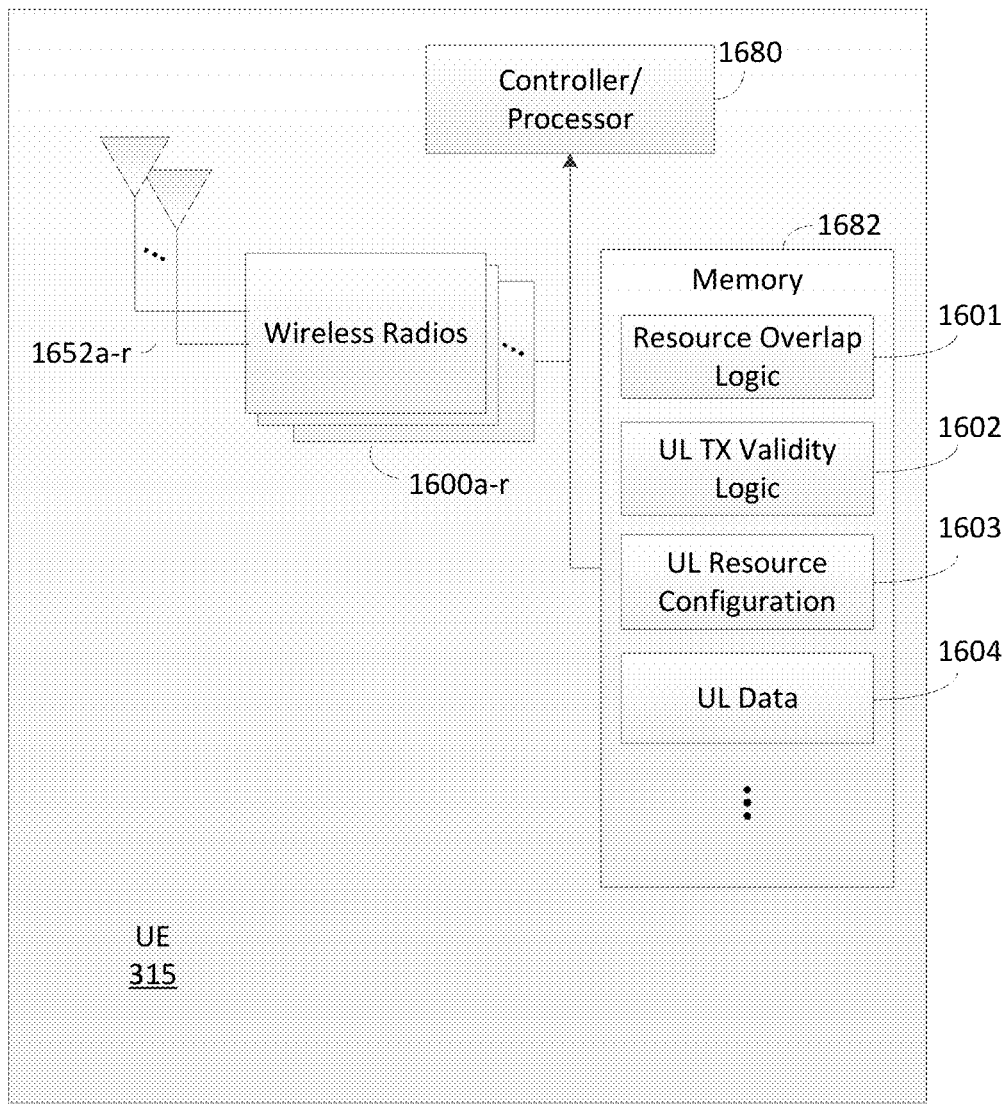
FIG. 16 is a block diagram illustrating a UE configured according to one aspect of the present disclosure.

FIG. 15 is a block diagram illustrating example blocks executed to implement one aspect of the present disclosure. The example blocks will also be described with respect to UE 315 as illustrated in FIG. 16. FIG. 16 is a block diagram illustrating UE 315 configured according to one aspect of the present disclosure. UE 315 includes the structure, hardware, and components as illustrated for UE 315. For example, UE 315 includes controller/processor 1680, which operates to execute logic or computer instructions stored in memory 1682, as well as controlling the components of UE 315 that provide the features and functionality of UE 315. UE 315, under control of controller/processor 1680, transmits and receives signals via wireless radios 1600a-r and antennas 1652a-r. Wireless radios 1600a-r includes various components and hardware, as illustrated for UE 315, including modulator/demodulators, MIMO detector, receive processor, transmit processor, and TX MIMO processor.

At block 1500, a UE determines whether an uplink resource overlaps with a SSB occasion within a SMTC window. A UE, such as UE 315, obtains identification of various uplink resources, such as for RACH transmissions, configured grant transmissions, scheduled grant transmissions, SRS, dynamic uplink, and the like. Such configuration of uplink resources may be stored at UE 315 in uplink resource configuration 1603 of memory 1682. When UE 315 has data in uplink data buffer 1604 of memory 1682, it may attempt to determine whether any uplink resources overlap with potential SSB transmissions. UE 315, under control of controller/processor 1680, executes resource overlap logic 1601, stored in memory 1682. The execution environment of resource overlap logic 1601 provides for UE 315 to determine whether any given uplink resource overlaps a potential SSB occasion. As noted in greater detail below, such logic may include a determination of whether the uplink resource overlaps an SMTC window that includes at least one slot having an indicated SSB occasion. The logic may also, alternatively, include a determination of whether the uplink resource overlaps within the first K symbols of a given slot of the SMTC window. The logic may also, alternatively, include a determination of whether the uplink resource overlaps any symbol within a slot of the SMTC window that includes an SSB occasion symbol. Such determinations each may indicate that an examined uplink resource overlaps a potential SSB transmission.

At block 1501, the UE transmits an uplink transmission within the uplink resource in response to determination of no overlap with the SSB occasion. Within the execution environment of resource overlap logic 1601, when no overlap is determined for a given uplink resource, UE 315 may begin transmission of data from uplink data buffer 1604 in the uplink resource via wireless radios 1600a-r and antennas 1652a-r.

At block 1502, the UE further determines in response to determination of an overlap with the SSB occasion, a validity state of the uplink resource based on an arrangement of the uplink resource. When UE 315 determines a given uplink resource overlaps a potential SSB transmission according to the determination details within the execution environment of resource overlap logic 1601, UE 315, under control of controller/processor 1680, executes uplink transmission validity logic 1602. The execution environment of uplink transmission validity logic 1602 provides various additional determinations that can be made for each uplink resource identified as overlapping a potential SSB transmission. Each of such various additional determinations is described in greater detail below. However, the execution environment of uplink transmission validity logic 1602 allows for UE 315 to obtain further information that would identify the overlapping uplink resource as being more or less likely to be overlapping an actual SSB transmission. Within the execution environment of uplink transmission validity logic 1602, UE 315 may either set a validity state of the given uplink resource to valid, if the additional determination provides a lower likelihood that the resource overlaps an SSB transmission, or invalid, if the additional determination provides a higher likelihood of such overlap.

At block 1503, the UE transmits the uplink transmission within the uplink resource in response to further determination of the validity state of the uplink resource as valid. In response to UE 315 identifying a given uplink resource as valid, within the execution environment of uplink transmission validity logic 1602, UE 315 may begin transmissions of data from uplink data buffer 1604 at the uplink resource.

At block 1504, the UE withholds transmission of the uplink transmission within the uplink resource in response to the further determination of the validity state of the uplink resource as invalid. In response to UE 315 identifying a given uplink resource as invalid, within the execution environment of uplink transmission validity logic 1602, UE 315 may withhold any such uplink transmissions at the invalid uplink resource.

Figure 17A:
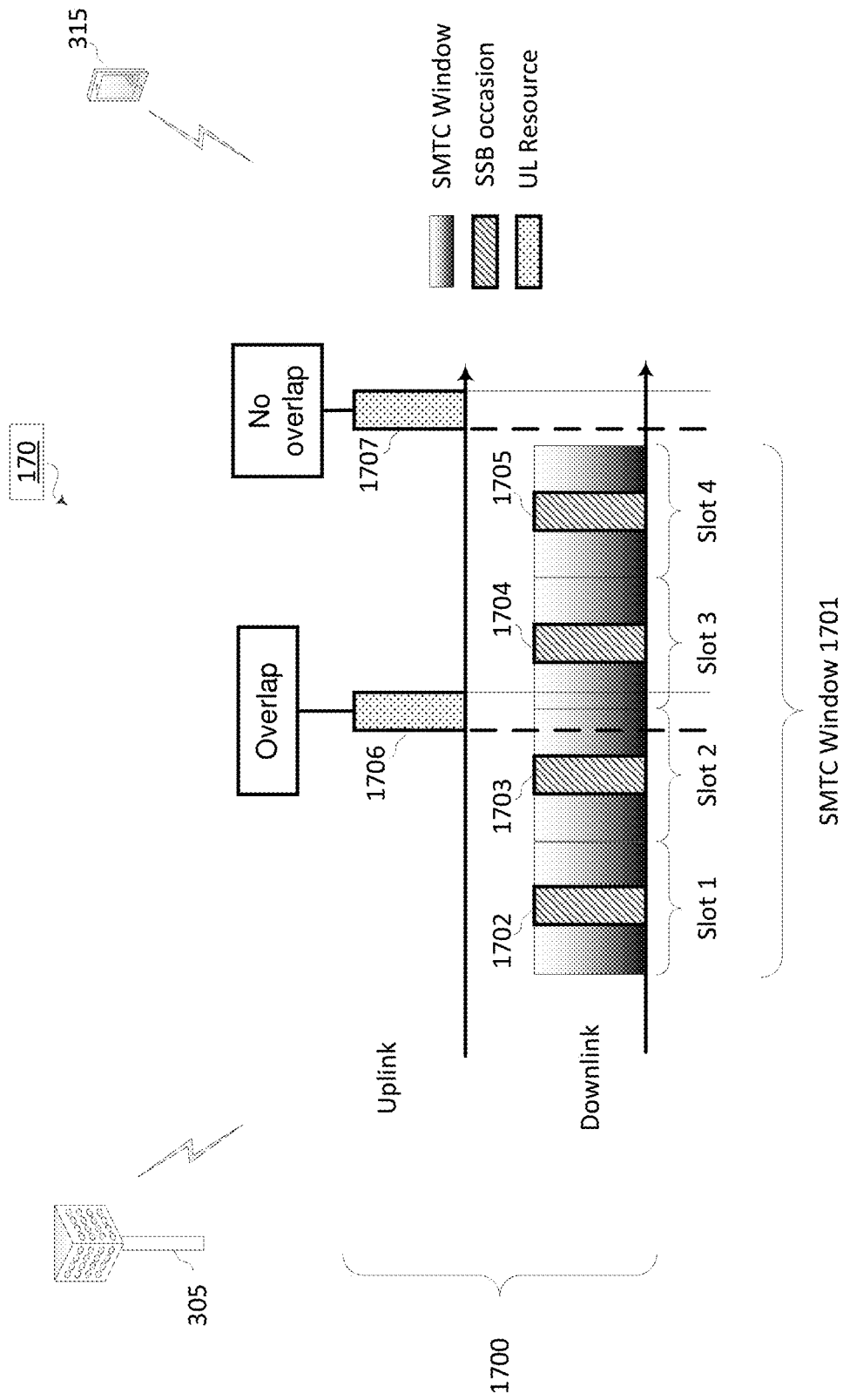
FIGS. 17A-17C are block diagrams illustrating example options for determining overlap of uplink resources of a UE, configured according to aspects of the present disclosure, with SSB occasions of a synchronization block measurement timing configuration (SMTC) window.
Figure 17B:
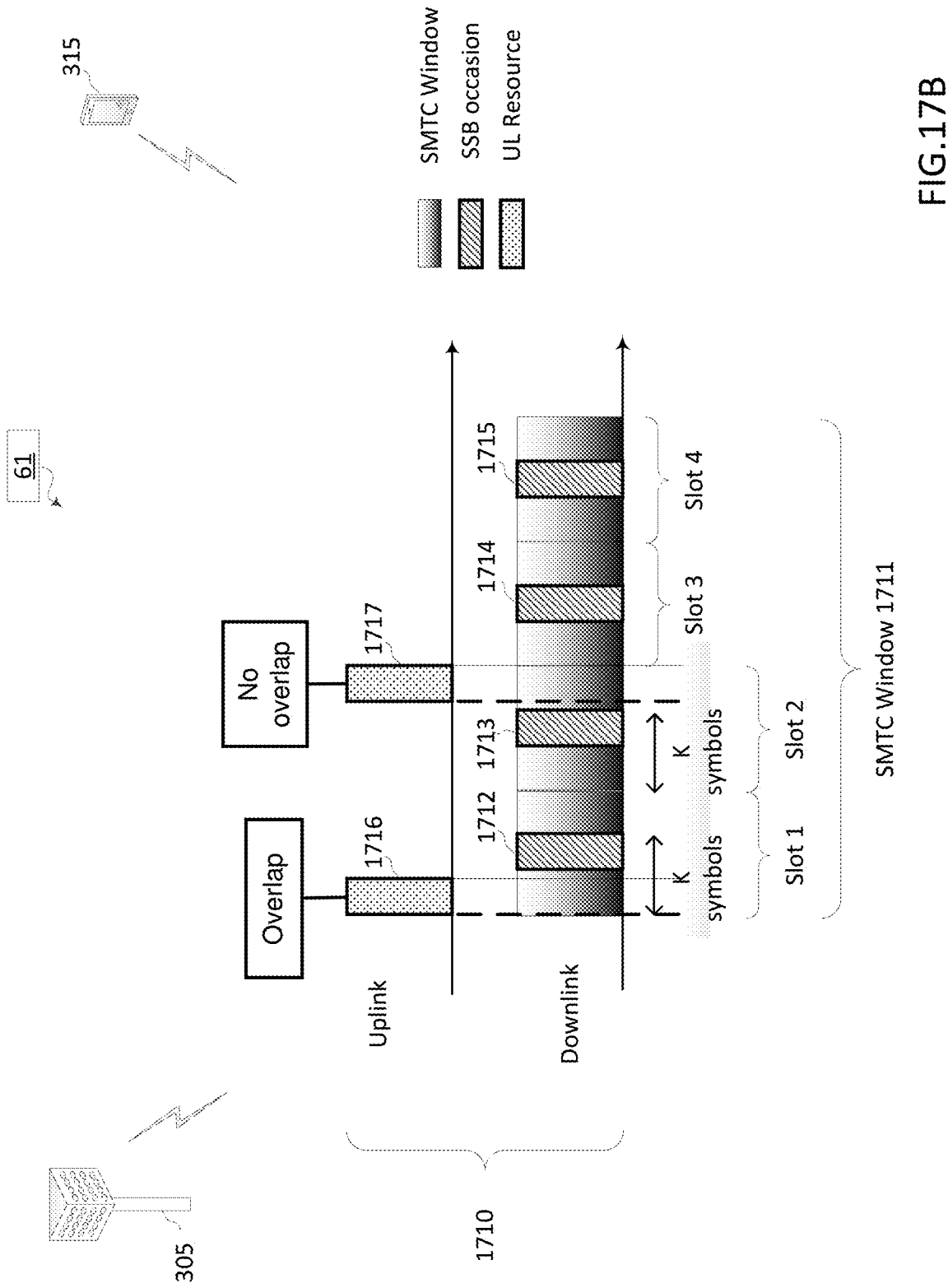
Figure 17C:
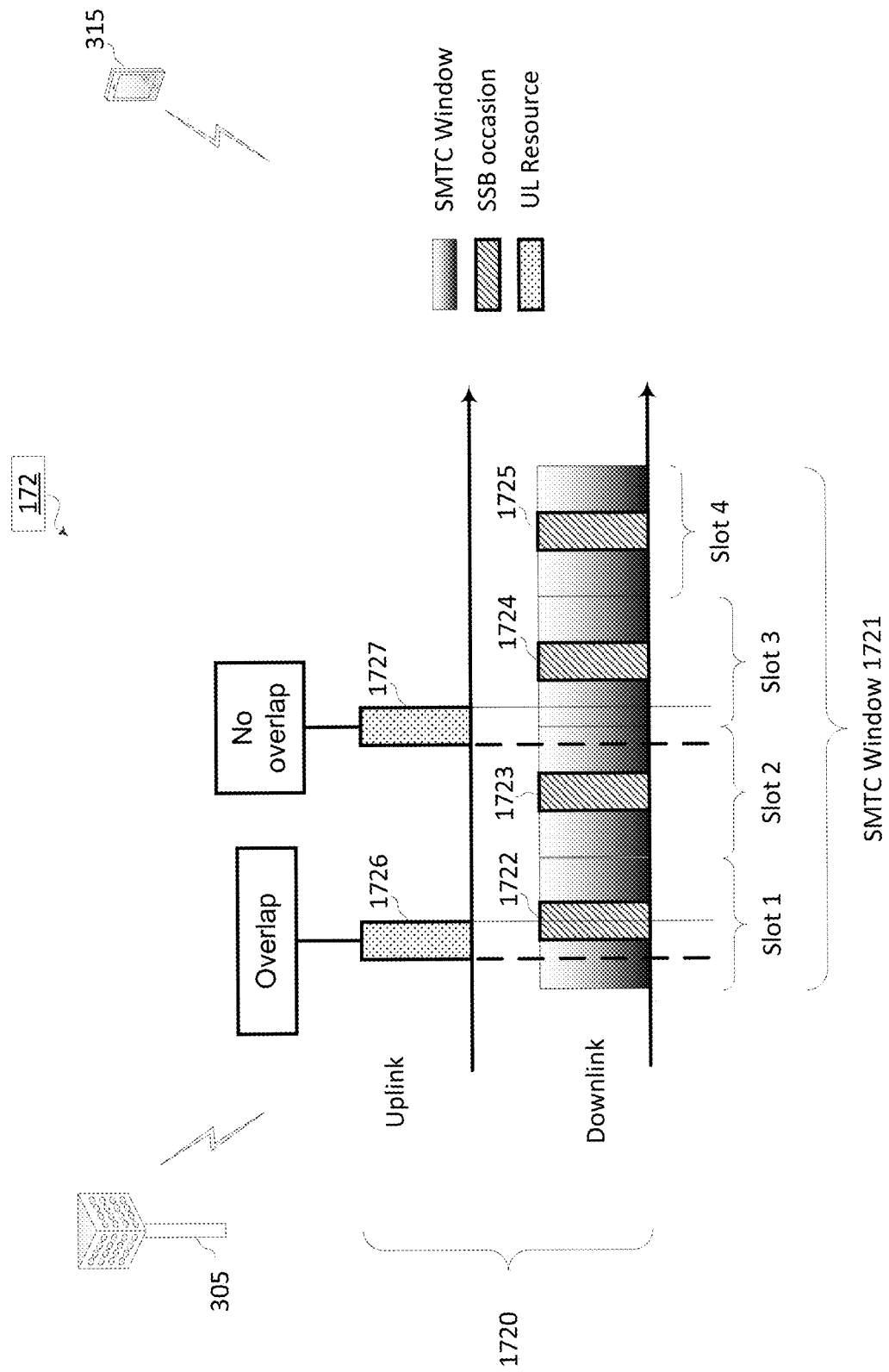

FIGS. 17A-17C are block diagrams illustrating example options for determining overlap of uplink resources of UE 315, configured according to aspects of the present disclosure, with SSB occasions of an SMTC window. In a first, most conservative optional aspect, as illustrated in FIG. 17A, any uplink resource that overlaps any slot of an SMTC window having an SSB occasion will be determined by UE 315 to overlap, while uplink resources that do not overlap with any slot of an SMTC window are determined not to overlap. FIG. 17A illustrates the uplink and downlink communications on a shared communication channel 1700 between BS 305 and UE 315 in NR-U network 170. An SMTC window 1701 is defined having multiple slots, slots 1-4, in which an SSB occasion, SSB occasions 1702-1705, have been configured. UE 315 is provided uplink resources 1706 and 1707 for uplink transmissions. As noted above, uplink resources 1706 and 1707 may be provided for various types of uplink transmissions, such as RACH, configured grant transmissions, SRS, dynamic uplink, and the like.

According to the illustrated first optional aspect, UE 315 may determine that uplink resource 1706 overlaps a potential SSB transmission because it overlaps SMTC window 1701 which includes SSB occasions 1702-1705. Further, UE 315 may determine that uplink resource 1707 does not overlap a potential SSB transmissions because it does not overlap SMTC window 1701. As the first optional aspect allows UE 315 to determine overlap by virtue of an uplink resource simply overlapping an SMTC window that has an SSB occasion, it may result in the most conservative option for determining overlapping resources.

In a second, less conservative optional aspect, as illustrated in FIG. 17B, UE 315 may determine an uplink resource to overlap a potential SSB transmission when that uplink resource overlaps with one of the first K symbols of a slot with an SSB occasion within SMTC window 1711. The assumption for this second optional aspect is that BS 305 may attempt SSB transmissions during the earlier portions of a given slot. FIG. 17B illustrates the uplink and downlink communications on a shared communication channel 1710 between BS 305 and UE 315 in NR-U network 171. SMTC window 1711 is defined having multiple slots, slots 1-4, in which an SSB occasion, SSB occasions 1712-1715, have been configured. UE 315 is provided uplink resources 1716 and 1717 for uplink transmissions.

According to the illustrated second optional aspect, UE 315 may determine that uplink resource 1716 overlaps a potential SSB transmission because it overlaps the first K symbols of slot 1, which includes SSB occasion 1712. Further, UE 315 may determine that uplink resource 1717 does not overlap a potential SSB transmission because it overlaps slot 2 after the first K symbols. It should be noted that K may be based on the beginning symbol of a given slot or on the ending symbol of a last SSB occasion within a slot of SMTC window 1711. For example, if the last SSB occasion within slot 2 occurs within symbols 8-11, then UE 315 may determine uplink resource 1717 does not overlap a potential SSB transmission if uplink resource 1717 is contained within symbols 12-13. Otherwise, if uplink resource 1717 were to occur within those symbols 8-11, the first K symbols, UE 315 may determine uplink resource 1717 overlaps a potential SSB transmission.

In a third, even less conservative optional aspect, as illustrated in FIG. 17C, UE 315 determines an uplink resource to overlap when it overlaps with a symbol of an SSB occasion in the SMTC window. FIG. 17C illustrates the uplink and downlink communications on a shared communication channel 1720 between BS 305 and UE 315 in NR-U network 172. SMTC window 1721 is defined having multiple slots, slots 1-4, in which an SSB occasion, SSB occasions 1722-1725, have been configured. UE 315 is provided uplink resources 1726 and 1727 for uplink transmissions.

Within NR-U network 172, according to the third optional aspect, BS 305 may transmit an SSB within a subset of symbols in every slot of SMTC window 1721. For example, if SSB transmissions can occur within symbols 2-5 or 8-11 within a next slot, then the uplink resource may be determined valid if those uplink resources are contained within symbols 0-1 or 6-7 or 12-13. However, uplink resources that overlap with symbols 2-5 or 8-11 within a next slot would be determined by UE 315 to overlap. Thus, as illustrated, UE 315 may determine that uplink resource 1726 overlaps a potential SSB transmission by overlapping at least one symbol of SSB occasion 1722 in slot 1. Further, UE 315 may determine that uplink resource 1727 does not overlap a potential SSB transmission because it does not overlap any symbols containing an SSB occasion in either of slots 2 or 3.

It should be noted that SSB occasions, such as SSB occasions 1702-1705, 1712-1715, and 1722-1725, within SMTC windows 1701, 1711, and 1721 may be fixed based on wireless standards, and, thus, known in advance by UE 315. Accordingly, the above optional aspects can be further refined based on a network indication from BS 305 of the specific SSB occasions within SSB occasions 1702-1705, 1712-1715, and 1722-1725 that are actually used for SSB transmission. These actual indications can be configured through RRC signaling from BS 305, such as via an SSB bitmap, or can be dynamically signaled to UE 315, as further described below.

For the options illustrated in FIGS. 17B and 17C, UE 315 may assume an uplink resource is valid where a gap between a previous SSB occasion endpoint and the uplink resource start point is greater than a first threshold, $threshold_1$. UE 315 may assume an uplink resource is valid the gap between uplink resource end point and subsequent SSB occasion start point is greater than a $threshold_2$. $Threshold_1$ and $threshold_2$ can be specific to each uplink channel (e.g., RACH, PUCCH, etc.). Each such gap may be used to ensure completion of an SS burst or for downlink-to-uplink transition, or for performing an LBT procedure. Further with respect to the optional aspects illustrated in FIGS. 17B and 17C, if the location overlapped by the given uplink resource can also be used by BS 305 for remaining minimum system information (RMSI) transmissions, UE 315 may invalidate the uplink resource for any uplink transmissions.

For the options illustrated in FIGS. 17A-17C, additional gaps may be ensured between the uplink resource and the immediate next or previous SMTC window for the uplink resource to be considered valid.

It should be noted that each of the optional aspects described with respect to FIGS. 17A-17C provide a determination of overlap of a potential SSB transmission with varying degrees of probability from the most conservative, in which overlap is declared if the uplink resource overlaps any portion of an SMTC window that has a slot that includes an SSB occasion, to the least conservative, in which overlap is declared when UE 315 determines the uplink resource actually overlaps with a symbol allocated for an SSB occasion. Configuration of UE 315 to use one or the other of these optional aspects may be determined based on various parameters, such as priority of the transmission, a channel on which the transmission is intended, and the like. Thus, for example, where high priority transmissions are to be handled, such as ultra-reliable low latency communications (URLLC), UE 315 may be configured to use the least conservative option, in order to potentially increase transmission throughput. Similarly, RACH transmissions may be associated with the most conservative option. Thus, when UE 315 determines to perform RACH transmissions, it may use the most conservative option to determine whether uplink resources overlap with potential SSB transmissions.

It should be further noted that uplink transmission within SMTC windows 1701, 1711, and 1721 can lead to the network missing SSB transmission. Hence, uplink transmissions on overlapping uplink resources of UE 315 may be restricted to critical channels or high-priority data. UE 315 may be allowed to perform uplink transmission for high priority data for short durations. For example, if URLLC data is to be transmitted within CG, then UE 315 can initiate transmission even if the uplink resource overlaps with SMTC windows 1701, 1711, and 1721. This can also be based on a physical channel type, such as allowing PUCCH transmission but not transmissions on other channels. In a further alternative example, UE 315 may not allow transmissions on RMSI-configured channels (e.g. PRACH). Moreover, the duration of uplink transmission can be determined based on the granularity of start points of the SS bursts, such that, if an SS burst starts at slot boundary, the uplink transmission may be restricted to within a slot duration.

According to the various aspects of the present disclosure, once UE 315 determines that an uplink resource overlaps a potential SSB transmission within an SMTC window using one of the previously-described optional aspects, it may perform further analysis to determine whether that overlap should invalidate the uplink resource or whether the uplink resource may be allowed for transmission even though it is considered to overlap such potential SSB transmission. Any of the following descriptions of optional further analyses in FIGS. 17A-17C may be applicable to any of the previously described methods used by UE 315 to determine a given uplink resource overlaps a potential SSB transmission.

With reference to FIG. 17A, in a first optional further analysis, UE 315 has not detected a channel occupancy time (COT) from the start of SMTC window 1701. A COT may also be referred to as a TXOP. Without detecting the COT, any uplink resource, such as uplink resource 1706, will be invalidated and dropped when it overlaps with SMTC window 1701. This first optional analysis is similar to the current considerations in NR Rel-15, except that, instead of invalidating when the uplink resource is determined to overlap with a potential SSB transmission, UE 315 invalidates the uplink resource when it overlaps with SMTC window 1701.

In a second optional analysis also illustrated in FIG. 17A, if UE 315 has not detected a COT from the start of SMTC window 1701, then UE 315 may still allow uplink transmission for any dynamically-triggered uplink resources (e.g., DCI-based uplink grant) in the SMTC window. For example, if BS 305 dynamically schedules UE 315 for uplink resource 1706, then UE 315 will determine uplink resource 1706 to be valid and move forward with uplink transmissions. Dynamically scheduled uplink resources can be used without regard to a determined overlap with SMTC window 1701. The rationale for allowing dynamically-triggered uplink is that BS 305 will know where each SSB transmission is planned for within SMTC window 1701. Therefore, BS 305 will schedule the dynamically-triggered uplink resource, uplink resource 1706, outside of the scheduled SSB transmission. Any RRC-configured uplink resource (e.g., RACH/SRS/CG) would be considered invalid where the resource overlapped with the SMTC window. Thus, if uplink resource 1706 were RRC-configured, UE 315 would determine uplink resource 1706 to be invalid and withhold any uplink transmissions using those resources.

In a third optional analysis also illustrated in FIG. 17A, if UE 315 has not detected a COT from the start of SMTC window 1701, then UE 315 may still allow transmissions using UE-specific uplink resources within SMTC window 1701. For example, if BS 305 used a UE-specific grant to grant UE 315 uplink resources 1706, which overlaps SMTC window 1701, UE 315 may determine uplink resource 1706 as valid and allow uplink transmissions. Similar to the rationale behind allowing transmission for dynamically-triggered uplink resources, UE-specific uplink resources may have been scheduled considering the actual scheduled SSB transmissions. Thus, any dynamically-scheduled uplink resource or uplink resource configured using dedicated RRC signaling (e.g., configured grant or PUCCH) can be used by UE 315 for uplink transmissions regardless of a determined overlap with SMTC window 1701. However, any RMSI-configured uplink resource (e.g., RACH) may be considered invalid by UE 315 when the uplink resource overlaps with the SMTC window. Within uplink resources configured using RRC signaling, UE 315 may be configured to allow uplink transmissions for a subset of channels (e.g., PUCCH).

Figure 18:
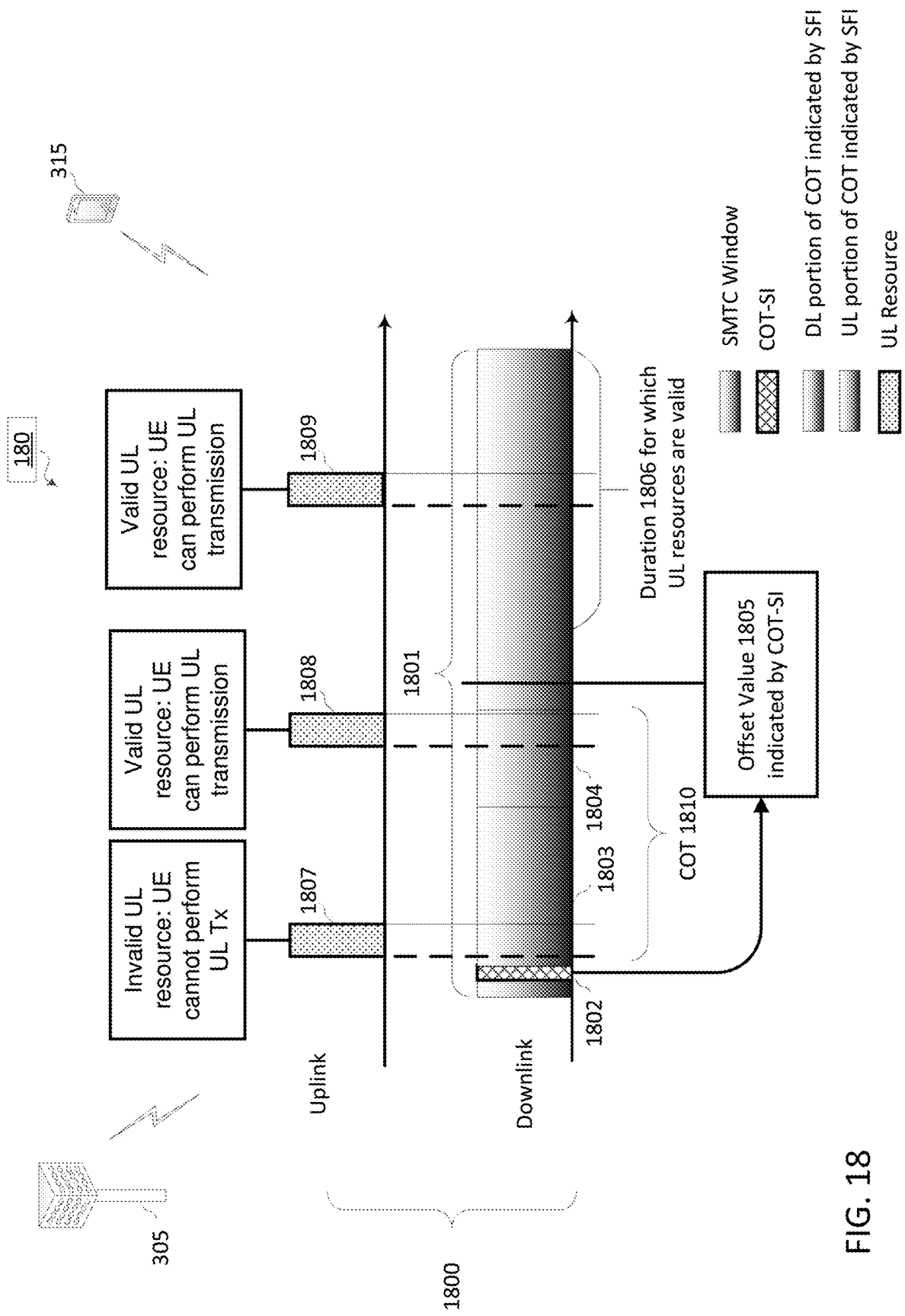
FIG. 18 is a block diagram illustrating a UE configured according to aspects of the present disclosure for determining, within and NR-U network, whether uplink resources that are identified as overlapping may be allowed for uplink transmissions for base station.

FIG. 18 is a block diagram illustrating a UE 315 configured according to one aspect of the present disclosure for determining, within an NR-U network 180, whether uplink resources that are identified as overlapping may be allowed for uplink transmissions to BS 305. In a first optional aspect, when UE 315 has detected a COT 1810 before uplink resources 1807-1809 in SMTC window 1801 and UE 315 receives COT-structure information (SI) 1802, which indicates an overlap of COT 1810 with SMTC window 1801, COT-SI 1802 can provide UE 315 information as to where uplink transmission can proceed within SMTC window 1801. For example, COT-SI 1802 can indicate a downlink portion 1803 of COT 1810 and an uplink portion 1804 of COT 1810, where uplink transmissions may occur. COT-SI 1802 may further provide information about a portion of SMTC window 1801 which is either inside or outside of COT 1810 where uplink transmission can proceed. Alternatively, COT-SI 1802 can dynamically indicate where SSBs are transmitted within SMTC window 1801 or where an SS burst ends within SMTC window 1801.

In operation, UE 315 receives COT-SI 1802 which indicates downlink portion 1803 and uplink portion 1804 of COT 1810. Accordingly, UE 315 determines that uplink resource 1807 is invalid because it overlaps with downlink portion 1803 and, thus, no uplink transmissions should occur. Because uplink resource 1808 overlaps with uplink portion 1804 of COT 1810, UE 315 may determine uplink resource 1808 to be valid and support uplink transmissions.

It should be noted that this information regarding the locations of the SSBs transmitted within SMTC window 1801 or information as to where uplink transmission can proceed within SMTC window 1801 can also be provided using other downlink signals, such as RMSI, PDCCH, or the like.

In a first alternative implementation of such aspect, a yes/no flag within COT-SI 1802 may indicate whether UE 315 can initiate uplink transmission within the ongoing SMTC window 1801. For example, the field may indicate whether, from the COT end/COT-SI detection, UE 315 can assume that SSB transmissions have already been completed. In a second alternative implementation, COT-SI 1802 or other downlink signals may indicate a duration 1806 of when UE 315 can initiate uplink transmission within SMTC window 1801. Thus, as uplink resource 1809 falls within duration 1806, UE 315 may determine uplink resource 1809 to be valid and support uplink transmissions to BS 305. In a third alternative implementation, COT-SI 1802 or other downlink signals may include information indicating that UE 315 can perform uplink transmission X time units after COT end/COT-SI detection. The X time units may define offset value 1805. UE 315 may use offset value 1805 to determine the validity state of uplink resources occurring before and after the offset time. Some of this information in these alternative implementations can come within a slot format indicator (SFI). For example, if COT-SI 1802 or SFI indicates an uplink burst, such as uplink portion 1804, overlaps with SMTC window 1801, then UE 315 can use an uplink resource, such as uplink resource 1808, occurring within the uplink burst.

Figure 19:
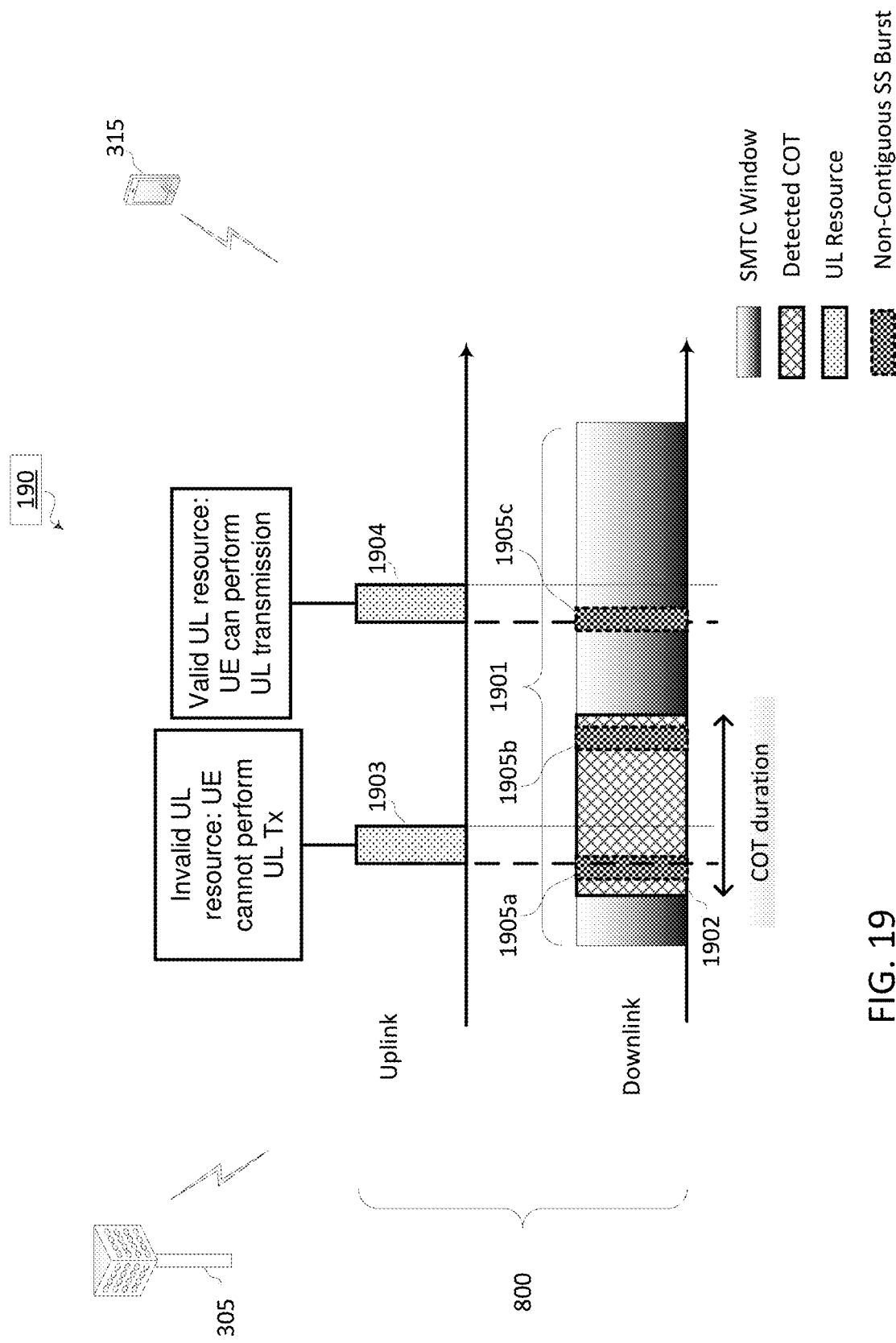
FIG. 19 is a block diagram illustrating a UE configured according to aspects of the present disclosure for determining, within and NR-U network, whether uplink resources that are identified as overlapping may be allowed for uplink transmissions for base station.

FIG. 19 is a block diagram illustrating a UE 315 configured according to one aspect of the present disclosure for determining, within an NR-U network 190, whether uplink resources that are identified as overlapping may be allowed for uplink transmissions to BS 305. If UE 315 receives a COT-SI which indicates an overlap of COT 1902 with an SMTC window 1901, UE 315 may perform uplink transmission after COT 1902 ends. For example, UE 315 receives a COT-SI that indicates an overlap of COT 1902 with SMTC window 1901. UE 315 may determine that uplink resource 1903 is invalid as it overlaps with COT 1902. After the COT duration, UE 315 may determine uplink resource 1904 to be valid. UE 315 may perform uplink transmissions if the overlap of COT 1902, whether overlapping both downlink and uplink portions or only the downlink portion of COT 1902, with SMTC window 1901 is greater than a threshold. This threshold can be based on the SS burst duration. SS burst duration generally includes all SSB transmissions from all beams and is dependent on the number of SSB beams and number of repetitions per beam.

For the case where the SS burst is not contiguous, such as where subsequent parts of a SS burst can be transmitted independently of the transmission time of the first part. An alternative example of such non-contiguous bursts is shown in SS bursts 1905*a-c*. Where the SS burst is not contiguous, a first option is not to allow the uplink transmissions during SMTC window 1901. Thus, for purposes of this alternative example aspect of FIG. 19, UE 315 knows that the SSB transmissions will occur in non-contiguous SS bursts, SS bursts 1905*a-c*. In such alternative aspect, UE 315 may invalidate both uplink resources 1903 and 1904. In a second alternative aspect, the threshold that UE 315 would use for determining whether an uplink resource is valid or invalid included an expected burst duration of the first part of the SSB bursts, SS burst 1905*a*. Alternatively, the threshold may be standardized and known in advance by UE 315. In such alternative example aspect, UE 315 may determine any uplink resources overlapping with the first COT/burst detected within SMTC, SS burst 1905*a*, as invalid, while allowing any uplink resources subsequent to the first burst/COT within SMTC. This is applicable where UE 315 understands the duration of each part of the SS burst and where the first part of the SS burst, SS burst 1905*a*, is one set of contiguous transmission of all beams and subsequent parts, SS bursts 1905*b* and 1905*c*, are repetitions of the first part. In a third alternative aspect, UE 315 may determine any uplink resources overlapping with the first N bursts/COTs detected within SMTC as invalid, while allowing any uplink resources subsequent to the Nth burst/COT detected within SMTC. This is applicable where UE 315 understands the number of parts of the SS burst which is given by N.

Figure 20:
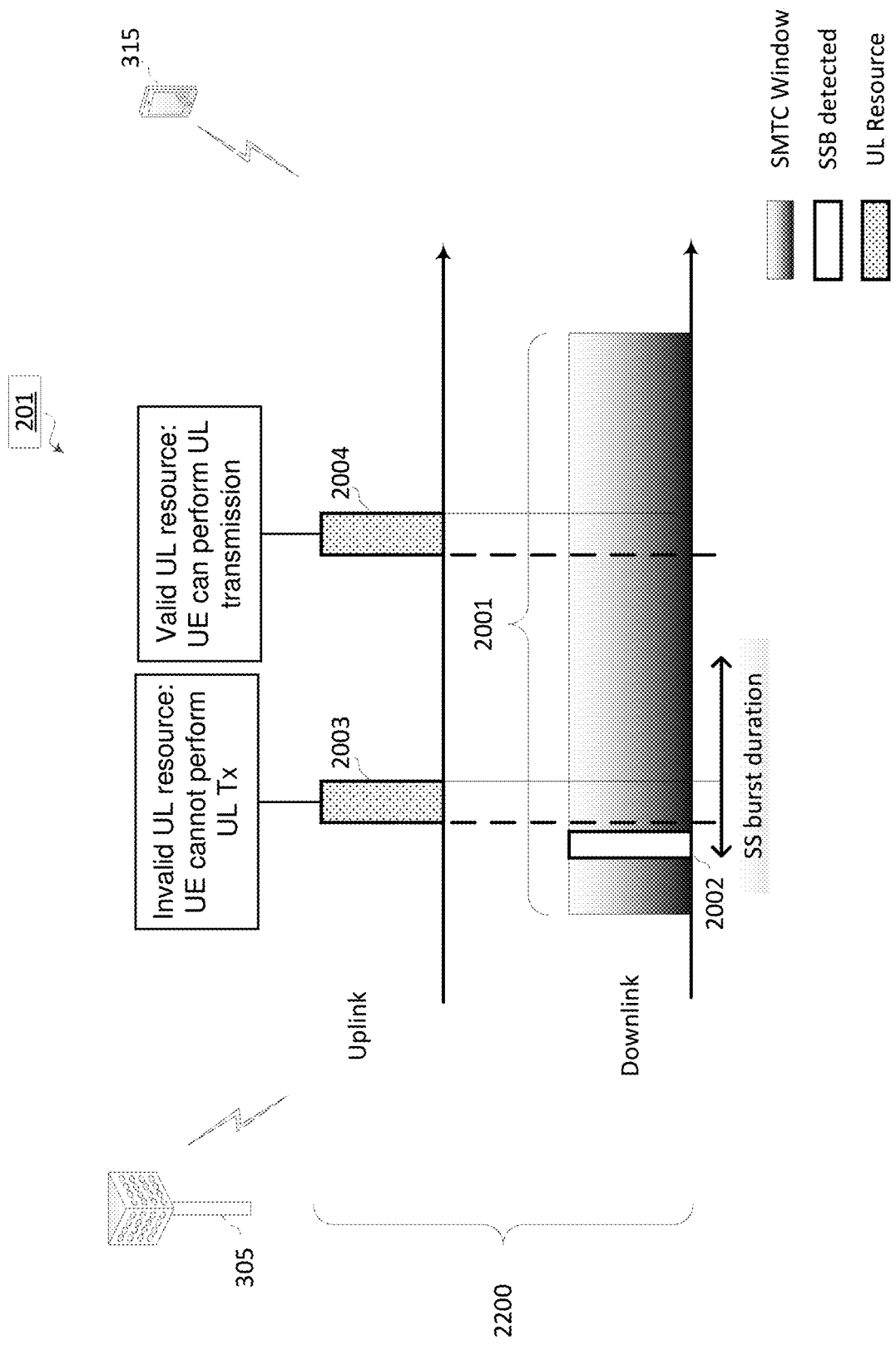
FIG. 20 is a block diagram illustrating a UE configured according to aspects of the present disclosure for determining, within and NR-U network, whether uplink resources that are identified as overlapping may be allowed for uplink transmissions for base station.

FIG. 20 is a block diagram illustrating a UE 315 configured according to one aspect of the present disclosure for determining, within an NR-U network 201, whether uplink resources that are identified as overlapping may be allowed for uplink transmissions to BS 305. If UE 315 detects an SSB transmission 2002/RMSI PDCCH during SMTC window 2001, then UE 315 can perform uplink transmission after an expected SS burst duration ends. UE 315 can wait a duration of time after signal detection, where that duration can be equal to a maximum SS burst duration of BS 305. For example, if UE 315 detects SSB transmission 2002, then UE 315 may perform an LBT procedure after the SS burst duration and initiate transmission when the LBT procedure succeeds. Thus, UE 315 would identify uplink resource 2003 as invalid, as it coincides with the SS burst duration, while UE 315 would identify uplink resource 2004 as valid, because it occurs after the SS burst duration.

In alternative implementations of the present aspect, the network, via BS 305, can indicate to UE 315 how many SSBs follow after the SSB transmission 2002 or how many SSB transmissions have been completed by SSB transmission 2002, in order to help UE 315 determine the exact end point of the SS burst.

It should be noted that, where the SS burst of SSB transmission 2002 is not contiguous, similar to the noted alternative with respect to FIG. 19, a first optional implementation would be for UE 315 to disallow any uplink transmissions in SMTC window 901. In a second optional implementation, UE 315 can perform uplink transmission after the first part of the SS burst which is detected by UE ends. As noted above, these optional implementations may be applicable when UE 315 understands the duration of each part of the SS burst, such as when the first part of the SS burst is one set of contiguous transmissions of all beams and the second part is a repetition of the first part. In a third alternative aspect, UE 315 can perform uplink transmission after UE detects N parts of the SS burst. This is applicable where UE 315 understands the number of parts of the SS burst which is given by N.

Figure 21A:
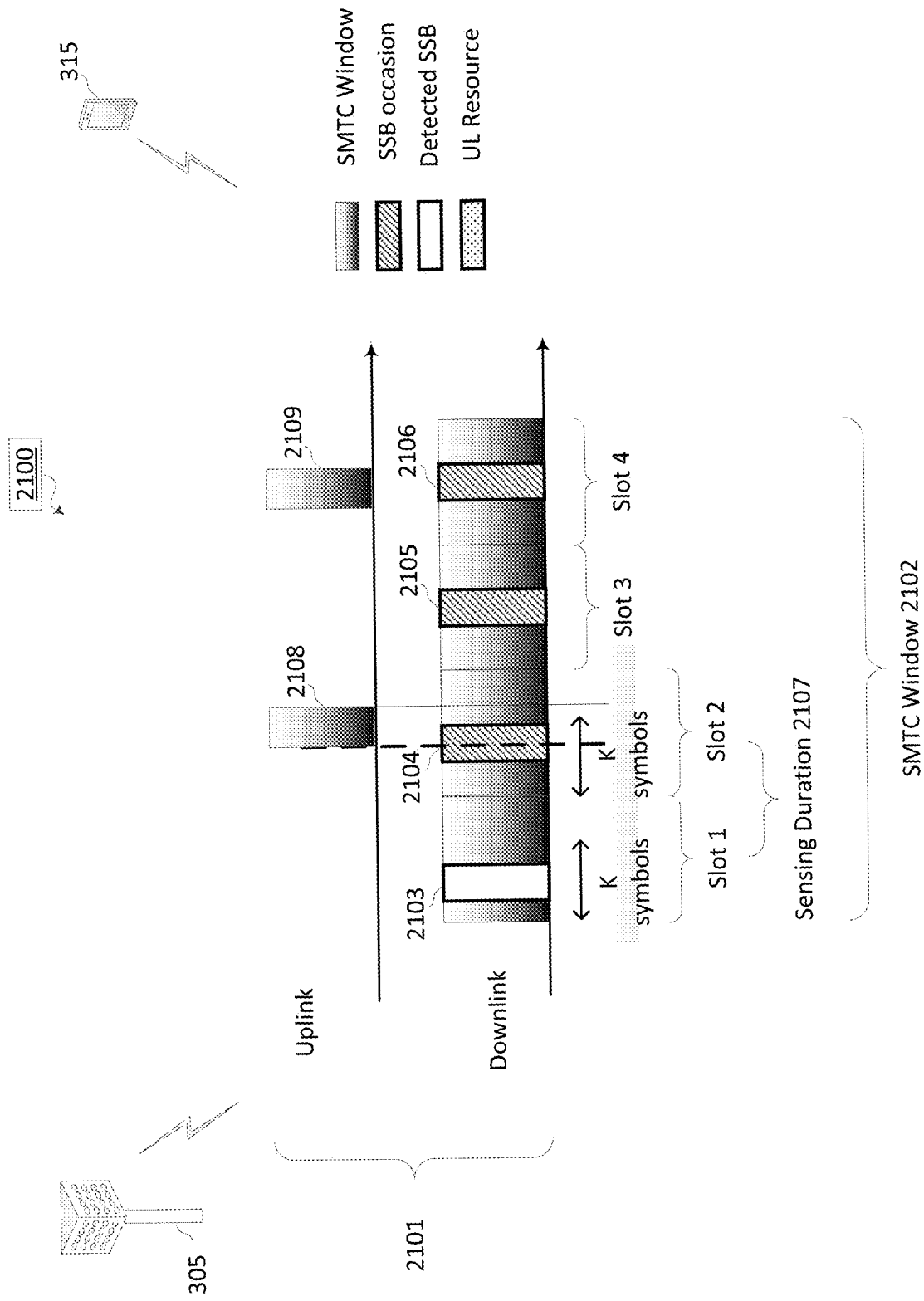
FIGS. 21A-21C are block diagrams illustrating a UE configured according to aspects of the present disclosure for determining, within an NR-U network, when uplink transmissions may occur to base station
Figure 21B:
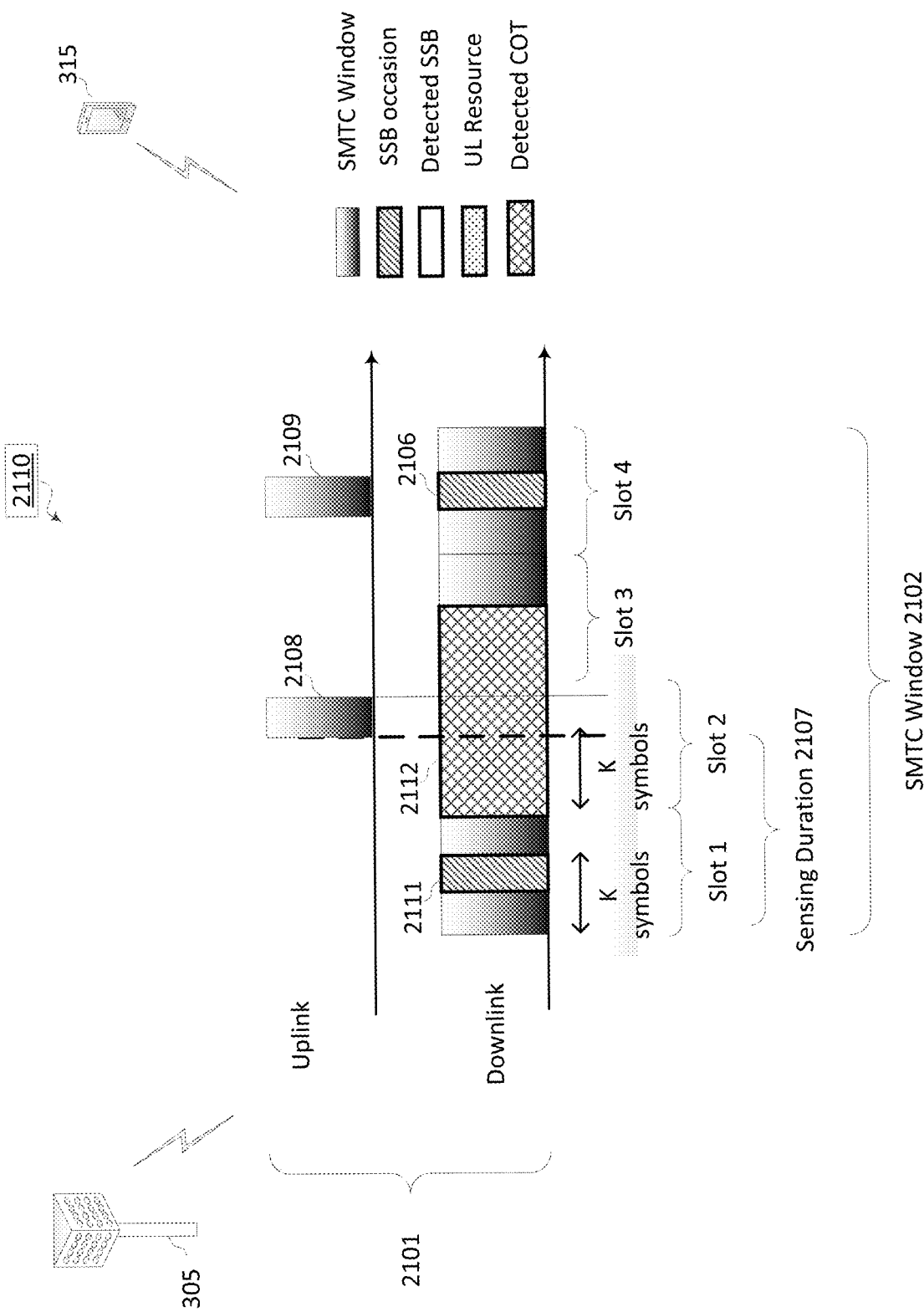
Figure 21C:
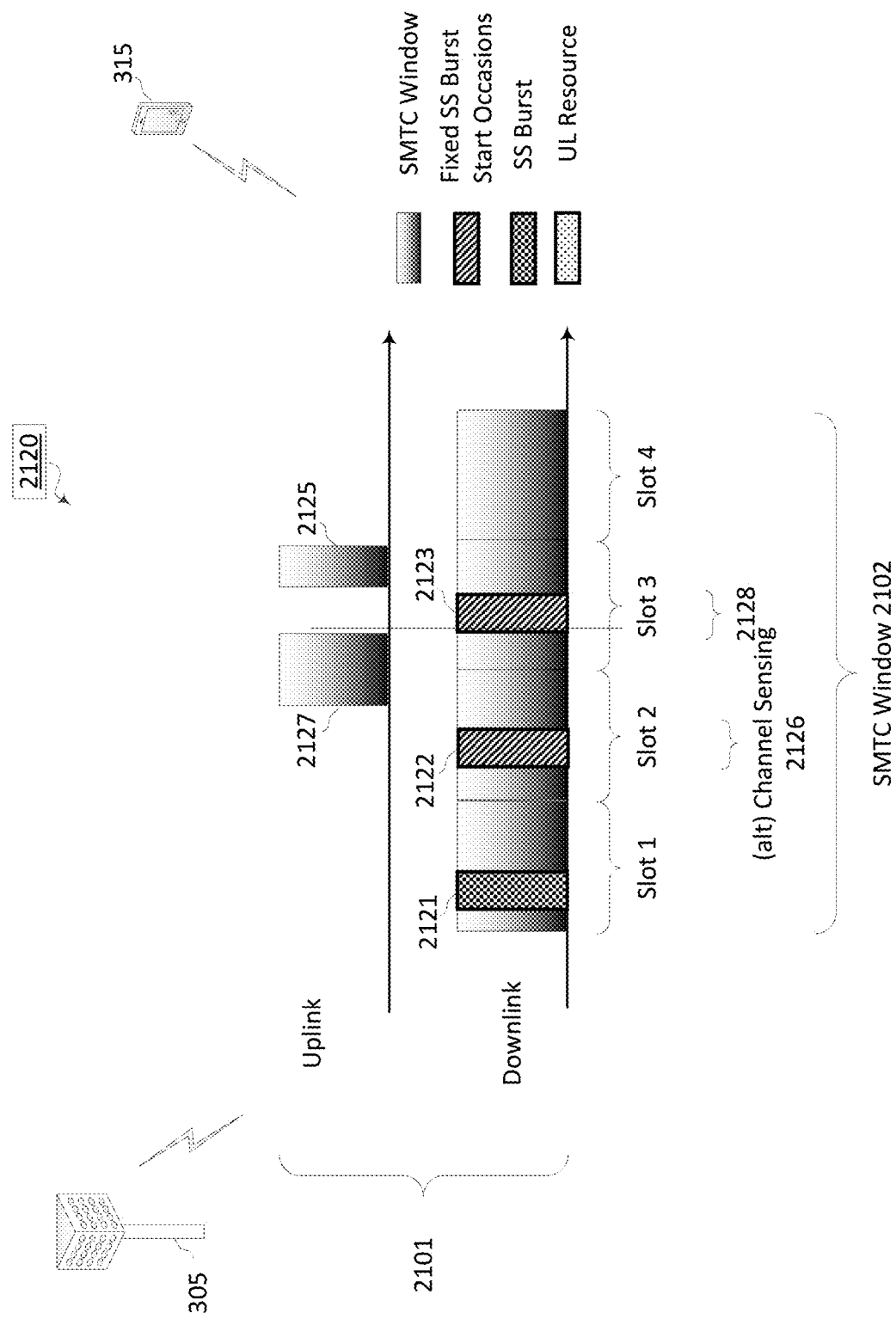

FIGS. 21A-21C are block diagrams illustrating a UE 315, 1200 configured according to aspects of the present disclosure for determining, within NR-U networks 2100, 2110, and 2120, when uplink transmissions may occur to BS 305, 1100. With respect to FIG. 21A, shared communication channel 2101 includes uplink and downlink communications between BS 305, 1100 and UE 315, 1200. UE 315 is allocated uplink resources 2108 and 2109 that overlap with SMTC window 2102 of BS 305. For example, the measurement window module 1109 in the BS 1100 may transmit an indication of the uplink resources 2108 and 2109 that fall within a measurement window (e.g., SMTC window 2102 or a DMTC window). The measurement window module 1209 in the UE 1200 may determine that the uplink resources 2108 and 2109 overlap with a measurement window (e.g., SMTC window 2102 or a DMTC window). UE 315 also obtains information that BS 305 has multiple SSB occasions 2111 (FIG. 21B) and 2104-2106 over slots 1-4 of SMTC window 2102. BS 305 transmits SSB 2103 within the first SSB occasion in slot 1. An additional aspect of the present disclosure, as illustrated in FIG. 21A, provides for UE 315 to allow transmission based on base station discontinuous transmission (DTX). For example, UE 315 monitors shared communication channel 2101 for signal energy. If no signal energy is detected within sensing duration 2107, UE 315 may assume that no SSB transmissions remain to be transmitted within SMTC window 2102. Thus, if UE 315 does not detect signal energy within sensing duration 2107, it may proceed with uplink transmissions at uplink resources 2108 and 2109, even though both such resources appear to overlap directly with SSB occasions 2104 and 2106.

The value of sensing duration 2107 can be, for example, the same as an LBT duration. In an alternative aspect, as illustrated in FIG. 21B, the value of sensing duration 2107 may be longer than an LBT channel sensing time in order to allow BS 305 to acquire COT 2112 for SSB transmissions. With respect to FIG. 21B, shared communication channel 2101 includes uplink and downlink communications between BS 305 and UE 315. UE 315 is allocated uplink resources 2108 and 2109 that overlap SMTC window 2102. BS 305 obtains multiple SSB occasions, such as SSB occasions 2111 and 2106, across slots 1-4 of SMTC window 2102. After a successful LBT procedure, BS 305 establishes COT 2112 across slots 1-3. UE 315 can monitor shared communication channel 2101 for sensing duration 2107. If no interference is detected, such that the signal strength is less than an energy threshold, then UE 315 can perform uplink transmissions. For example, UE 315 does not detect signal energy above the energy threshold for sensing duration 2107. UE may then assume that no further SSBs are to be transmitted in the remaining duration of SMTC window 2102. This assumes that if BS 305 is experiencing interference that UE 315 can detect the interference as well.

With respect to FIG. 21C, shared communication channel 2101 includes uplink and downlink communications between BS 305 and UE 315. SMTC window 2102 is divided into slots 1-4. Any SSB transmissions are configured to start from multiple fixed SS burst start position occasions in SMTC window 2102. In a third alternative aspect illustrated in FIG. 21C, UE 315 may perform transmission if an uplink resource occurs a threshold duration of time after the start of SMTC window 2102. BS 305 is configured for fixed SS burst start occasions over slots 1-3. BS 305 transmits SSB 2121 from the first fixed SS burst start occasion, while the next two occasions, fixed SS burst start occasions 2122 and 2123, are unused. According to the third alternative aspect, UE 315 can wait until the end of last SS burst start point of fixed SS burst start occasion 2123 for uplink initiation. UE 315 may then perform uplink transmission 2125, which occur after the end of fixed SS burst start occasion 2123.

In a fourth alternative aspect, also illustrated by FIG. 21C, with SSB starting points fixed at the fixed SS burst occasions, UE 315 may attempt to sense shared communication channel 2101 at the given starting points. If no interference is detected, UE 315 can perform uplink transmissions until the subsequent SS burst start point. For example, with SSB 2121 detected in slot 1 of SMTC window 2102, UE 315 withholds any uplink transmissions. However, at fixed SS burst start occasion 2122, UE 315 performs channel sensing 2126 and detects no signal energy. Accordingly, UE 315 may begin uplink transmissions 2127 until the beginning of the next SS burst start occasion at fixed SS burst start occasion 2123. Similarly, at fixed SS burst start occasion 2123, UE 315 performs channel sensing 2128. After detecting no signal energy, UE 315 begins uplink transmission 2125.

It should be noted that for the various aspects illustrated in FIGS. 21A-21C, there can be additional restrictions. For example, the signal strength threshold for sensing shared communication channel 2101 can be lower than a standard channel sensing threshold for LBT procedures. This lowered sensing threshold may assist UE 315 to detect interference which may be located at a faraway location. In additional implementations of the example aspects, UE 315 may perform the uplink resource validity procedure if the signal strength of BS 305 is greater than a predetermined threshold. This threshold signal strength would indicate that UE 315 may be in close proximity to BS 305.

Figure 22:
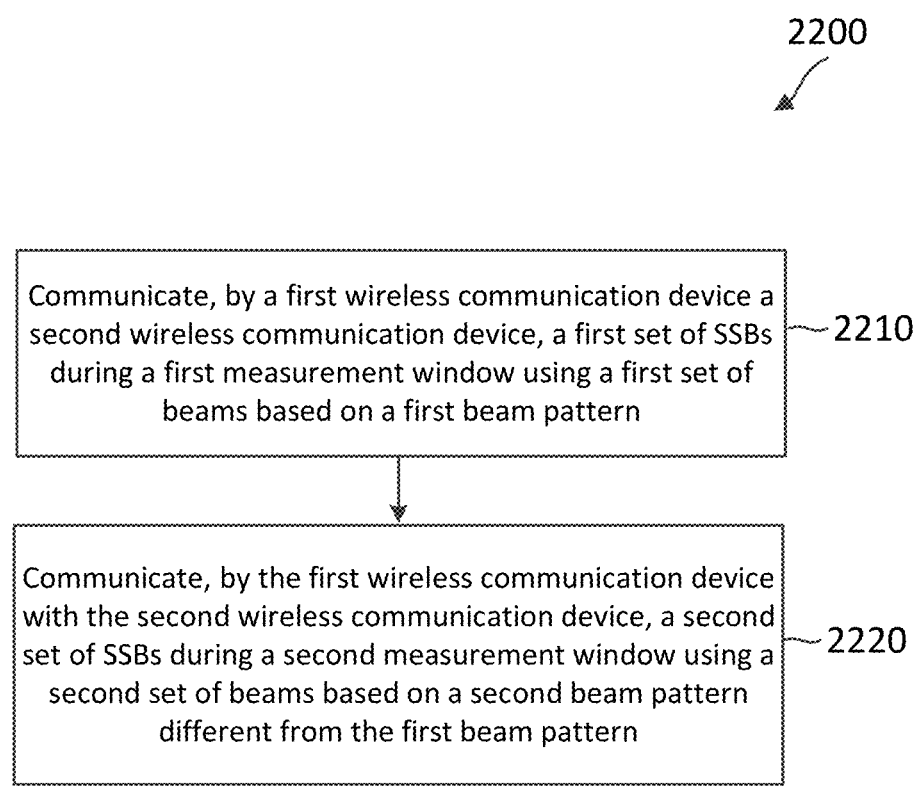
FIG. 22 is a flow diagram of a method of wireless communication according to embodiments of the present disclosure.

FIG. 22 is a flow diagram of a method 2200 of wireless communication according to embodiments of the present disclosure. Steps of the method 2200 can be executed by a computing device (e.g., a processor, processing circuit, and/or other suitable component) of a wireless communication device, such as the BS 305, 1100 and/or UE 315, 1200. The method 2200 includes a number of enumerated steps, but embodiments of the method 2200 may include additional steps before, after, and in between the enumerated steps. In some embodiments, one or more of the enumerated steps may be omitted or performed in a different order.

At step 2210, the method 2200 includes communicating, by a first wireless communication device a second wireless communication device, a first set of SSBs during a first measurement window using a first set of beams based on a first beam pattern. In an example, the first wireless communication device is a BS 305, 1100 that transmits the first set of SSBs to the UE 315, 1200. In another example, the first wireless communication device is a UE 315, 1200 that receives the first set of SSBs from the BS 305, 1100. In this example, the UE 315 may receive the first set of SSBs via wireless radios 1600*a-r* and antennas 1652*a-r* in FIG. 16.

At step 2220, the method 2200 includes communicating, by the first wireless communication device with the second wireless communication device, a second set of SSBs during a second measurement window using a second set of beams based on a second beam pattern different from the first beam pattern. In an example, the first wireless communication device is a BS 305,1100 that transmits the second set of SSBs to the UE 315, 1200. In another example, the first wireless communication device is a UE 315, 1200 that receives the second set of SSBs from the BS 305,1100. In this example, the UE 315 may receive the second set of SSBs via wireless radios 1600*a-r* and antennas 1652*a-r* in FIG. 16.

Figure 23:
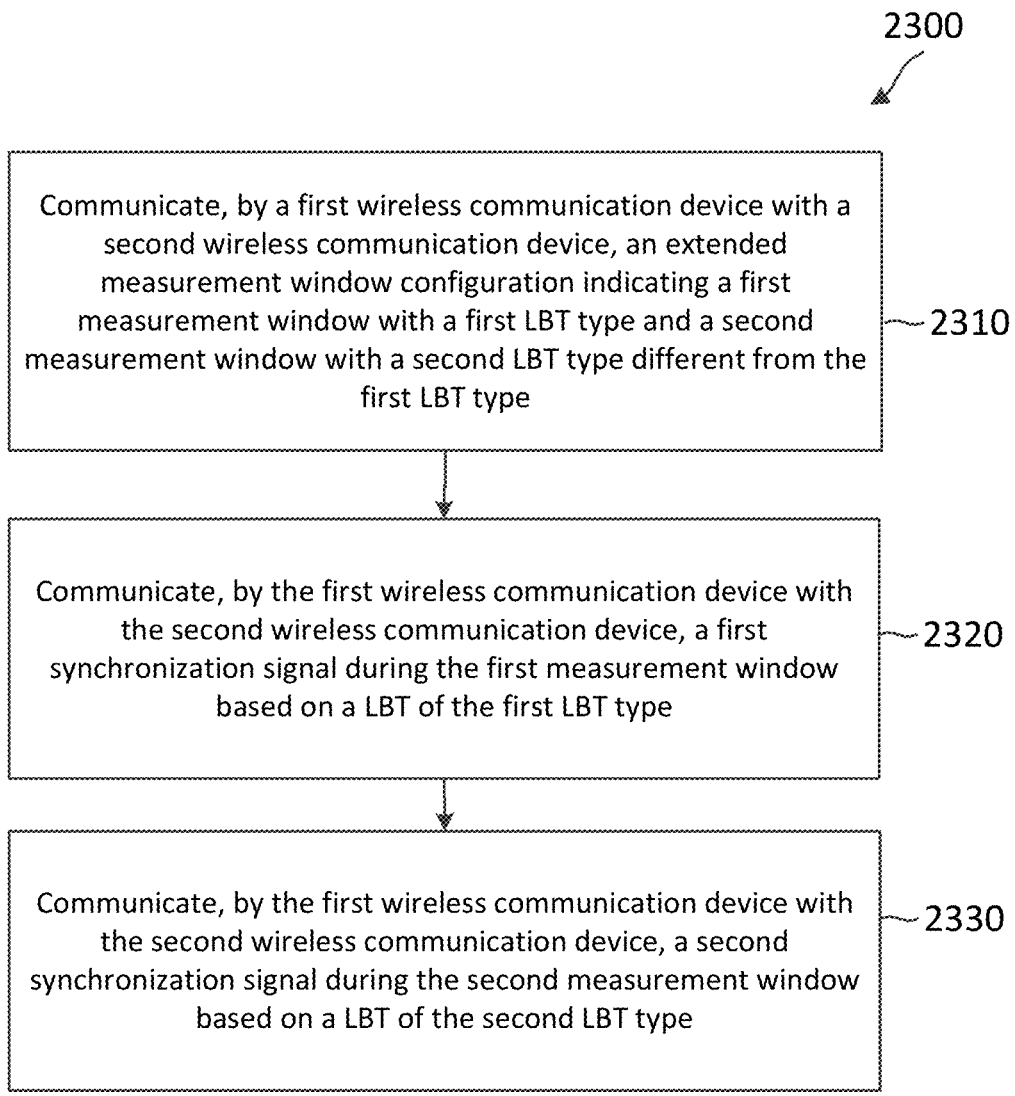
FIG. 23 is a flow diagram of a method of wireless communication according to embodiments of the present disclosure.

FIG. 23 is a flow diagram of a method 2300 of wireless communication according to embodiments of the present disclosure. Steps of the method 2300 can be executed by a computing device (e.g., a processor, processing circuit, and/or other suitable component) of a wireless communication device, such as the BS 305, 1100 and/or UE 315, 1200. As illustrated, the method 2300 includes a number of enumerated steps, but embodiments of the method 2300 may include additional steps before, after, and in between the enumerated steps. In some embodiments, one or more of the enumerated steps may be omitted or performed in a different order.

At step 2310, the method 2300 includes communicating, by a first wireless communication device with a second wireless communication device, an extended measurement window configuration indicating a first measurement window with a first LBT type and a second measurement window with a second LBT type different from the first LBT type. In an example, the first wireless communication device is a BS 305, 1100 that transmits the extended measurement window configuration to the UE 315, 1200. In another example, the first wireless communication device is a UE 315, 1200 that receives the extended measurement window configuration from the BS 305, 1100. In this example, the UE 315 may receive the extended measurement window configuration via wireless radios 1600*a-r* and antennas 1652*a-r* in FIG. 16. The UE 315, 1200 may listen for discovery signals during the extended measurement window (e.g., DMTC window or SMTC window).

At step 2320, the method 2300 includes communicating, by the first wireless communication device with the second wireless communication device, a first synchronization signal during the first measurement window based on a LBT of the first LBT type. In an example, the first wireless communication device is a BS 305, 1100 that transmits the first synchronization signal to the UE 315, 1200. In another example, the first wireless communication device is a UE 315, 1200 that receives the first synchronization signal from the BS 305, 1100. In this example, the UE 315 may receive the first synchronization signal via wireless radios 1600*a-r* and antennas 1652*a-r* in FIG. 16.

At step 2330, the method 2300 includes communicating, by the first wireless communication device with the second wireless communication device, a second synchronization signal during the second measurement window based on a LBT of the second LBT type. In an example, the first wireless communication device is a BS 305, 1100 that transmits the second synchronization signal to the UE 315, 1200. In another example, the first wireless communication device is a UE 315, 1200 that receives the second synchronization signal from the BS 305, 1100. In this example, the UE 315 may receive the second synchronization signal via wireless radios 1600*a-r* and antennas 1652*a-r* in FIG. 16.

Figure 24:
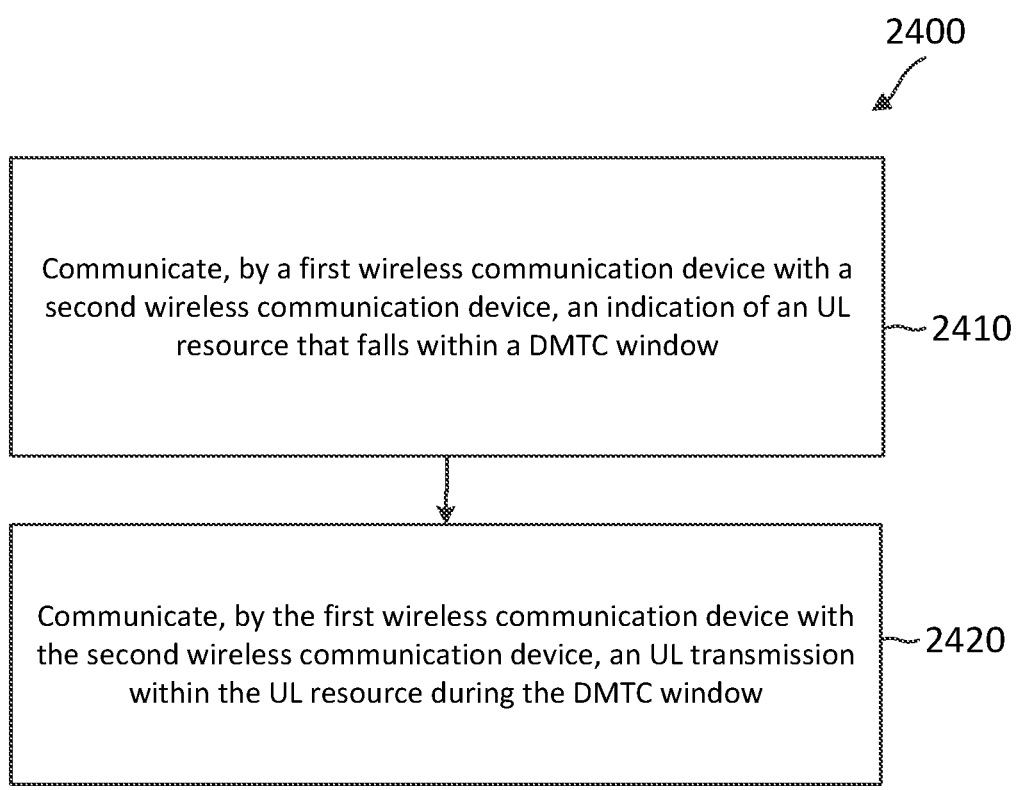
FIG. 24 is a flow diagram of a method of wireless communication according to embodiments of the present disclosure.

FIG. 24 is a flow diagram of a method 2400 of wireless communication according to embodiments of the present disclosure. Steps of the method 2400 can be executed by a computing device (e.g., a processor, processing circuit, and/or other suitable component) of a wireless communication device, such as the BS 305, 1100 and/or UE 315, 1200. As illustrated, the method 2400 includes a number of enumerated steps, but embodiments of the method 2400 may include additional steps before, after, and in between the enumerated steps. In some embodiments, one or more of the enumerated steps may be omitted or performed in a different order.

At step 2410, the method 2400 includes communicating, by a first wireless communication device with a second wireless communication device, an indication of an UL resource that falls within a DMTC window. In an example, the first wireless communication device is a BS 305, 1100 that transmits the indication of the UL resource to the UE 315, 1200. In another example, the first wireless communication device is a UE 315, 1200 that receives the indication of the UL resource from the BS 305, 1100. In this example, the UE 315 may receive the indication of the UL resource via wireless radios 1600*a-r* and antennas 1652*a-r* in FIG. 16.

At step 2420, the method 2400 includes communicating, by the first wireless communication device with the second wireless communication device, an UL transmission within the UL resource during the DMTC window. In an example, the first wireless communication device is a BS 305, 1100 that receives the UL transmission within the UL resource from the UE 315, 1200. In another example, the first wireless communication device is a UE 315, 1200 that transmits the UL transmission within the UL resource to the BS 305, 1100. In this example, the UE 315 may transmit the UL transmission within the UL resource via wireless radios 1600*a-r* and antennas 1652*a-r* in FIG. 16.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
   communicating, by a first wireless communication device with a second wireless communication device, an indication of an uplink (UL) resource that falls within a discovery reference signal (DRS) measurement timing configuration (DMTC) window; and
   communicating, by the first wireless communication device with the second wireless communication device based on the UL resource overlapping with an synchronization signal block SSB occasion within the DMTC window and a validity state of the UL resource, an UL transmission within the UL resource during the DMTC window, wherein the validity state of the UL resource is based on an arrangement of the UL resource.

2. The method of claim 1, wherein the communicating the indication of the UL resource includes scheduling an UL grant for the UL transmission.

3. The method of claim 1, wherein the communicating the indication of the UL resource includes communicating a configured grant for the UL transmission.

4. The method of claim 1, further comprising: determining, by the first wireless communication device, whether the UL resource overlaps with the SSB occasion within the DMTC window, wherein the communicating the UL transmission includes communicating the UL transmission in response to a determination of no overlap with the SSB occasion.

5. The method of claim 1, comprising: wherein communicating the UL transmission includes communicating the UL transmission in response to a determination of the validity state as valid.

6. The method of claim 1, wherein the further comprising: determining whether the UL resource overlaps with the SSB occasion within the DMTC window includes by at least one of:
   determining the overlap in response to the UL resource overlapping the DMTC window, wherein the DMTC window includes at least one slot of a plurality of slots having the SSB occasion;
   determining the overlap in response to the UL resource overlapping within a first predetermined number of symbols of a slot of the DMTC window having the SSB occasion;
   determining the overlap in response to the UL resource overlapping any symbol within a slot of the DMTC window prior to a last symbol allocated for the SSB occasion within the slot; or
   determining the overlap in response to the UL resource overlapping a symbol allocated for the SSB occasion within the slot of the DMTC window having the SSB occasion.

7. The method of claim 1, further comprising:
   determining, by the first wireless communication device, that the validity state of the UL resource is invalid in response to one or more of:
   failure of a first gap between the DMTC window and the UL resource to meet a first predetermined length;
   failure of a second gap between the UL resource and a subsequent DMTC window to meet a second predetermined length;
   failure of a third gap between a previous SSB occasion and the UL resource to meet a third predetermined length; or
   failure of a fourth gap between the UL resource and a subsequent SSB occasion to meet a fourth predetermined length.

8. The method of claim 1, further comprising:
   failing, by the first wireless communication device, to detect a channel occupancy time (COT) from a beginning of the DMTC window; and
   determining the validity state includes by at least one of:
   determining the validity state as invalid in response to a determination that the UL resource overlaps with the SSB occasion;
   determining the validity state as valid in response to the UL resource having been dynamically triggered via a physical control channel;
   determining the validity state as valid in response to the UL resource having been triggered as UE-specific UL resources; or
   determining the validity state as invalid in response to the UL resource having been triggered via remaining minimum system information (RMSI).

9. The method of claim 1, further comprising:
   sensing a shared communication channel for occupying signals during a predetermined duration of the DMTC window; and
   determining the validity state of the UL resource as valid in response to the shared communication channel being detected as idle for the predetermined duration.

10. The method of claim 9, further comprising:
    determining the validity state of the UL resource as invalid in response to the UL resource occurring within a threshold duration from a beginning of the DMTC window.

11. The method of claim 9, further comprising:
    identifying, by the first wireless communication device, one or more fixed synchronization signal (SS) burst start points within the DMTC window, wherein the sensing begins at each of the one or more fixed SS burst start points, and wherein the validity state of the UL resource as valid ends at a next fixed SS burst start point of the one or more fixed SS burst start points.

12. The method of claim 1, wherein the UL transmission within the UL resource overlapping with the SSB occasion includes at least one of:

a high priority transmission; or a transmission of a predetermined physical channel type.

13. An apparatus comprising:

a memory;

a transceiver; and at least one processor coupled to the memory and the transceiver, wherein the apparatus is configured to:

communicate, with a second wireless communication device, an indication of an uplink (UL) resource that falls within a discovery reference signal (DRS) measurement timing configuration (DMTC) window; and communicate, with the second wireless communication device based on the UL resource overlapping with an synchronization signal block SSB occasion within the DMTC window and a validity state of the UL resource, an UL transmission within the UL resource during the DMTC window, wherein the validity state of the UL resource is based on an arrangement of the UL resource.

14. The apparatus of claim 13, wherein the UL transmission is at least one of a random access channel (RACH) transmission, a configured grant transmission, or a scheduled grant transmission.

15. The apparatus of claim 13, wherein the apparatus is further configured to communicate the indication of the UL resource by scheduling an UL grant for the UL transmission.

16. The apparatus of claim 13, wherein the apparatus is further configured to communicate the indication of the UL resource by communicating a configured grant for the UL transmission.

17. The apparatus of claim 13, wherein the apparatus is further configured to:

determine whether the UL resource overlaps with the (SSB) occasion within the DMTC window; and communicate the UL transmission in response to a determination of no overlap with the SSB occasion.

18. The apparatus of claim 13, comprising:

wherein the apparatus is further configured to:

determine whether the UL resource overlaps with the SSB occasion within the DMTC window; and determine the validity state of the UL resource based on the arrangement of the UL resource in response to a determination of an overlap with the SSB occasion; and communicates the UL transmission in response to a determination of the validity state as valid.

19. The apparatus of claim 13, wherein the apparatus is further configured to determine that the UL resource overlaps with the SSB occasion within the DMTC window in response to at least one of:

determining the overlap in response to the UL resource overlapping the DMTC window, wherein the DMTC window includes at least one slot of a plurality of slots having the SSB occasion; or determining the overlap in response to the UL resource overlapping within a first predetermined number of symbols of a slot of the DMTC window having the SSB occasion.

20. The apparatus of claim 13, wherein the apparatus is further configured to determine that the UL resource overlaps with the SSB occasion within the DMTC window in response to at least one of:

determining the overlap in response to the UL resource overlapping any symbol within a slot of the DMTC window prior to a last symbol allocated for the SSB occasion within the slot; or determining the overlap in response to the UL resource overlapping a symbol allocated for the SSB occasion within the slot of the DMTC window having the SSB occasion.

21. The apparatus of claim 13, wherein the apparatus is further configured to:

determine that the validity state of the UL resource is invalid in response to one or more of:

failure of a first gap between the DMTC window and the UL resource to meet a first predetermined length;

failure of a second gap between the UL resource and a subsequent DMTC window to meet a second predetermined length;

failure of a third gap between a previous SSB occasion and the UL resource to meet a third predetermined length; or failure of a fourth gap between the UL resource and a subsequent SSB occasion to meet a fourth predetermined length.

22. The apparatus of claim 13, comprising:

wherein the apparatus is further configured to:

sense a shared communication channel for occupying signals during a predetermined duration of the DMTC window; and determine the validity state as valid in response to the shared communication channel detected as idle for the predetermined duration.

23. The apparatus of claim 22, wherein the apparatus is further configured to determine the validity state as invalid in response to the UL resources occurring within a threshold duration from a beginning of the DMTC window.

24. The apparatus of claim 22, wherein the processor is apparatus is further configured to:

identify one or more fixed synchronization signal (SS) burst start points within the DMTC window; and sense the shared communication channel at each of the one or more fixed SS burst start points, wherein the validity state of the UL resource as valid ends at a next fixed SS burst start point of the one or more fixed SS burst start points.

25. A non-transitory computer-readable medium having program code recorded thereon, the program code comprising:

code for causing a wireless communication device to communicate an indication of an uplink (UL) resource that falls within a discovery reference signal (DRS) measurement timing configuration (DMTC) window; and code for causing the wireless communication device to communicate, based on the UL resource overlapping with an synchronization signal block SSB occasion within the DMTC window and a validity state of the UL resource, an UL transmission within the UL resource during the DMTC window, wherein the validity state of the UL resource is based on an arrangement of the UL resource.

26. The non-transitory computer-readable medium of claim 25, wherein the code for causing the wireless communication device to communicate the indication includes code for causing the wireless communication device to schedule an UL grant for the UL transmission.

27. The non-transitory computer-readable medium of claim 25, wherein the code for causing the wireless communication device to communicate the indication includes code for causing the wireless communication device to communicate a configured grant for the UL transmission.

28. The non-transitory computer-readable medium of claim 25, comprising:
code for causing the wireless communication device to determine whether the UL resource overlaps with the (SSB) occasion within the DMTC window, wherein the code for causing the wireless communication device to communicate the UL transmission includes code for causing the wireless communication device to communicate the UL transmission in response to a determination of no overlap with the SSB occasion.

* * * * *